(12) United States Patent
Nishikawa

(10) Patent No.: US 8,797,847 B2
(45) Date of Patent: Aug. 5, 2014

(54) NETWORK RELAY DEVICE AND CONTROL METHOD THEREOF

(75) Inventor: Koichi Nishikawa, Chigasaki (JP)

(73) Assignee: Alaxala Networks Corporation, Kanagawa (JP)

( * ) Notice: Subject to any disclaimer, the term of this patent is extended or adjusted under 35 U.S.C. 154(b) by 139 days.

(21) Appl. No.: 13/525,729

(22) Filed: Jun. 18, 2012

(65) Prior Publication Data

US 2013/0016617 A1 Jan. 17, 2013

(30) Foreign Application Priority Data

Jul. 12, 2011 (JP) .................................. 2011-153690

(51) Int. Cl.
*H04L 12/42* (2006.01)
(52) U.S. Cl.
CPC ...................................... *H04L 12/42* (2013.01)
USPC .......................................................... 370/226
(58) Field of Classification Search
CPC ................................ H04L 12/42; H04L 45/48
USPC .......................................................... 370/226
See application file for complete search history.

(56) References Cited

U.S. PATENT DOCUMENTS

| 8,355,348 B1 * | 1/2013 | Miller et al. .................. 370/256 |
| 2002/0181392 A1 | 12/2002 | Okuno | |
| 2008/0253295 A1 | 10/2008 | Yumoto et al. | |
| 2009/0109841 A1 * | 4/2009 | Nozaki et al. ................. 370/218 |

FOREIGN PATENT DOCUMENTS

| JP | 2002-359628 A | 12/2002 |
| JP | 2008-263393 A | 10/2008 |
| JP | 2010-220037 A | 9/2010 |

OTHER PUBLICATIONS

S. Shah et al., 'Extreme Networks Ethernet Automatic Protection Switching (EAPS)', Oct. 2003, Network Working Group, Request for Comments: 3619, pp. 1-7.*
LAN/MAN Standards Committee, "IEEE Standard for Local and Metropolitan Area Networks—Link Aggregation", IEEE Std 802.1AX-2008, Nov. 3, 2008.
LAN/MAN Standards Committee, :IEEE Standard for Local and Metropolitan Area Networks—Media Access Control (MAC) Bridges, IEEE Std 802.1D-2004, Jun. 9, 2004.
Japanese Office Action received in Japanese Application No. 2011-153690 dated Feb. 12, 2014.

* cited by examiner

*Primary Examiner* — Melvin Marcelo
(74) *Attorney, Agent, or Firm* — Mattingly & Malur, PC

(57) ABSTRACT

The network relay device is provided. The network relay device includes: a plurality of ports, each being configured to be connectable with one physical line; a virtual line controller configured to treat a plurality of physical lines, which are respectively connected with the plurality of ports, to constitute a virtual line; and a status check frame controller configured to send via the virtual line a status check frame for use in checking status of a network, which the network relay device is connected with via the virtual line, wherein the status check frame controller changes a frame-sending port to be used to send a next status check frame, in order to avoid continuously using an identical port as both a frame-sending port to send the status check frame and a frame-receiving port to receive the status check frame from another network relay device.

10 Claims, 43 Drawing Sheets

Fig.7

| RING ID | LA ID | PRIORITY PORT INFO |
|---|---|---|
| 10 | 1 | Primary |
|  | 2 | Secondary |
| 20 | 11 | Secondary |
|  | 12 | Primary |
| ⋮ | ⋮ | ⋮ |

| LA ID | PHYSICAL PORT NUMBER |
|---|---|
| 1 | 9 |
|  | 10 |
|  | 11 |
|  | 12 |
| 2 | 1 |
|  | 2 |
| ⋮ | ⋮ |

| RING ID | LA ID | PHYSICAL PORT NUMBER | PRIORITY PORT INFO | PHYSICAL PORT STATUS | SENDING FLAG | RECEIVING FLAG |
|---|---|---|---|---|---|---|
| 10 | 1 | 9 | Primary | Up | on | off |
| | | 10 | Primary | Up | off | off |
| | | 11 | Primary | Up | off | off |
| | | 12 | Primary | Up | off | off |
| | 2 | 1 | Secondary | Up | on | on |
| | | 2 | Secondary | Up | off | off |
| | 11 | 5 | Secondary | Up | on | off |
| 20 | — | 6 | Secondary | Up | off | off |
| | | 7 | Primary | Up | on | off |
| ... | ... | ... | ... | ... | ... | ... |

| RING ID | LA ID | PHYSICAL PORT NUMBER | PRIORITY PORT INFO | PHYSICAL PORT STATUS | SENDING FLAG | RECEIVING FLAG |
|---|---|---|---|---|---|---|
| 10 | 1 | 9 | Primary | Up | on | off |
| | | 10 | NOT | Up | off | off |
| | | 11 | Primary | Up | off | off |
| | | 12 | NOT | Up | off | off |
| | 2 | 1 | NOT | Up | off | on |
| 20 | 11 | 2 | Secondary | Up | on | off |
| | | 5 | NOT | Up | off | off |
| | | 6 | Secondary | Up | on | off |
| | – | 7 | Primary | Up | on | off |
| ... | ... | ... | ... | ... | ... | ... |

420b

NETWORK RELAY DEVICE AND CONTROL METHOD THEREOF

CROSS-REFERENCE TO RELATED APPLICATIONS

The present application claims priority to Japanese Patent Application No. 2011-153690 filed on Jul. 12, 2011, the disclosure of which is hereby incorporated by reference in its entirety.

BACKGROUND OF THE INVENTION

1. Field of the Invention

The present invention relates to a network relay device, and more specifically to detecting a failure occurring in a network, which a network relay device is connected with.

2. Description of the Related Art

In the Ethernet (registered trademark)-based layer 2 network, Spanning Tree protocol (STP) according to the IEEE 802.1d standard has been known as the protocol to make the switches redundant. The STP causes control frames called BPDU (Bridge Protocol Data Unit) to be exchanged between the switches, so as to logically eliminate the loop structure of routing and check the status of a network, which the switches are connected to, such as the occurrence or non-occurrence of a failure. Ring protocol has also been known as the protocol to make the switches redundant. The Ring protocol causes control frames called Health check frames to be exchanged between the switches, so as to logically eliminate the loop structure of routing and check the status of a network, which the switches are connected to.

Link Aggregation according to the IEEE802.3ad/ IEEE802.1AX standard, on the other hand, has been known as the configuration to make the physical lines redundant. The Link Aggregation is capable of bundling or aggregating multiple physical lines and treating the bundled physical lines as one virtual line. The Link Aggregation advantageously expands the bandwidth, since the bandwidth of the virtual line is the sum of the bandwidths of the bundled physical lines. Even on the occurrence of a failure in part of the bundled physical lines, the Link Aggregation advantageously enables communication to be continued by using the remaining part of the bundled physical lines.

Recently, networks employing the technique of making the switches redundant in combination with the technique of making the physical lines redundant have increased in number to enable the high-speed, high-capacity and highly-reliable communication, in core networks and metro networks as well as access networks.

In the network employing the technique of making the switches redundant in combination with the technique of making the physical lines redundant, for example, in the network employing the Ring protocol in combination with the Link Aggregation, Health check frames are sorted into and sent by the respective physical lines included in the virtual line according to a predetermined sorting method. Periodical transmission of Health check frames may be concentrated on one specific physical line included in the virtual line. On the occurrence of a failure in this specific physical line, the occurrence of a failure in the whole Ring network may be falsely detected, although the failure does not actually occur over the whole virtual line (i.e., no failure occurs in the other physical lines included in the same virtual line).

This problem is not characteristic of the concrete protocols or their combinations, such as STP, Ring protocol or Link Aggregation but is commonly found in any network relay device configured to make physical lines redundant and exchange control frames (or packets) for use in checking the status of the network with another network relay device.

SUMMARY

Consequently, there is a need to prevent or at least reduce false detection of a failure in a virtual line by a network relay device configured to use a virtual line for making physical lines redundant and to exchange control frames for use in checking the status of a network with another network relay device.

According to first aspect of the present invention, a network relay device is provided. The network relay device includes: a plurality of ports, each being configured to be connectable with one physical line; a virtual line controller configured to treat a plurality of physical lines as a virtual line, wherein the plurality of physical lines which are respectively connected with the plurality of ports; and a status check frame controller configured to send via the virtual line a status check frame for use in checking status of a network, which the network relay device is connected with via the virtual line, wherein the status check frame controller changes a frame-sending port to be used to send a next status check frame, in order to avoid continuously using an identical port as both a frame-sending port to send the status check frame and a frame-receiving port to receive the status check frame from another network relay device.

In the network relay device of this aspect, the status check frame controller changes the frame-sending port to be used to send a next status check frame, in order to avoid continuously using the same port as both the frame-sending port to send the status check frame for use in checking the status of a network, which the network relay device is connected with via the virtual line, and the frame-receiving port to receive the status check frame from another network relay device. This configuration effectively prevents the status check frames from being undesirably discarded on the occurrence of a failure in a physical line connected with the frame-sending, frame-receiving port, in the state where the same port is continuously used as both the frame-sending port and the frame-receiving port of the status check frames. As a result, this configuration prevents or at least reduces false detection of a failure in the virtual line by the network relay device configured to use the virtual line for making physical lines redundant and to exchange control frames or status check frames for use in checking the status of the network with another network relay device.

According to the first aspect of the present invention, the network relay device may form a Ring network, and the status check frame controller may send the status check frame from a port connected in a first direction of the Ring network and from a port connected in a second direction of the Ring network that is different from the first direction, the status check frame controller may send the next status check frame from a port selected according to a first rule among ports connected in the first direction and from a port selected according to a second rule among ports connected in the second direction, in order to avoid continuously using an identical port both as a frame-sending port to send the status check frame in the first direction and a frame-receiving port to receive from the another network relay device the status check frame, which is sent in the second direction and is circulated in the Ring network.

In the network relay device of this aspect, the status check frame controller employs the first rule and the second rule to select the frame-sending port to be used to send a next status check frame, in order to avoid continuously using the same port as the frame-sending port to send the status check frame in the first direction and the frame-receiving port to receive from the another network relay device the status check frame, which is sent in the second direction and is circulated in the Ring network.

According to the first aspect of the present invention, the first rule may select a different port from a last frame-sending port to send the status check frame last time, and the second rule may select an identical port with a last frame-sending port to send the status check frame last time.

In the network relay device of this aspect, the status check frame controller selects a different port from the last frame-sending port to send the status check frame last time among the ports connected in the first direction and sends a next status check frame from the selected port, while selecting the same port as the last frame-sending port to send the status check frame last time among the ports connected in the second direction and sending a next status check frame from the selected port. This configuration changes the frame-sending port to be used to send a next status check frame, in order to avoid continuously using the same port as both the frame-sending port and the frame-receiving port of the status check frame.

According to the first aspect of the present invention, the first rule may select a port having a next greater port number next to a port number of a last frame-sending port to send the status check frame last time, and the second rule may select a port having a next smaller port number just before a port number of a last frame-sending port to send the status check frame last time.

In the network relay device of this aspect, the status check frame controller selects a port having a next greater port number next to the port number of the last frame-sending port to send the status check frame last time among the ports connected in the first direction and sends a next status check frame from the selected port, while selecting a port having a next smaller port number just before the port number of the last frame-sending port to send the status check frame last time among the ports connected in the second direction and sending a next status check frame from the selected port. This configuration changes the frame-sending port to be used to send a next status check frame, in order to avoid continuously using the same port as both the frame-sending port and the frame-receiving port of the status check frame.

According to the first aspect of the present invention, the first rule may select a different port from a last frame-sending port to send the status check frame last time, and the second rule may select a last frame-receiving port to receive the status check frame from the another network relay device last time.

In the network relay device of this aspect, the status check frame controller selects a different port from the last frame-sending port to send the status check frame last time among the ports connected in the first direction and sends a next status check frame from the selected port, while selecting a last frame-receiving port to receive the status check frame from the another network relay device last time among the ports connected in the second direction and sending a next status check frame from the selected port. This configuration changes the frame-sending port to be used to send a next status check frame, in order to avoid continuously using the same port as both the frame-sending port and the frame-receiving port of the status check frame.

According to the first aspect of the present invention, the network relay device may further include: a port record storage configured to store a record of the last frame-sending port to send the status check frame last time and a record of the last frame-receiving port to receive the status check frame from the another network relay device last time.

In the network relay device of this aspect, the status check frame controller refers to the record of the frame-sending port and the frame-receiving port stored in the port record storage, when selecting the port according to the first rule and selecting the port according to the second rule.

According to the first aspect of the present invention, the network relay device may form a Ring network, and the status check frame controller may send the status check frame from a port connected in a first direction of the Ring network and connected with one part of the physical lines constituting the virtual line, and the status check frame controller may send the status check frame from a port connected in a second direction of the Ring network, which is different from the first direction, and connected with another part of the physical lines, which does not overlap with the one part of the physical lines.

In the network relay device of this aspect, the status check frame controller sends the status check frame, in order to avoid continuously using the same port as the frame-sending port to send the status check frame in the first direction and the frame-receiving port to receive from the another network relay device the status check frame, which is sent in the second direction and is circulated in the Ring network.

According to the first aspect of the present invention, on occurrence of a failure in one of the physical lines constituting the virtual line, the status check frame controller may reselect the one part of the physical lines and the another part of the physical lines and send a next status check frame via the reselected one part of the physical lines and via the reselected another part of the physical lines.

In the network relay device of this aspect, the status check frame controller reselects the one part of the physical lines and the another part of the physical lines on the occurrence of a failure in one of the physical lines constituting the virtual line.

According to the first aspect of the present invention, the network relay device may further include: a Ring manager configured to generate the status check frame and control the status check frame controller to send the generated status check frame, when the status check frame sent by the status check frame controller is not received from the another network relay device within a preset period of time, the Ring manager estimates occurrence of a failure in the network and performs a specified rerouting process.

The network relay device of this aspect further includes the Ring manager configured to generate and send the status check frame, detect the occurrence of a failure in the network and perform the specified rerouting process. The network relay device can thus work as the master node in the Ring protocol.

The present invention may be actualized by diversity of applications other than the network relay device described above, for example, a corresponding network relay method, a network relay system, non-transitory medium to implement the functions of the device or the method or a storage medium, in which such a computer program is stored.

BRIEF DESCRIPTION OF THE DRAWINGS

FIG. 7 illustrates one example of the LA Ring mapping table;

FIG. 8 is a diagram illustrating one example of the LA management tables;

FIG. 9 is a diagram illustrating one example of the Health check sending/receiving management table;

FIG. 28 is a diagram illustrating one example of the Health check sending/receiving management table according to the second embodiment;

DESCRIPTION OF THE PREFERRED EMBODIMENT

Next, aspects of the present invention will be described in the following order on the basis of embodiments:

A. General Description (A-1) General Description of the Invention

Figure 1:
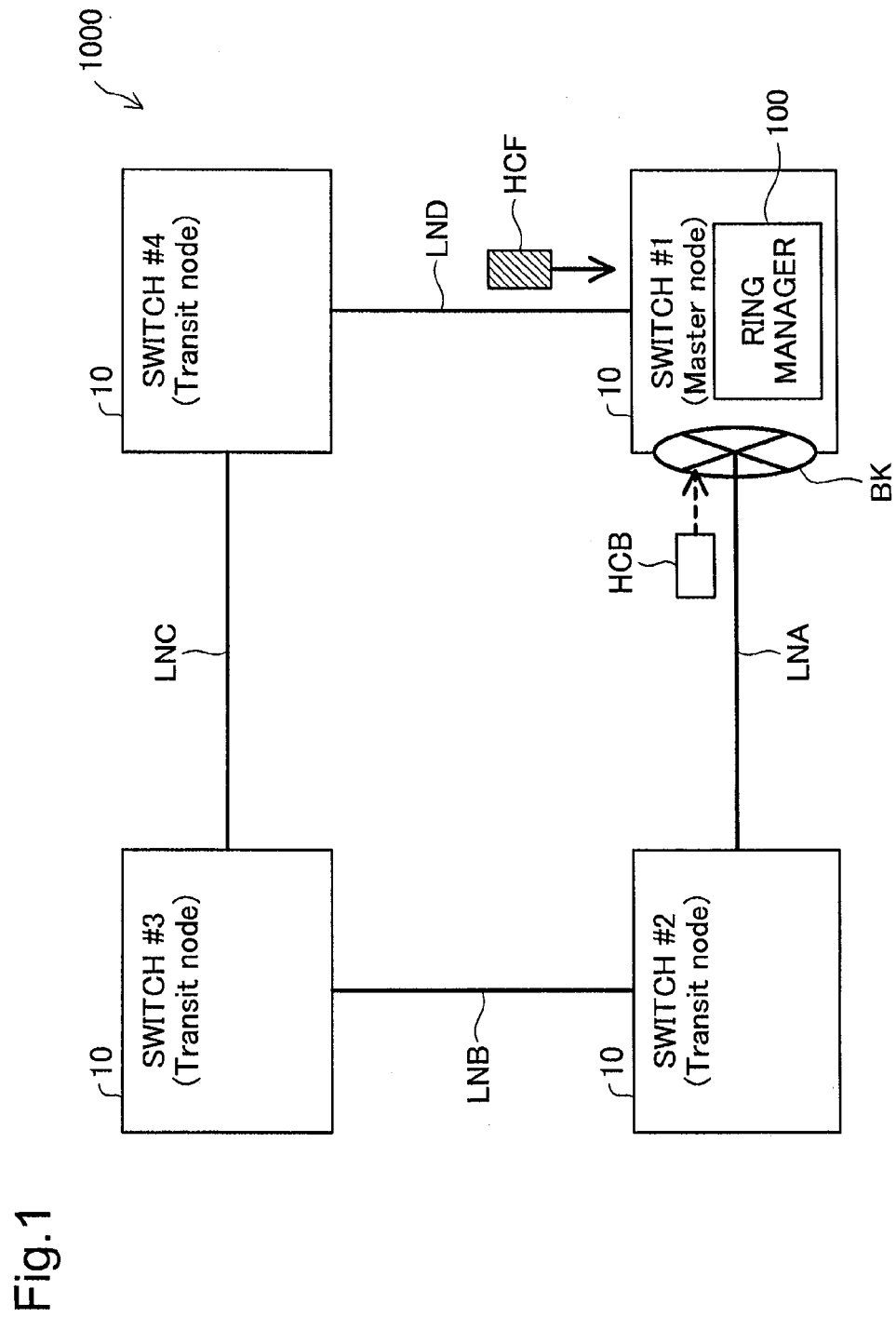
FIG. 1 is a diagram illustrating the general configuration of a network including network relay devices according to one embodiment of the invention.

FIG. 1 is a diagram illustrating the general configuration of a network 1000 including network relay devices according to one embodiment of the invention. The network 1000 includes four network relay devices 10 (#1 to #4). Each of the network relay devices 10 is constructed as a layer 2 switch and serves to relay a frame based on a MAC address. In the description hereinafter, the "network relay device" may be referred to as "switch". The switches are expressed like switches #1 and #2 when differentiation of the switches 10 is needed, while being expressed as "switch 10" when the general structure and operations of the switches are described. As a matter of convenience, other network relay devices, lines, terminals and constituents of the respective network relay devices that are not directly relevant to the description are omitted from the illustration of FIG. 1. This is true for the subsequent drawings.

The switches #1 and #2 are connected by a virtual line (described later in detail) LNA. Similarly, the switches #2 and #3 are connected by a virtual line LNB, the switches #3 and #4 are connected by a virtual line LNC, and the switches #4 and #1 are connected by a virtual line LND. The switches #1 to #4 accordingly constitute a Ring network. Each port provided in each switch for connecting with another switch to constitute the Ring network is called "Ring port".

In the Ring network, a Ring protocol is used to monitor the status of the network and change the communication path based on a change in monitored network status, for example, the occurrence of a failure or recovery from a failure. The Ring protocol specifies one of the switches included in the Ring network as Master node or Master node switch, while specifying the remaining switches as Transit nodes or Transit node switches. The Master node mainly works to monitor the status of the network and change the communication path as needed basis. In the illustrated example of FIG. 1, the switch #1 is specified as Master node, and the other switches #2 to #4 are specified as Transit nodes.

The Ring protocol sets one of the Ring ports in the Master node used for connecting with a specified switch, in a communicable state and sets the other Ring port used for connecting with another switch, in an incommunicable state, so as to prevent a frame from being looped in the Ring network. In the illustrated example of FIG. 1, one of the Ring ports in the switch #1 used for connecting with the switch #2 via the virtual line LNA is set in the incommunicable state or logically blocked state BK. In the example of FIG. 1, for example, a frame addressed from the switch #1 to the switch #2 is thus relayed through the route of the switch #1, the switch #4, the switch #3 and the switch #2. In the description hereinafter, the Ring port set in the communicable state is referred to as "Primary port", and the Ring port set in the incommunicable state or the logically blocked state BK is referred to as "Secondary port". The Primary port corresponds to the "port connected in the first direction" described in the claims, and the Secondary port corresponds to the "port connected in the second direction" described in the claims.

In the Ring protocol, a dedicated control frame called "Health check frame" is used to monitor the status of the Ring network. The Health check frame corresponds to the "status check frame" described in the claims. The Health check frame is generated by the Master node switch and is sent from both the Primary port and the Secondary port in the Master node switch. The Health check frame sent from the Master node switch is successively forwarded by the respective Transit node switches in the Ring network and is eventually returned to the Master node switch. In the illustrated example of FIG. 1, the Master node receives a Health check frame HCB sent from its Primary port and a Health check frame HCF sent from its Secondary port. The port in the logically blocked state BK is still capable of sending and receiving the Health check frame.

The Master node switch may estimate or detect the occurrence of a failure in the Ring network, when the Master node switch does not receive the Health check frame sent from itself within a predetermined period of time. After detection of a failure, the Master node switch changes the Ring port set in the logically blocked state BK to the communicable state and sends a Flush control frame to give an instruction for relearning of a MAC address to the respective switches. The Ring protocol logically eliminates the loop of the communication path in this manner.

Figure 2:
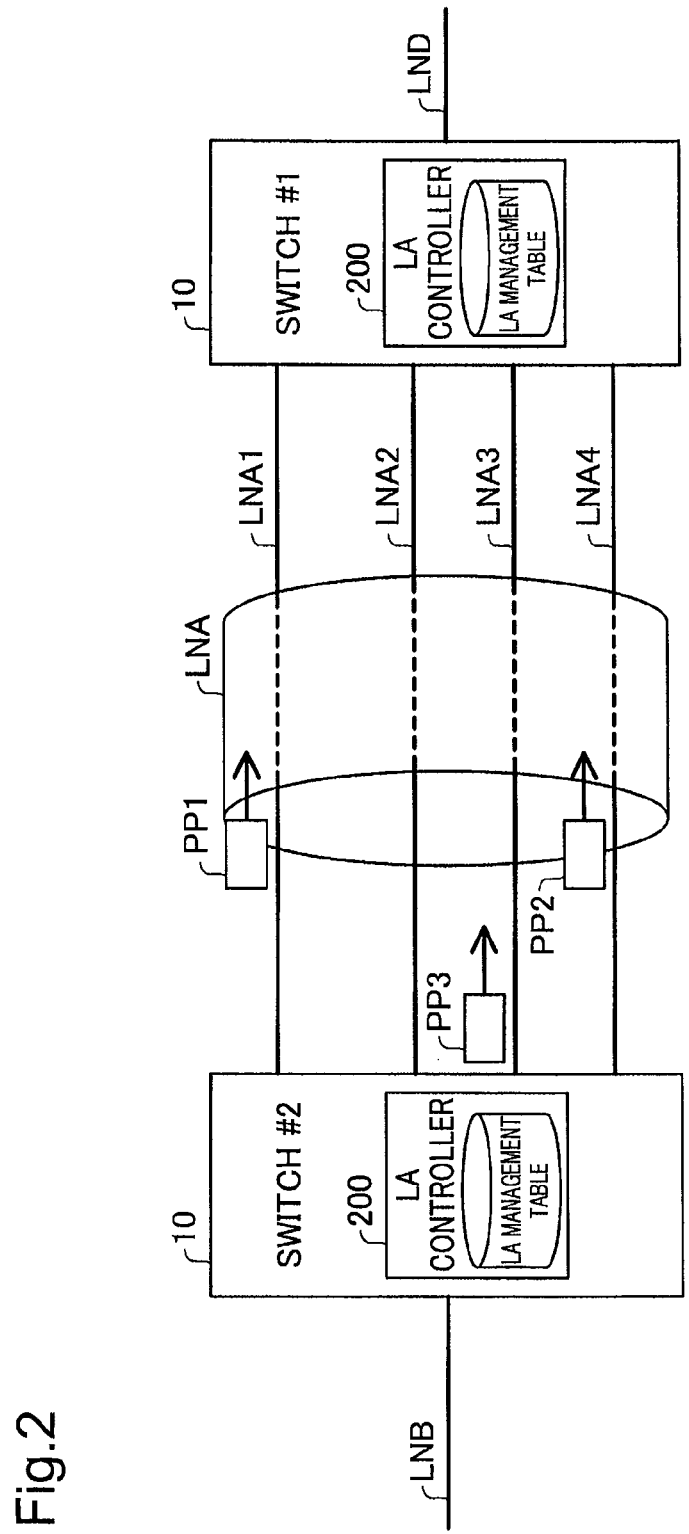
FIG. 2 is a diagram illustrating the virtual line.

FIG. 2 is a diagram illustrating the virtual line. The virtual line LNA between the switches #1 and #2 illustrated in FIG. 2 is described as an example. The switch 10 has an LA controller 200 to implement Link Aggregation (LA) function. The LA controller 200 corresponds to the "virtual line controller" described in the claims. The Link Aggregation is the function of bundling or aggregating multiple physical lines (physical ports) and treating the bundled physical lines (physical ports) as one virtual line (virtual port) and is used to extend the bandwidth and ensure the redundancy. In the illustrated example of FIG. 2, the LA controller 200 of the switch 10 serves to treat four physical lines LNA1 to LNA4 as one virtual line LNA and send frames PP1 to PP3 in a distributive manner through the four physical lines LNA1 to LNA4. The LA controller 200 includes an LA management table for storing assignment of the virtual line to the physical ports connecting with the physical lines. The details of the LA controller 200 and the LA management table will be described later.

Figure 3:
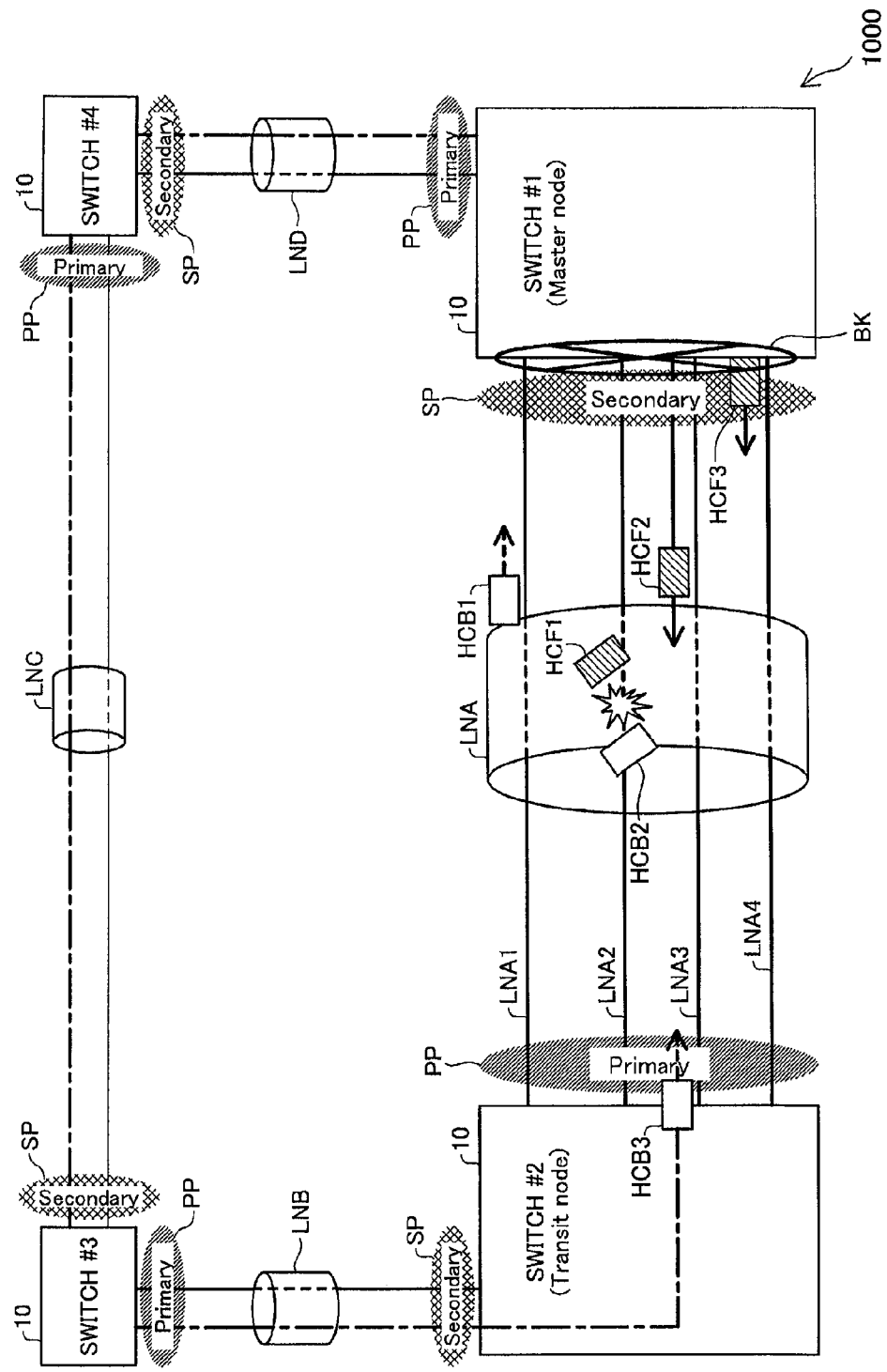
FIG. 3 is a diagram illustrating transmission of Health check frames.

FIG. 3 is a diagram illustrating transmission of Health check frames. The switch #1 specified as the Master node sends a Health check frame HCB from its Primary port PP and a Health check frame HCF from its Secondary port SP. The Health check frame HCB is relayed in the sequence of the switch #4, the switch #3 and the switch #2 to go through in the Ring network and is returned to the switch #1. The Health check frame HCF is relayed in the sequence of the switch #2, the switch #3 and the switch #4 to go through in the Ring network and is returned to the switch #1.

With respect to each of the switches #2 to #4 specified as the Transit node, a Ring port used for sending a frame received from the Primary port of the Master node to another switch is called "Primary port". Similarly, a Ring port used for sending a frame received from the Secondary port of the Master node to another switch is called "Secondary port".

The switch 10 according to the embodiment controls the transmission of Health check frames, in order to avoid the concentration of frames on any specific physical line of the virtual line and avoid using the same physical line for both sending and receiving frames at the same timing. In one concrete example, frames are sent and received by the physical lines of the virtual line LNA in the following manner:

at time t1: a Health check frame HCB1 by the physical line LNA1 and a Health check frame HCF1 by the physical line LNA2;

at time t2: a Health check frame HCB2 by the physical line LNA2 and a Health check frame HCF2 by the physical line LNA3; and at time t3: a Health check frame HCB3 by the physical line LNA3 and a Health check frame HCF3 by the physical line LNA4.

In this state, on the occurrence of a failure in the physical line LNA2, the Health check frame HCF1 and the Health check frame HCB2 set to go through the failed physical line LNA2 are discarded. The Health check frame HCB1 at the time t1 and the Health check frame HCF2 at the time t2 are, on the other hand, sent and received via the physical lines without failure.

In the network 1000 including the switches 10 (network relay devices) according to the embodiment, the port to be used to send a next Health check frame is changed, in order to avoid continuously using the same port as both the frame-sending port to send a Health check frame (status check frame) for use in checking the status of the network, which the switch 10 is connected with via the virtual line, and the frame-receiving port to receive a Health check frame from another switch 10. Even when a failure occurs in a specific physical line, the flow of the Health check frames at the above respective times continues without interruption. This configuration advantageously reduces false detection of a failure in the Ring network by the switch 10 as the Master node. As a result, this configuration prevents or at least reduces false detection of a failure in the virtual line by the network relay device (switch) configured to use the virtual line for making the physical lines redundant and to exchange control frames (Health check frames) for use in checking the status of the network with another network relay device.

(A-2) Comparative Example

Figure 4:
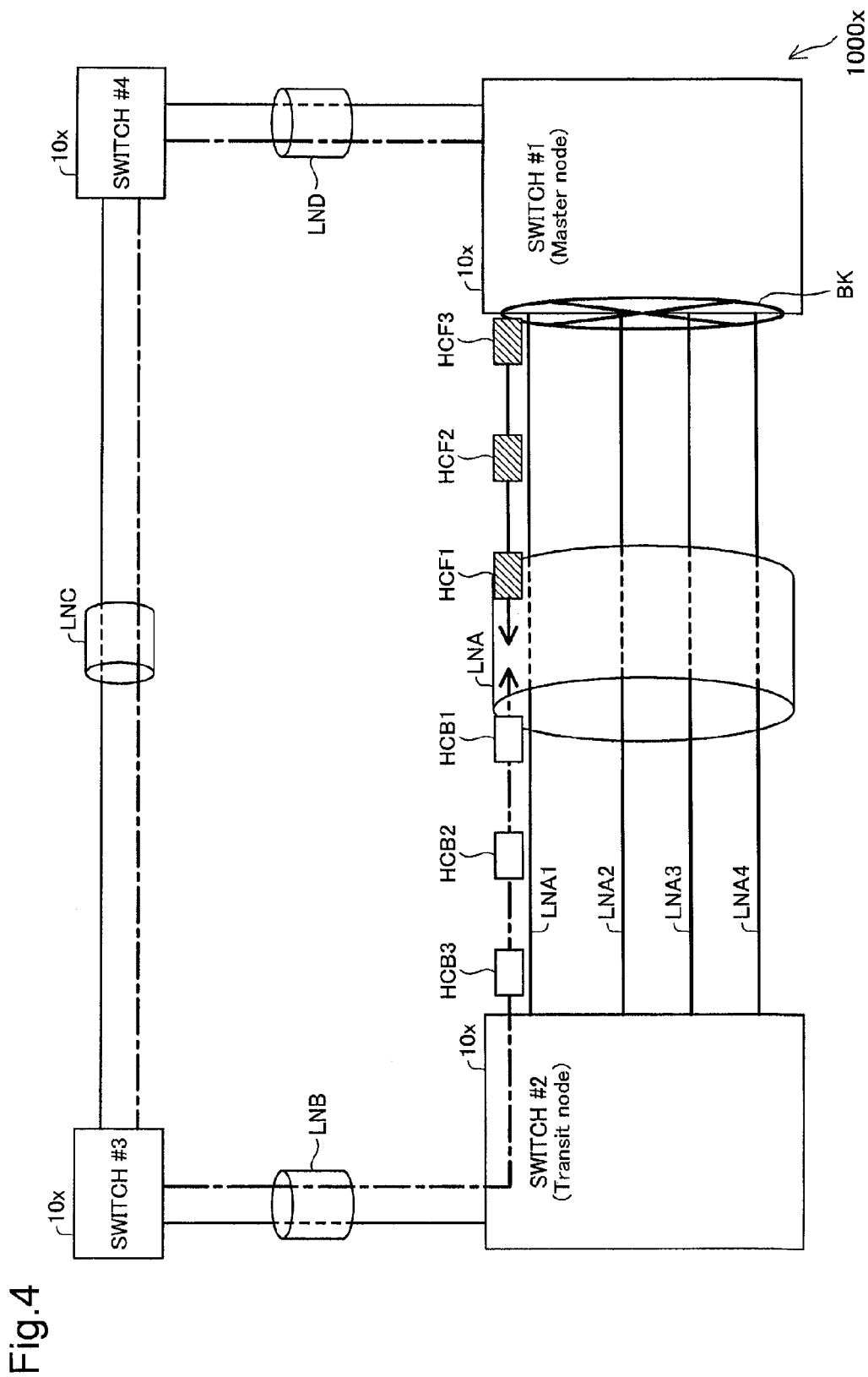
FIG. 4 is a diagram illustrating transmission of Health check frames in one comparative example.
Figure 5:
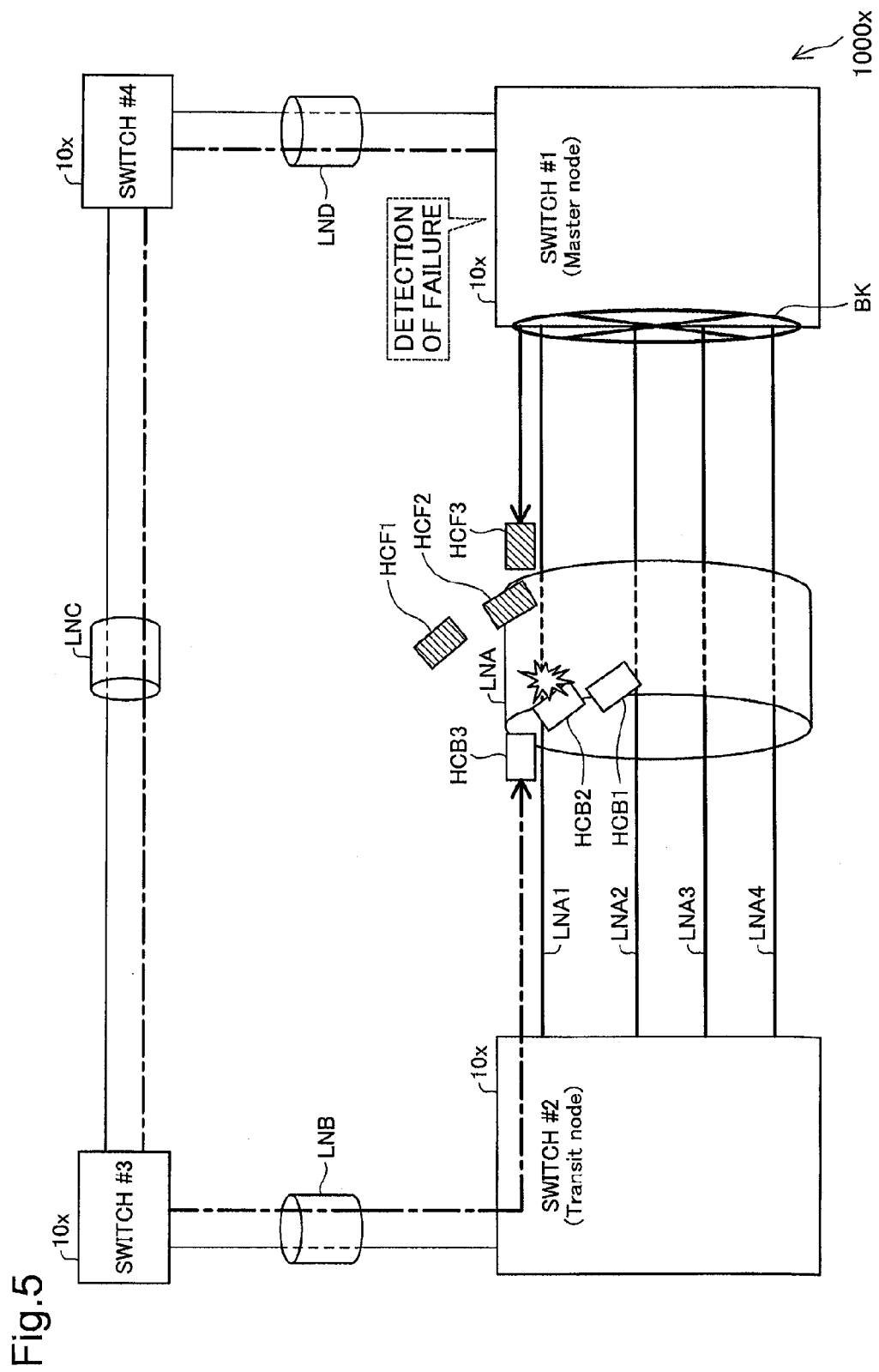
FIG. 5 is a diagram illustrating the occurrence of a failure in the comparative example.

FIG. 4 is a diagram illustrating transmission of Health check frames in one comparative example. FIG. 5 is a diagram illustrating the occurrence of a failure in the comparative example. A network 1000x of the comparative example includes fourth switches 10x of the comparative example (prior art). The connections of the respective switches and the virtual lines are similar to those described above with reference to FIGS. 1 to 3.

The switch #1 specified as the Master node sends a Health check frame HCB from its Primary port and a Health check frame HCF from its Secondary port. In the prior art configuration, random transmission of Health check frames may be concentrated on a specific physical line (in the illustrated example of FIG. 4, physical line LNA1) in the virtual line. In this state, on the occurrence of a failure on the physical line LNA1 as shown in FIG. 5, all Health check frames HCF1 to HCF3 and Health check frames HCB1 to HCB3 set to go through the failed physical line LNA1 are discarded. The switch #1 as the Master node can thus not receive any Health check frame HCB or HCF.

When the switch #1 has not received any Health check frame for a predetermined failure detection time, the switch #1 falsely detects the occurrence of a failure on the virtual line LNA as a whole, irrespective of no occurrence of a failure on the other physical lines LNA2 to LNA4. The switch #1 falsely detecting the occurrence of a failure changes the logically blocked state BK of the Ring port to the communicable state and sends a Flush control frame to the switches #2 to #4. The switches #1 to #4 then perform relearning of the communication path. In the comparative example (prior art configuration), the false detection of a failure by the Master node switch causes disadvantages, such as the unnecessary relearning of the communication path and the loop of a data frame by cancellation of the logically blocked state BK. Relearning the communication path requires flooding by the respective switches, which unnecessarily increases the network load.

One possible measure to avoid such false detection of a failure may set the failure detection time of the Ring protocol in the Master node switch to be longer than the failure detection time of the Link Aggregation. This, however, causes other disadvantages, i.e., the delayed detection of a failure and the longer incommunicable time of the network, when the virtual line is fully shut down (i.e., when failures occur on all the physical lines included in the virtual line).

B. First Embodiment (B-1) System Configuration

Figure 6:
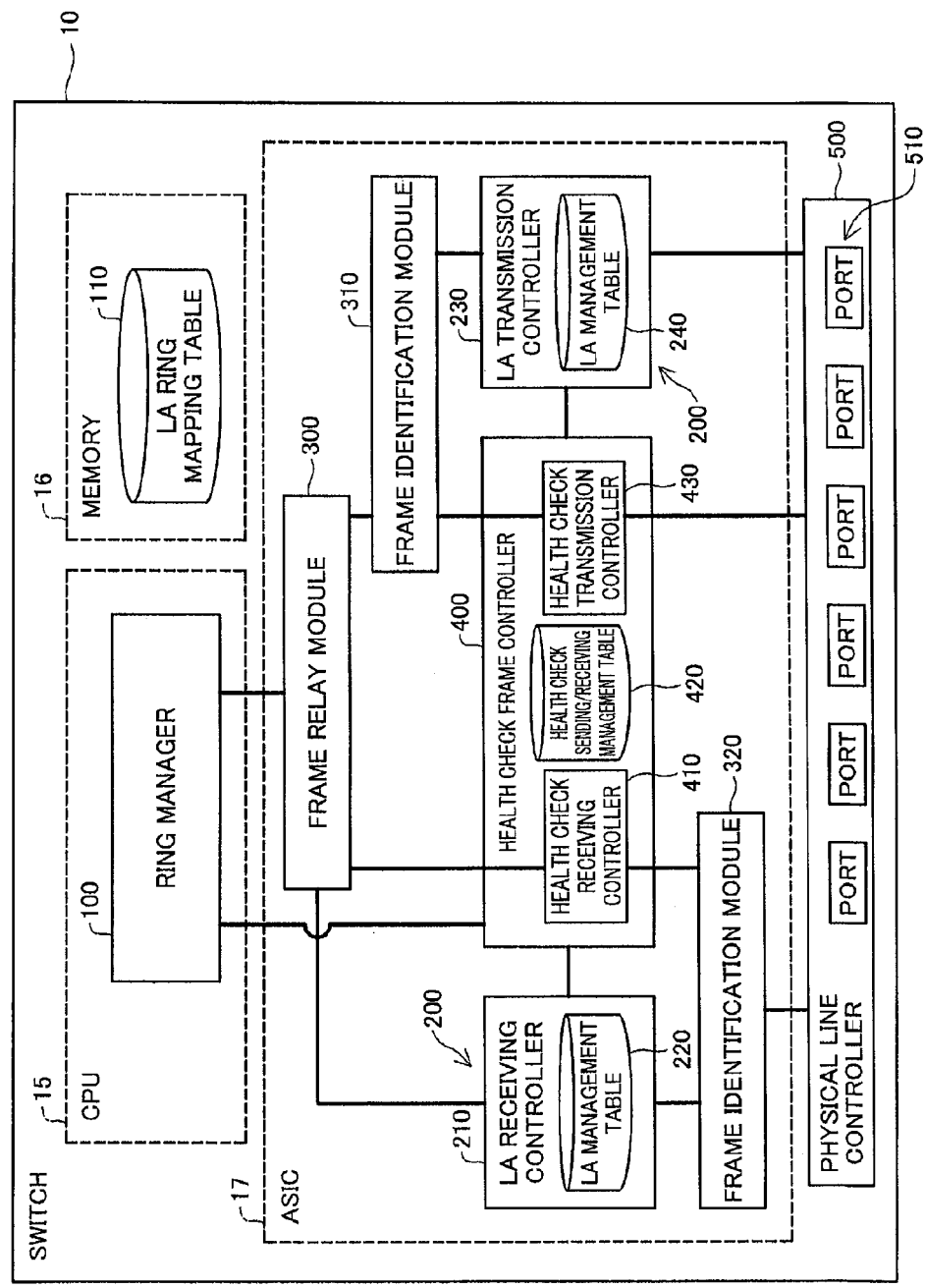
FIG. 6 is a diagram illustrating the general configuration of the switch according to one embodiment of the invention.

FIG. 6 is a diagram illustrating the general configuration of the switch 10 according to one embodiment of the invention.

The switch 10 includes a Ring manager 100, an LA Ring mapping table 110, an LA controller 200, a frame relay module 300, frame identification modules 310 and 320, a Health check frame controller 400 and a physical line controller 500. The Ring manager 100 and the LA Ring mapping table 110 are implemented by a CPU 15 and a memory 16. The LA controller 200, the frame relay module 300, the frame identification modules 310 and 320 and the Health check frame controller 400 are implemented by an ASIC (Application Specific Integrated Circuit) 17. The physical line controller 500 is constructed by a PHY chip.

The Ring manager 100 generates, sends and receives Health check frames according to the Ring protocol, in order to monitor the status of the network and change the communication path based on a change in network status, such as the occurrence of a failure or recovery from a failure. The CPU 15 executes a program installed in the switch 10 by using the memory 16 as its working area, so as to implement the functions of the Ring manager 100.

FIG. 7 illustrates one example of the LA Ring mapping table 110. The LA Ring mapping table 110 is used for control based on the Ring protocol in the Ring manager 100. The LA Ring mapping table 110 is created in advance by the configuration settings and is stored in the memory 16. The LA Ring mapping table 110 includes a Ring ID field, an LA ID field and a priority port information field.

The Ring ID field stores an identifier for identifying each Ring network, which the switch belongs to. The LA ID field stores an identifier for identifying each virtual line or Link Aggregation (LA) included in the Ring network identified by the Ring ID. The priority port information field stores the setting of "Primary" when the virtual line identified by the LA ID is used as the Primary port and the setting of "Secondary" when the virtual line is used as the Secondary port.

In the illustrated example of FIG. 7, the switch 10 is connected with two Ring networks with Ring ID 10 and Ring ID 20. The Ring network with Ring ID 10 has the Primary port connected with the virtual line identified by LA ID 1 and the Secondary port connected with the virtual line identified by LA ID 2.

Referring back to FIG. 6, the physical line controller 500 includes a plurality of physical ports 510. The physical ports 510 are respectively connected with network lines and are further connected with other switches and terminals via these network lines. The physical port 510 and the network line may collectively be referred to as "physical line". The physical line controller 500 serves to monitor the statuses of the respective physical lines and, in response to a change in status of any physical line, notify the Health check frame controller 400 of the status change. The physical line controller 500 also serves to forward a frame, which is received via the physical port 510, to the frame identification module 320. The physical line controller 500 further serves to send a frame, which is received from a Health check transmission controller 430 or an LA transmission controller 230 (described later), via the physical port 510.

The LA controller 200 includes an LA receiving controller 210, an LA management table 220, an LA transmission controller 230 and an LA management table 240. The LA management table 220 and the LA management table 240 are created to have identical contents.

FIG. 8 is a diagram illustrating one example of the LA management tables 220 and 240. The LA management tables 220 and 240 are used for Link Aggregation control by the LA controller 200. The LA management tables 220 and 240 are created in advance by the configuration settings and are stored respectively in the LA receiving controller 210 and in the LA transmission controller 230. Each of the LA management tables 220 and 240 includes an LA ID field and a physical port number field.

The LA ID field stores an identifier for identifying each virtual line or Link Aggregation (LA) set for the switch 10. The physical port number field stores an identifier of each physical port 510 allocated to the virtual line identified by the LA ID.

In the illustrated example of FIG. 8, four physical ports with physical port numbers 9, 10, 11 and 12 are allocated to the virtual line with LA ID 1. Two physical ports with physical port numbers 1 and 2 are allocated to the virtual line with LA ID 2.

The LA receiving controller 210 receives a frame via the frame identification module 320, updates the header information of the received frame and forwards the frame with the updated header information to the frame relay module 300. More specifically, the LA receiving controller 210 searches the LA management table 220 for the LA ID allocated to the physical port 510 that has received the frame, and adds the retrieved LA ID to the header information of the received frame. The LA transmission controller 230 receives a frame via the frame identification module 310, updates the header information of the received frame and forwards the frame with the updated header information to the physical line controller 500. More specifically, the LA transmission controller 230 searches the LA management table 240 for the physical port 510 having allocation of the LA ID included in the header information of the received frame, and adds the physical port number of the retrieved physical port 510 to the header information of the received frame.

Referring back to FIG. 6, the frame relay module 300 serves to relay a frame. More specifically, the frame relay module 300 forwards a frame, which is received via the LA receiving controller 210, to the frame identification module 310. Similarly, the frame relay module 300 forwards a frame, which is received via the Health check receiving controller 410, to the Ring manager 100. Additionally, the frame relay module 300 forwards a frame, which is received via the Ring manager 100, to the frame identification module 310. The frame identification module 310 performs frame receiving process (described later in detail) to identify and sort a frame received via the frame relay module 300. The frame identification module 320 performs frame receiving process (described later in detail) to identify and sort a frame received via the physical line controller 500.

The Health check frame controller 400 includes a Health check receiving controller 410, a Health check sending/receiving management table 420 and a Health check transmission controller 430. The Health check frame controller 400 corresponds to the "status check frame controller" described in the claims. The Health check sending/receiving management table 420 corresponds to the "port record storage" described in the claims. The Health check receiving controller 410 receives a frame via the frame identification module 320 and performs Health check frame receiving process (described later in detail) to update the contents of the Health check sending/receiving management table 420. The Health check transmission controller 430 receives a frame via the frame identification module 310 and performs Health check frame sending process (described later in detail) to update the contents of the Health check sending/receiving management table 420 and identify the transmission destination of the frame. The Health check frame controller 400 receives a notification of a change in status of the physical line from the physical line controller 500 and performs physical port status change process (described later in detail) to update the contents of the Health check sending/receiving management table 420.

FIG. 9 is a diagram illustrating one example of the Health check sending/receiving management table 420. The Health check sending/receiving management table 420 is used for various processes (i.e., Health check frame receiving process, Health check frame sending process and physical port status change process) performed by the Health check frame controller 400. The Health check sending/receiving management table 420 is created in advance on the basis of the LA Ring mapping table 110 and the LA management table 220 (240) and is updated during the various processes performed by the Health check frame controller 400. The Health check sending/receiving management table 420 includes a Ring ID field, an LA ID field, a physical port number field, a priority port information field, a physical port status field, a sending flag field and a receiving flag field.

The contents of the LA Ring mapping table 110 in combination with the contents of the LA management table 220 (240) are stored in the Ring ID field, the LA ID field, the physical port number field and the priority port information field. The physical port status field stores the status of the physical line 510 identified by the physical port number, based on the notification from the physical line controller 500. The setting of "Up" indicates that the physical line is normal and is in the communicable state. The setting of "Down" indicates that the physical line has a failure and is in the incommunicable state.

The sending flag field stores the last setting of the port when the port was used last time by the switch 10 to send a Health check frame. The default setting of the sending flag is "off". The setting of "on" is stored in the sending flag field, when a Health check frame is sent via the corresponding physical line 510 identified by the physical port number during the Health check frame sending process (described later). The receiving flag field stores the last setting of the port when the port was used last time by the switch 10 to receive a Health check frame from another switch. The default setting of the receiving flag is "off". The setting of "on" is stored in the receiving flag field, when a Health check frame is received via the corresponding physical line 510 identified by the physical port number during the Health check frame receiving process (described later). According to this embodiment, the settings in the physical port status field, the sending flag field and the receiving flag field are occasionally updated by the respective processes described below.

(B-2) Frame Receiving Process

Figure 10:
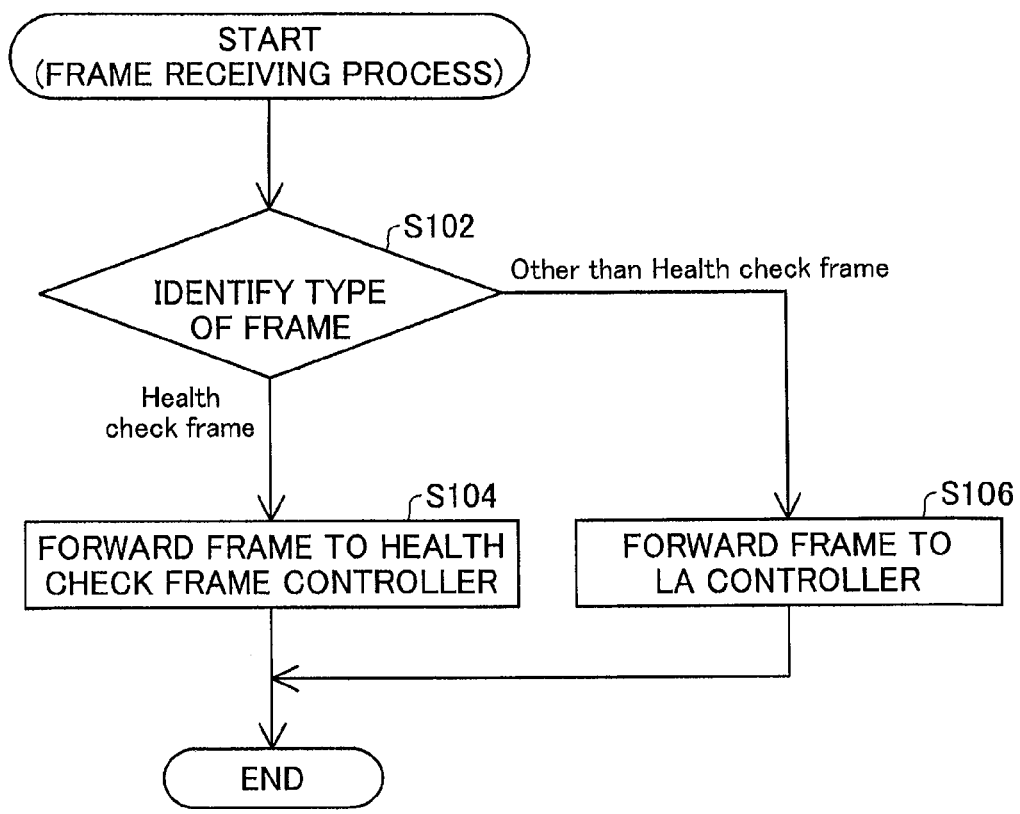
FIG. 10 is a flowchart showing a procedure of frame receiving process.

FIG. 10 is a flowchart showing a procedure of frame receiving process. When the frame identification module 310 receives a frame via the frame relay module 300 or when the frame identification module 320 receives a frame via the physical line controller 500, the frame receiving process is performed to identify and sort the received frame. FIG. 10 describes the processing flow by the frame identification module 320 as an example.

When receiving a frame, the frame identification module 320 refers to the header information of the received frame to identify the type of the received frame (step S102). When the received frame is identified as a Health check frame, the frame identification module 320 forwards the received frame to the Health check receiving controller 410 of the Health check frame controller 400 (step S104) and terminates the frame receiving process. When the received frame is identified as a frame other than the Health check frame, on the other hand, the frame identification module 320 forwards the received frame to the LA receiving controller 210 of the LA controller 200 (step S106) and terminates the frame receiving process.

During the frame receiving process, the frame identification module 310 forwards the received frame to the Health check transmission controller 430 of the Health check frame controller 400 at step S104, while forwarding the received frame to the LA transmission controller 230 of the LA controller 200 at step S106.

(B-3) Health Check Frame Receiving Process

Figure 11:
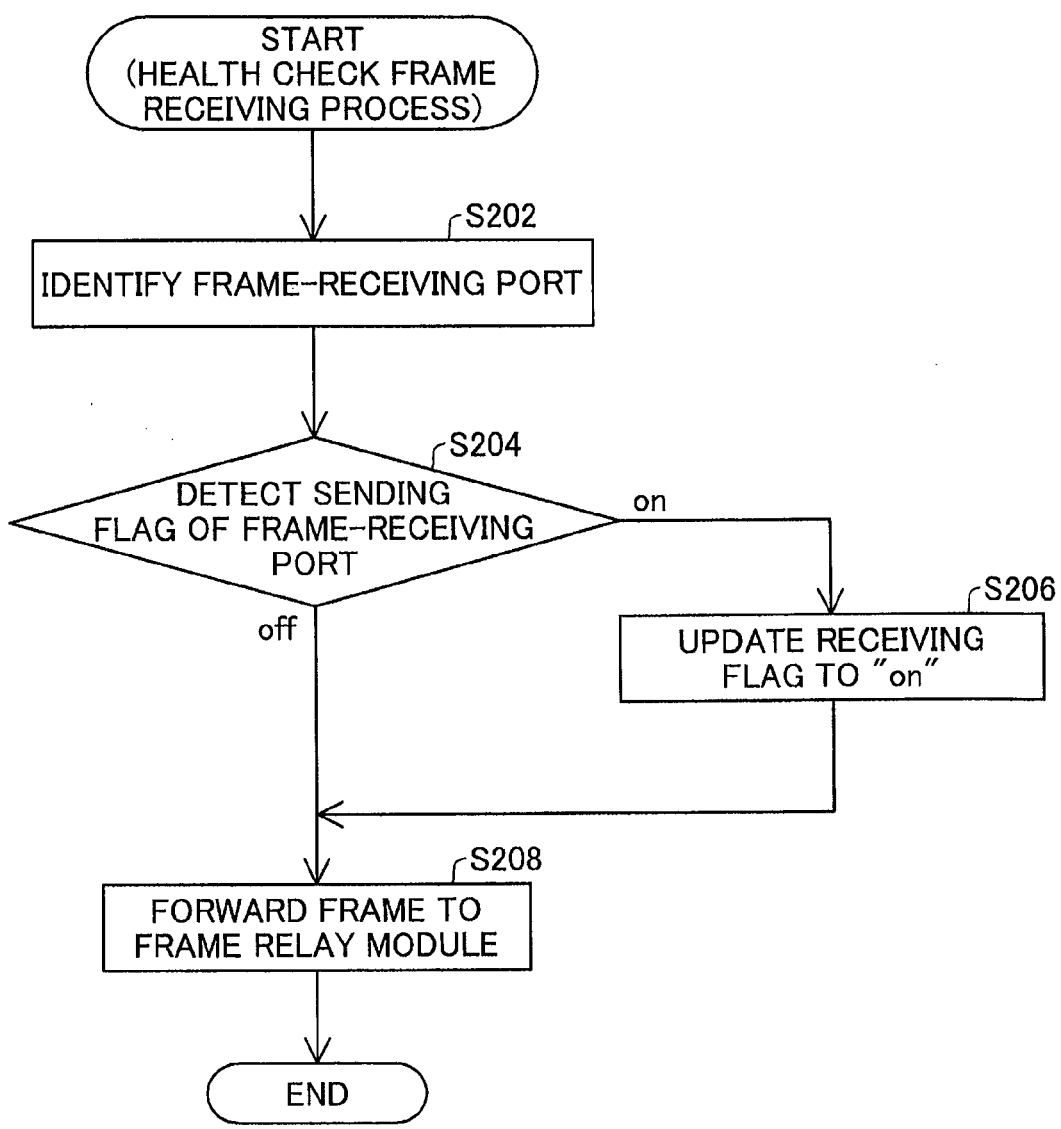
FIG. 11 is a flowchart showing a procedure of Health check frame receiving process.

FIG. 11 is a flowchart showing a procedure of Health check frame receiving process. The Health check frame receiving process is performed when the Health check receiving controller 410 of the Health check frame controller 400 receives a frame.

When receiving a frame, the Health check receiving controller 410 refers to the header information of the received frame to identify the frame-receiving port (step S202). The Health check receiving controller 410 subsequently detects the sending flag of the identified frame-receiving port (step S204). More specifically, the Health check receiving controller 410 searches the Health check sending/receiving management table 420 with the frame-receiving port identified at step S202 as a key and detects the sending flag set in the matching entry. When the sending flag set in the matching entry is "on" (step S204: "on"), the Health check receiving controller 410 updates the setting of the receiving flag to "on" in the matching entry (step S206) and goes to step S208. When the sending flag set in the matching entry is "off" (step S204: "off"), on the other hand, the Health check receiving controller 410 goes to step S208. The Health check receiving controller 410 forwards the received frame to the frame relay module 300 at step S208 and terminates the Health check frame receiving process.

(B-4) Health Check Frame Sending Process

Figure 12:
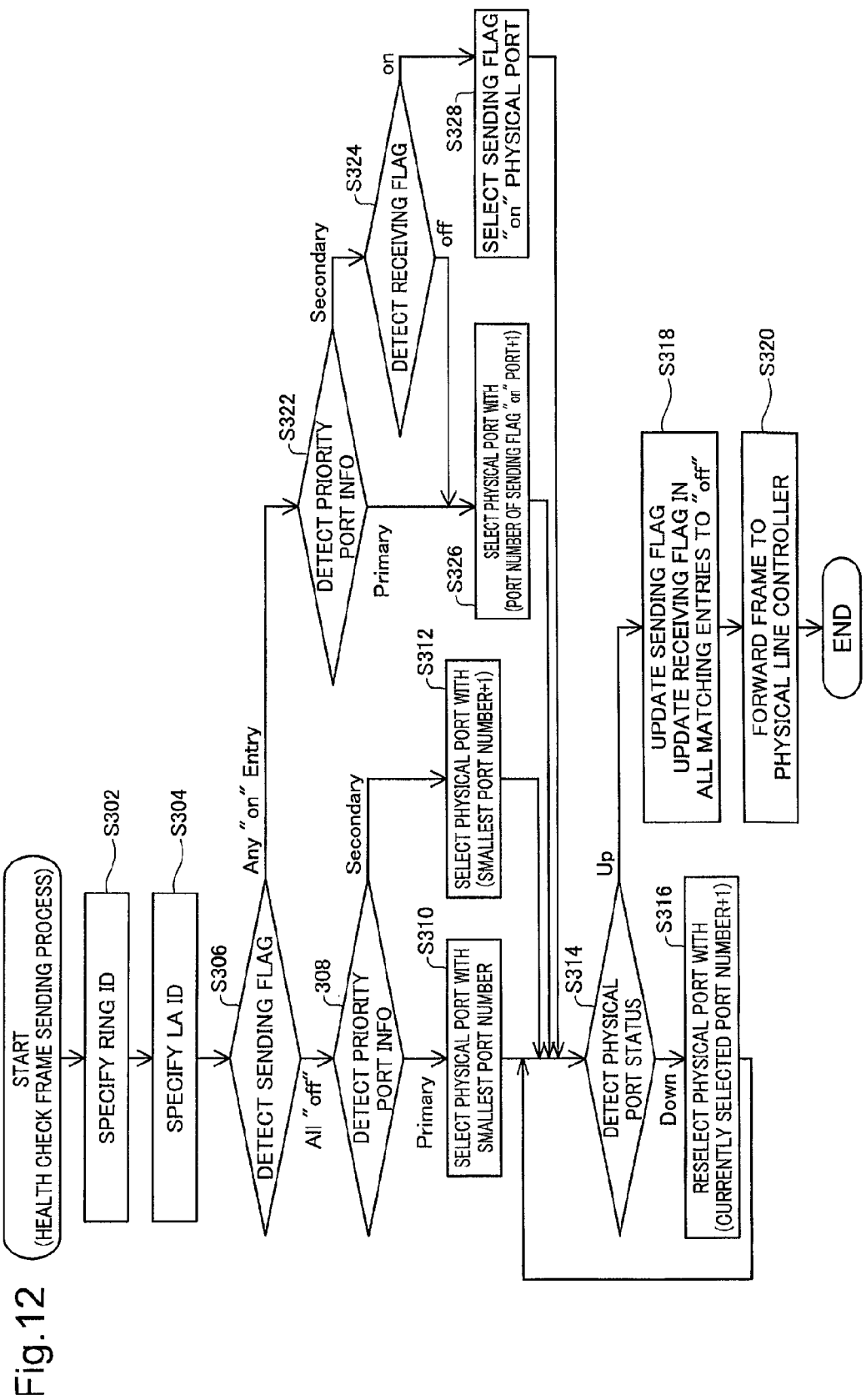
FIG. 12 is a flowchart showing a procedure of Health check frame sending process.

FIG. 12 is a flowchart showing a procedure of Health check frame sending process. The Health check frame sending process is performed when the Health check transmission controller 430 of the Health check frame controller 400 receives a frame.

When receiving a frame, the Health check transmission controller 430 refers to the header information of the received frame to specify the Ring ID of the received frame (step S302). When generating a Health check frame, the Ring manager 100 of the Master node switch allocates and adds a Ring ID to the header information of the Health check frame. The Health check transmission controller 430 also refers to the header information of the received frame to specify the LA ID (step S304). The Health check transmission controller 430 subsequently detects the settings of the sending flag in the matching entries identified by the combination of the specified Ring ID and the specified LA ID (step S306). More specifically, the Health check transmission controller 430 searches the Health check sending/receiving management table 420 with the Ring ID specified at step S302 and the LA ID specified at step S304 as keys and determines whether there is any entry having the setting of "on" in the sending flag field among the matching entries.

When there is no entry having the setting of "on" in the sending flag field among the matching entries (step S306: All "off"), this means that a Health check frame is sent for the first time on the virtual line identified by the LA ID (i.e., current frame transmission is the first time). In this case, the Health check transmission controller 430 subsequently detects the priority port information (step S308). More specifically, the Health check transmission controller 430 reads out the priority port information set in the matching entries identified by the LA ID (as the search result of step S306).

When the priority port information set in the matching entries is "Primary" (step S308: Primary), the Health check transmission controller 430 selects the physical port with the smallest number (i.e., the smallest physical port number when the physical port numbers are sorted in the ascending order) among the matching entries identified by the LA ID (as the search result of step S306) (step S310) and goes to step S314. When the priority port information set in the matching entries is "Secondary" (step S308: Secondary), on the other hand, the Health check transmission controller 430 selects the physical port with the physical port number equal to the (smallest number+1) (i.e., the second smallest physical port number when the physical port numbers are sorted in the ascending order) among the matching entries identified by the LA ID (as the search result of step S306) (step S312) and goes to step S314.

At step S314, the Health check transmission controller 430 detects the physical port status of the selected physical port. More specifically, the Health check transmission controller 430 searches the Health check sending/receiving management table 420 with the selected physical port number as a key and detects the physical port status set in the matching entry.

When the physical port status of the selected physical port is "Down" that indicates the incommunicable state (step S314: Down), the Health check transmission controller 430 reselects the physical port with the physical port number equal to the (currently selected port number+1) (step S316). More specifically, the Health check transmission controller 430 sorts the matching entries identified by the LA ID (as the search result of step S306) in the ascending order of the physical port numbers and reselects the physical port with the physical port number next to the currently selected physical port number. After the reselection at step S316, the Health check transmission controller 430 goes back to step S314. When the currently selected physical port number is the largest number (i.e., largest physical port number when the physical port numbers are sorted in the ascending order) among the matching entries identified by the LA ID (as the search result of step S306), the Health check transmission controller 430 reselects the physical port with the smallest number (i.e., the smallest physical port number when the physical port numbers are sorted in the ascending order) at step S316.

When the physical port status of the selected physical port is "Up" that indicates the communicable state (step S314: Up), on the other hand, the Health check transmission controller 430 updates the settings of the sending flag and the receiving flag (step S318). More specifically, the Health check transmission controller 430 updates the setting of the sending flag field to "on" in the matching entry having the selected physical port number (as the search result of step S314). The Health check transmission controller 430 also updates the settings of the sending flag field to "off" in all the matching entries identified by the combination of the Ring ID and the LA ID, other than the matching entry having the selected physical port number. Additionally, the Health check transmission controller 430 updates the settings of the receiving flag field to "off" in all the matching entries identified by the LA ID (as the search result of step S306). The Health check transmission controller 430 then forwards the received frame to the physical line controller 500 (step S320) and terminates the Health check frame sending process.

When there is any entry having the setting of "on" in the sending flag field among the matching entries (step S306: Any "on" Entry), this means that a Health check frame has been sent previously on the virtual line identified by the LA ID (i.e., current frame transmission is the second time or the subsequent time). In this case, the Health check transmission controller 430 detects the priority port information (step S322). The details of the detection at step S322 are identical with those of the detection at step S308.

When the priority port information set in the matching entries is "Primary" (step S322: Primary), the Health check transmission controller 430 selects the physical port with the physical port number equal to the (port number of the sending flag "on" port+1) (step S326). More specifically, the Health check transmission controller 430 sorts the matching entries identified by the LA ID (as the search result of step S306) in the ascending order of the physical port numbers and selects the physical port with the physical port number next to the physical port number of the sending flag "on" entry. The Health check transmission controller 430 then goes to step S314, in order to send a frame from the selected physical port. When the physical port number of the sending flag "on" port is the largest number (i.e., largest physical port number when the physical port numbers are sorted in the ascending order) among the matching entries identified by the LA ID (as the search result of step S306), the Health check transmission controller 430 selects the physical port with the smallest number (i.e., the smallest physical port number when the physical port numbers are sorted in the ascending order) at step S326.

When the priority port information set in the matching entries is "Secondary" (step S322: Secondary), the Health check transmission controller 430 detects the receiving flag of the sending flag "on" physical port (step S324). More specifically, the Health check transmission controller 430 detects the receiving flag set in the sending flag "on" entry among the matching entries identified by the LA ID (as the search result of step S306). When the receiving flag of the sending flag "on" port is "off" (step S324: "off"), the Health check transmission controller 430 goes to step S326. When the receiving flag of the sending flag "on" port is "on" (step S324: "on"), on the other hand, the Health check transmission controller 430 selects the physical port with the physical port number set in the sending flag "on" entry (step S328) and then goes to step S314, in order to send a frame from the selected physical port.

(B-5) Physical Port Status Change Process

Figure 13:
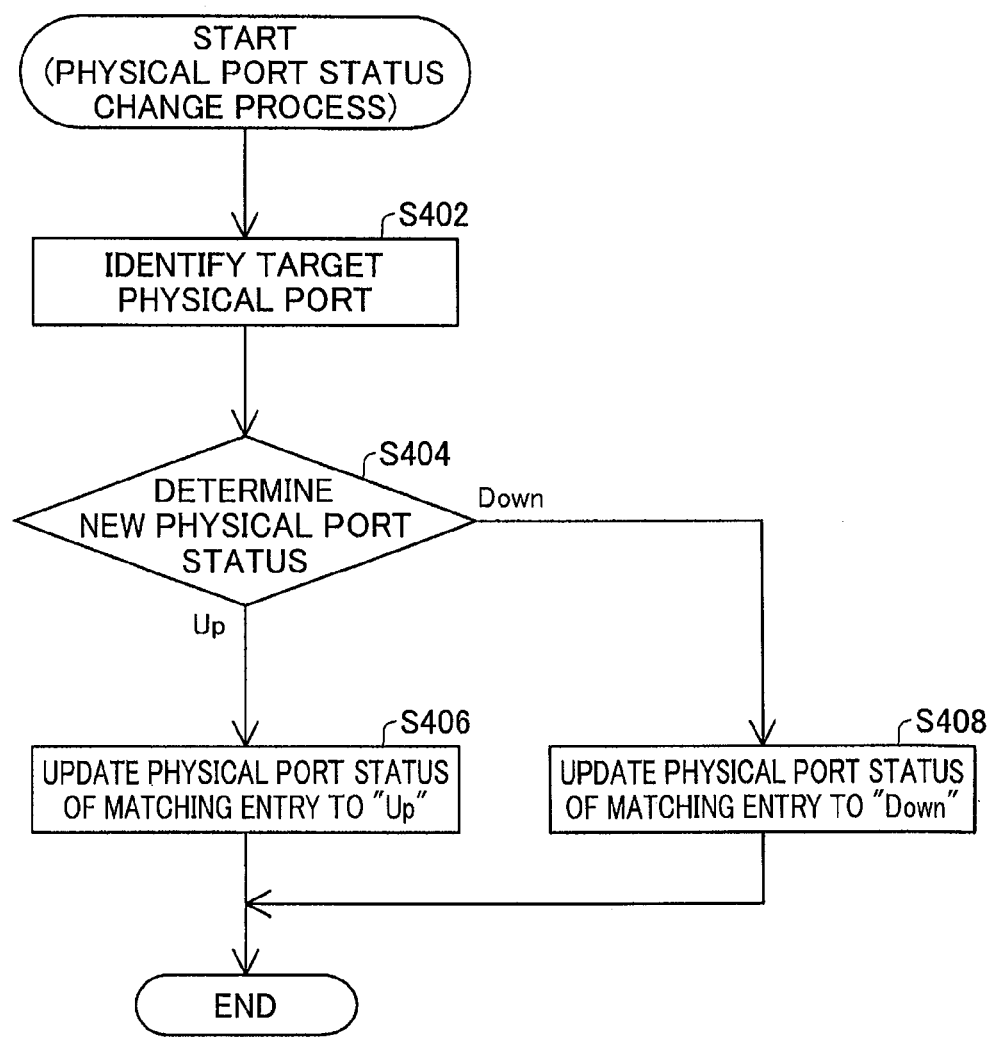
FIG. 13 is a flowchart showing a procedure of physical port status change process.

FIG. 13 is a flowchart showing a procedure of physical port status change process. The physical port status change process is performed every time the Health check frame controller 400 receives a notification of a change in status of a physical line from the physical line controller 500.

The Health check frame controller 400 refers to the notification from the physical line controller 500 to identify the target physical port connecting with the physical line having a status change (step S402). The Health check frame controller 400 subsequently determines the new setting of the physical port status, based on the notification from the physical line controller 500 (step S404). More specifically, the Health check frame controller 400 determines "Up" as the new setting of the physical port status when the notification shows a change in status of a failed physical line to the normal state, while determining "Down" as the new setting of the physical port status when the notification shows the occurrence of a failure in a physical line.

When the determination result is "Up" (step S404: Up), the Health check frame controller 400 searches the Health check sending/receiving management table 420 with the physical port number of the target physical port identified at step S402 as a key and updates the setting of the physical port status in the matching entry to "Up" (step S406). When the determination result is "Down" (step S404: Down), on the other hand, the Health check frame controller 400 searches the Health check sending/receiving management table 420 with the physical port number of the target physical port identified at step S402 as a key and updates the setting of the physical port status in the matching entry to "Down" (step S408). The Health check frame controller 400 then terminates the physical port status change process.

(B-6) Operations

The following describes sending and receiving Health check frames in the network 1000 including the switches 10. The following description is specifically focused on the switches #1 and #2 and the virtual line LNA interconnecting these switches #1 and #2 in the network 1000 shown in FIG. 1. The switches #1 to #4 are constructed to have the similar configurations and the similar operations, except that the switch #1 behaves as the Master node and the switches #2 to #4 behave as the Transit nodes. Accordingly, the frame-related operations at the Secondary port in the switch 10 are described with respect to the switch #1, and the frame-related operations at the Primary port in the switch 10 are described with respect to the switch #2. For convenience of explanation, the respective constituents of the switch #2 are expressed by addition of the suffix "p" to the numerals allocated to the corresponding constituents of the switch #1. The configuration and the operations shown in FIG. 14 are similarly applicable to between the switches #2 and #3, between the switches #3 and #4 and between the switches #4 and #1.

(B-6-1) Time t1 (State 1 Before Occurrence of Failure)

Figure 14:
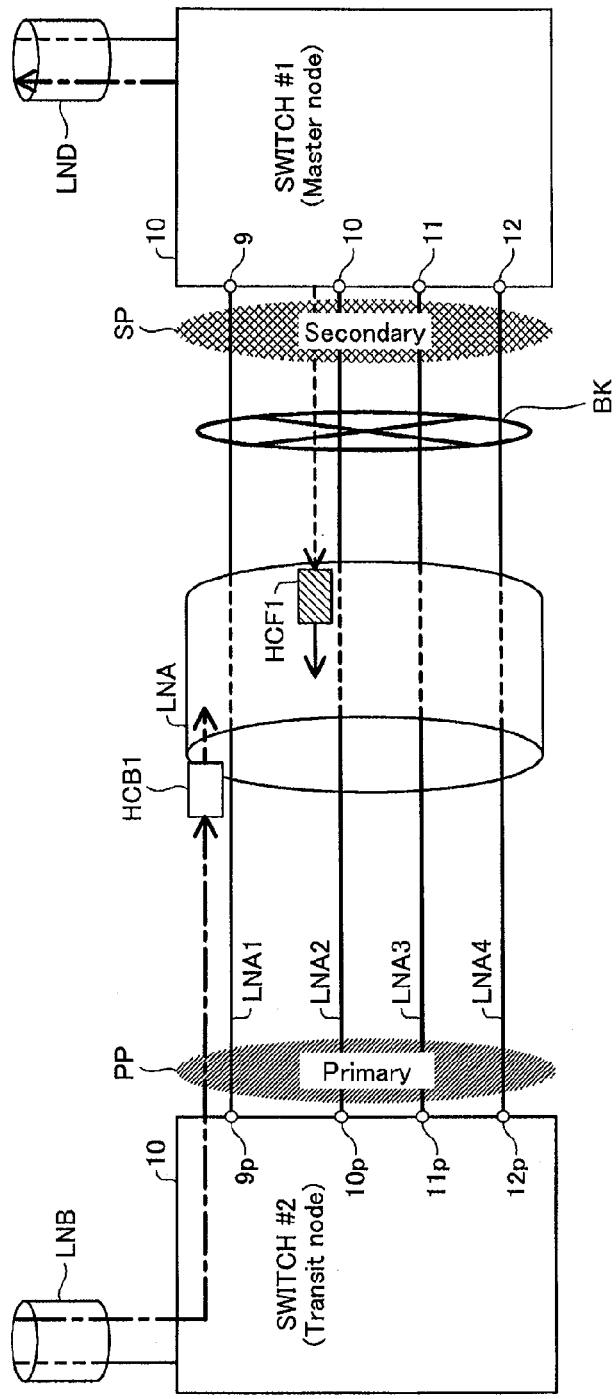
FIG. 14 is a diagram illustrating the state where transmission and reception of Health check frames starts in the network.

FIG. 14 is a diagram illustrating the state where transmission and reception of Health check frames starts in the network 1000. The upper half of FIG. 14 shows the general configuration of the switches #1 and #2 and the virtual line LNA. The lower half of FIG. 14 shows part of the Health check sending/receiving management tables 420 included in the respective switches #1 and #2.

A physical line LNA1 of the virtual line LNA is connected with a port having a physical port number 9 correlated to the Ring ID 10 and the LA ID 1 of the switch #1 and with a port having a physical port number 9p correlated to the Ring ID 10 and the LA ID 1 of the switch #2. Similarly, a physical line LNA2 is connected with a port having a physical port number 10 correlated to the Ring ID 10 and the LA ID 1 of the switch #1 and with a port having a physical port number 10p correlated to the Ring ID 10 and the LA ID 1 of the switch #2. A physical line LNA3 is connected with a port having a physical port number 11 correlated to the Ring ID 10 and the LA ID 1 of the switch #1 and with a port having a physical port number 11p correlated to the Ring ID 10 and the LA ID 1 of the switch #2. A physical line LNA4 is connected with a port having a physical port number 12 correlated to the Ring ID 10 and the LA ID 1 of the switch #1 and with a port having a physical port number 12p correlated to the Ring ID 10 and the LA ID 1 of the switch #2. The physical ports 9 to 12 of the switch #1 connecting with the virtual line LNA are Secondary ports that are incapable of sending ordinary frames (i.e., in the logically blocked state BK). The physical ports 9p to 12p of the switch #2 connecting with the virtual line LNA are Primary ports that are capable of sending ordinary frames.

The following describes sending a Health check frame HCF1 with the Ring ID 10 from a Secondary port of the switch #1 to the switch #2 at a time t1 shown in FIG. 14.

The Ring manager 100 of the switch #1 specified as the Master node generates a Health check frame HCF1 with the Ring ID 10. The generated Health check frame HCF1 is relayed by the frame relay module 300 and is forwarded to the frame identification module 310. When receiving the Health check frame HCF1, the frame identification module 310 performs the frame receiving process (FIG. 10). Since the received frame is identified as a Health check frame at the frame type identification in the frame receiving process (step S102: Health check frame, FIG. 10), the frame identification module 310 forwards the received frame to the Health check transmission controller 430 of the switch #1 (step S104).

When receiving the Health check frame HCF1, the Health check transmission controller 430 performs the Health check frame sending process (FIG. 12). The Health check transmission controller 430 refers to the information of "Ring ID 10 and LA ID 1" registered in the header of the received frame and performs the sending flag detection (step S306, FIG. 12). Since the sending flag is "off" in all the entries E11 to E14 having the Ring ID 10 and the LA ID 1 in the Health check sending/receiving management table 420 of the switch #1 at the time t1 (step S306: All "off"), the Health check transmission controller 430 subsequently detects the priority port information (step S308). The priority port information set in the matching entries identified by the combination of the Ring ID 10 and the LA ID 1 is "Secondary" in the Health check sending/receiving management table 420 (step S308: Secondary), so that the Health check transmission controller 430 selects the physical port with the physical port number equal to the (smallest number+1), i.e., the physical port number 10 (step S312).

The Health check transmission controller 430 subsequently detects the physical port status of the selected physical port number 10 (step S314). The physical port status of the physical port number 10 is "Up" in the entry E12 of the Health check sending/receiving management table 420 of the switch #1 (step S314: Up). The Health check transmission controller 430 then updates the setting of the sending flag in the entry E12 from "off" to "on", while updating the settings of the receiving flag in all the entries E11 to E14 to "off" (step S318). The Health check transmission controller 430 subsequently forwards the Health check frame HCF1 to the physical line controller 500. The Health check frame HCF1 forwarded to the physical line controller 500 is sent from the selected physical port with the physical port number 10 via the physical line LNA2 to the switch #2.

The following describes sending a Health check frame HCB1 with the Ring ID 10 from a Primary port of the switch #2 to the switch #1 at the time t1 shown in FIG. 14.

The physical line controller 500$p$ of the switch #2 receives a Health check frame HCB1 from another Transit node and forwards the received Health check frame HCB1 to the frame identification module 320$p$. When receiving the Health check frame HCB1, the frame identification module 320$p$ performs the frame receiving process (FIG. 10). Since the received frame is identified as a Health check frame at the frame type identification in the frame receiving process (step S102: Health check frame, FIG. 10), the frame identification module 320$p$ forwards the received frame to the Health check receiving controller 410$p$ (step S104).

When receiving the Health check frame HCB1, the Health check receiving controller 410$p$ performs the Health check frame receiving process (FIG. 11) and forwards the received frame to the frame relay module 300$p$. The Health check frame HCB1 is relayed by the frame relay module 300$p$ and is forwarded to the frame identification module 310$p$.

When receiving the Health check frame HCB1, the frame identification module 310$p$ performs the frame receiving process (FIG. 10). Since the received frame is identified as a Health check frame at the frame type identification in the frame receiving process (step S102: Health check frame, FIG. 10), the frame identification module 310$p$ forwards the received frame to the Health check transmission controller 430$p$ (step S104).

When receiving the Health check frame HCB1, the Health check transmission controller 430$p$ performs the Health check frame sending process (FIG. 12). The Health check transmission controller 430$p$ refers to the information of "Ring ID 10 and LA ID 1" registered in the header of the received frame and performs the sending flag detection (step S306, FIG. 12). Since the sending flag is "off" in all the entries E21 to E24 having the Ring ID 10 and the LA ID 1 in the Health check sending/receiving management table 420$p$ of the switch #2 at the time t1 (step S306: All "off"), the Health check transmission controller 430$p$ subsequently detects the priority port information (step S308). The priority port information set in the matching entries identified by the combination of the Ring ID 10 and the LA ID 1 is "Primary" in the Health check sending/receiving management table 420$p$ (step S308: Primary), so that the Health check transmission controller 430$p$ selects the physical port with the smallest physical port number, i.e., the physical port number 9p (step S310).

The Health check transmission controller 430$p$ subsequently detects the physical port status of the selected physical port number 9p (step S314). The physical port status of the physical port number 9p is "Up" in the entry E21 of the Health check sending/receiving management table 420$p$ of the switch #2 (step S314: Up). The Health check transmission controller 430$p$ then updates the setting of the sending flag in the entry E21 from "off" to "on", while updating the settings of the receiving flag in all the entries E21 to E24 to "off" (step S318). The Health check transmission controller 430$p$ subsequently forwards the Health check frame HCB1 to the physical line controller 500$p$. The Health check frame HCB1 forwarded to the physical line controller 500$p$ is sent from the selected physical port with the physical port number 9p via the physical line LNA1 to the switch #1.

Series of processing performed by the switch #1 or the switch #2 after reception of the Health check frame will be described later in detail.

As described above, at the time t1 when transmission of Health check frames starts, the physical port with the smallest physical port number is used to send the Health check frame HCB1 from the Primary port. The physical port with the physical port number equal to the (smallest number+1), i.e., the second smallest physical port number, is used to send the Health check frame HCF1 from the Secondary port. In this manner, different physical lines among the physical lines constituting the virtual line are used for sending and receiving Health check frames for the first time between the switches 10. Additionally, the setting of "on" is stored in the sending flag field of the frame-sending port used to send the Health check frame to another switch 10, in the Health check sending/receiving management table 420 of each switch 10.

(B-6-2) Time t2 (State 2 Before Occurrence of Failure)

Figure 15:
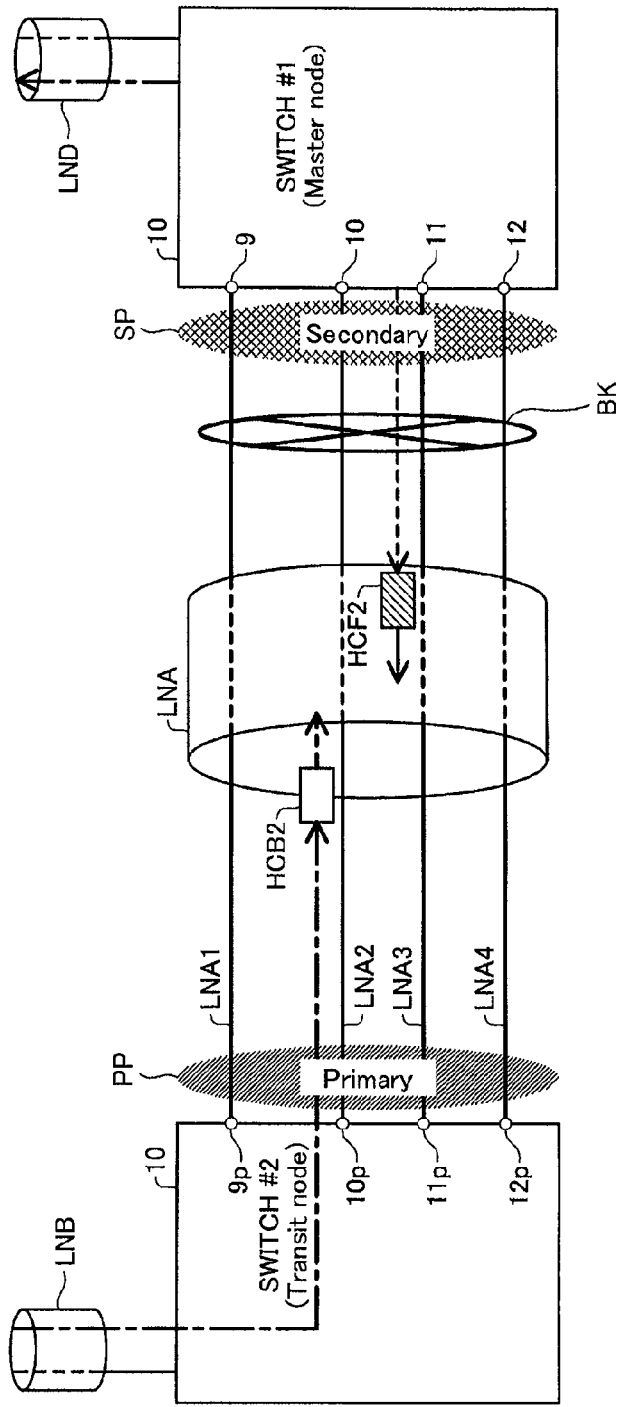
FIG. 15 is a diagram illustrating the state where transmission and reception of Health check frames is performed for the second or subsequent time in the network.

FIG. 15 is a diagram illustrating the state where transmission and reception of Health check frames is performed for the second or subsequent time in the network 1000.

The following describes sending a Health check frame HCF2 with the Ring ID 10 from a Secondary port of the switch #1 to the switch #2 at a time t2 shown in FIG. 15. In the description of or after the time t2, the same series of processing as those at the time t1 (previous time) are not specifically explained.

When receiving a Health check frame HCF2 generated by the Ring manager 100 of the switch #1, the Health check transmission controller 430 performs the Health check frame sending process (FIG. 12). The Health check transmission controller 430 refers to the information of "Ring ID 10 and LA ID 1" registered in the header of the received frame and performs the sending flag detection (step S306, FIG. 12). Since there is the entry E12 having the "on" setting of the sending flag among the entries E11 to E14 having the Ring ID 10 and the LA ID 1 in the Health check sending/receiving management table 420 of the switch #1 at the time t2 (step S306: Any "on" Entry), the Health check transmission controller 430 subsequently detects the priority port information (step S322). The priority port information set in the matching entries identified by the combination of the Ring ID 10 and the LA ID 1 is "Secondary" in the Health check sending/receiving management table 420 (step S322: Secondary), so that the Health check transmission controller 430 performs the receiving flag detection (step S324). Since the entry E12 with the "on" setting of the sending flag has the "off" setting of the receiving flag among the entries E11 to E14 in the Health check sending/receiving management table 420 (step S324: "off"), the Health check transmission controller 430 selects the physical port with the physical port number equal to the (port number of the sending flag "on" port+1), i.e., the physical port number 11 (step S326).

The Health check transmission controller 430 subsequently detects the physical port status of the selected physical port number 11 (step S314). The physical port status of the physical port number 11 is "Up" in the entry E13 of the Health check sending/receiving management table 420 of the switch #1 (step S314: Up). The Health check transmission controller 430 then updates the setting of the sending flag in the entry E13 from "off" to "on" and the setting of the sending flag in the entry E12 from "on" to "off", while updating the settings of the receiving flag in all the entries E11 to E14 to "off" (step S318). The Health check transmission controller 430 subsequently forwards the Health check frame HCF2 to the physical line controller 500. The Health check frame HCF2 forwarded to the physical line controller 500 is sent from the selected physical port with the physical port number 11 via the physical line LNA3 to the switch #2.

The following describes sending a Health check frame HCB2 with the Ring ID 10 from a Primary port of the switch #2 to the switch #1 at the time t2 shown in FIG. 15. In the description of or after the time t2, the same series of processing as those at the time t1 (previous time) are not specifically explained.

When receiving a Health check frame HCB2 sent from another Transit node and received by the switch #2, the Health check transmission controller 430p performs the Health check frame sending process (FIG. 12). The Health check transmission controller 430p refers to the information of "Ring ID 10 and LA ID 1" registered in the header of the received frame and performs the sending flag detection (step S306, FIG. 12). Since there is the entry E21 having the "on" setting of the sending flag among the entries E21 to E24 having the Ring ID 10 and the LA ID 1 in the Health check sending/receiving management table 420p of the switch #2 at the time t2 (step S306: Any "on" Entry), the Health check transmission controller 430p subsequently detects the priority port information (step S322). The priority port information set in the matching entries identified by the combination of the Ring ID 10 and the LA ID 1 is "Primary" in the Health check sending/receiving management table 420p (step S322: Primary), so that the Health check transmission controller 430p selects the physical port with the physical port number equal to the (port number of the sending flag "on" port+1), i.e., the physical port number 10p (step S326).

The Health check transmission controller 430p subsequently detects the physical port status of the selected physical port number 10p (step S314). The physical port status of the physical port number 10p is "Up" in the entry E22 of the Health check sending/receiving management table 420p of the switch #2 (step S314: Up). The Health check transmission controller 430p then updates the setting of the sending flag in the entry E22 from "off" to "on" and the setting of the sending flag in the entry E21 from "on" to "off", while updating the settings of the receiving flag in all the entries E21 to E24 to "off" (step S318). The Health check transmission controller 430p subsequently forwards the Health check frame HCB2 to the physical line controller 500p. The Health check frame HCB2 forwarded to the physical line controller 500p is sent from the selected physical port with the physical port number 10p via the physical line LNA2 to the switch #1.

Series of processing performed by the switch #1 or the switch #2 after reception of the Health check frame will be described later in detail.

As described above, at the time t2 when transmission of Health check frames is performed for the second or subsequent time, the physical port with the physical port number equal to the (port number of the sending flag "on" port+1), i.e., the physical port with the physical port number next to the physical port number of the last frame-sending port used to send the Health check frame last time, is used to send the Health check frame HCB2 from the Primary port and to send the Health check frame HCF2 from the Secondary port. In this manner, different physical lines among the physical lines constituting the virtual line are used for sending and receiving Health check frames for the second or subsequent time between the switches 10.

(B-6-3) Time t3 (on Occurrence of Failure)

Figure 16:
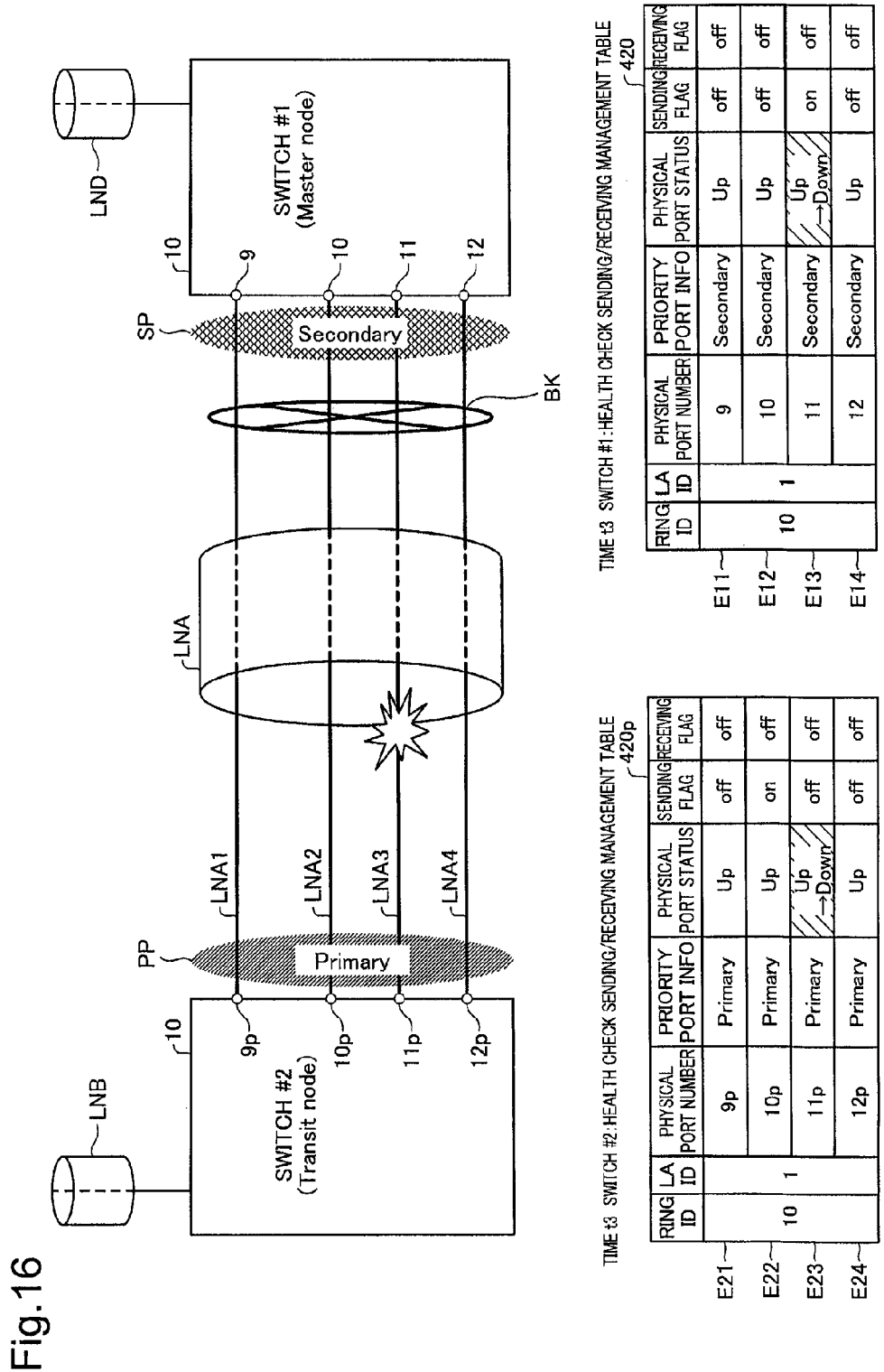
FIG. 16 is a diagram illustrating the occurrence of a failure in the network.

FIG. 16 is a diagram illustrating the occurrence of a failure in the network 1000. The following describes series of processing when a failure occurs in one part of the physical lines constituting the virtual line LNA (in the illustrated example of FIG. 16, physical line LNA3) at a time t3 as shown in FIG. 16.

The Health check frame controller 400 of the switch #1 identifies the target physical port 11 connecting with the physical line LNA3, on which the occurrence of a failure is detected, and determines the new setting of the physical port status, based on a notification from the physical line controller 500 (steps S402 and S404). Since the setting of "Down" is determined as the new setting of the physical port status based on the notification of the occurrence of a failure on the physical line LNA3 (step S404: Down), the Health check frame controller 400 updates the setting of the physical port status from "Up" to "Down" in the entry E13 of the Health check sending/receiving management table 420 (step S408).

The Health check frame controller 400p of the switch #2 performs the same series of processing with respect to the physical port 11p connecting with the physical line LNA3, on which the occurrence of a failure is detected, based on a notification from the physical line controller 500p.

As described above, when a failure occurs in one part of the physical lines constituting the virtual line LNA, the switch 10 connecting with the failed physical line updates the information (physical port status) registered in the Health check sending/receiving management table 420 of itself.

(B-6-4) Time t4 (State 1 after Occurrence of Failure)

Figure 17:
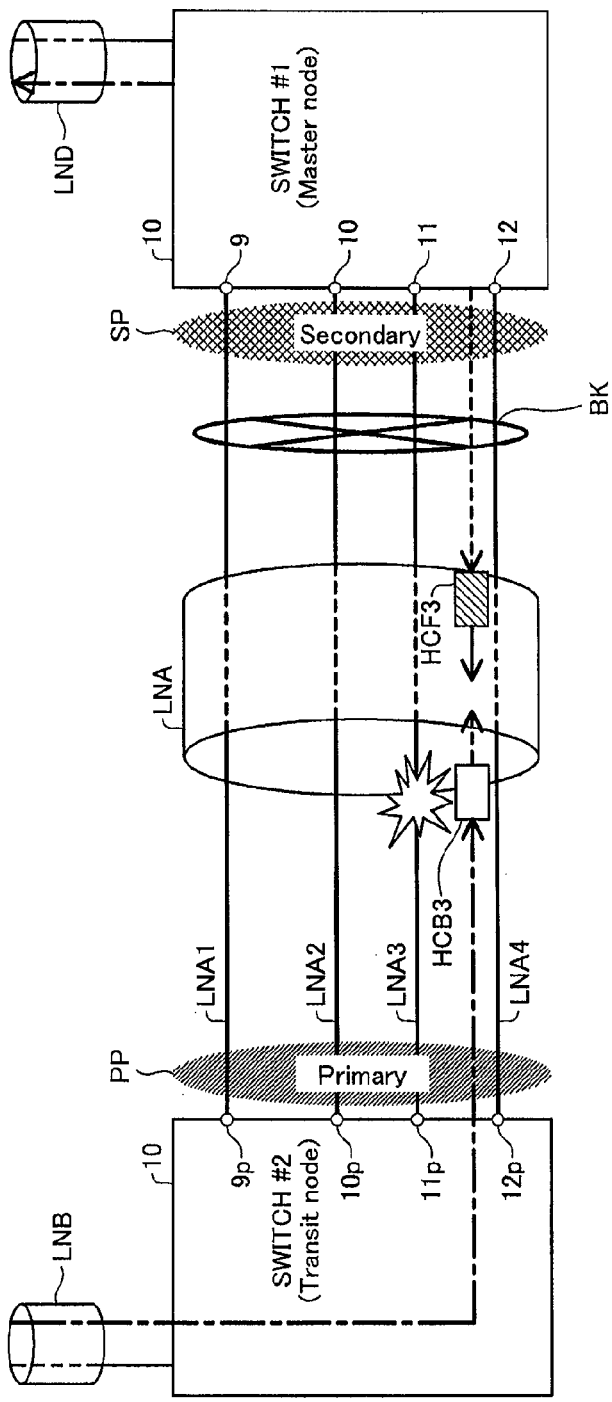
FIG. 17 is a diagram illustrating the state where one identical port is used for both sending and receiving Health check frames after the occurrence of a failure in the network.

FIG. 17 is a diagram illustrating the state where one identical port is used for both sending and receiving Health check frames after the occurrence of a failure in the network 1000.

The following describes sending a Health check frame HCF3 with the Ring ID 10 from a Secondary port of the switch #1 to the switch #2 at a time t4 shown in FIG. 17.

The transmission of the Health check frame HCF3 from a Secondary port of the switch #1 may follow the procedure at the time t2 described above (FIG. 15). The Health check frame HCF3 is accordingly sent from the physical port with the physical port number equal to the (port number of the sending flag "on" port+1), i.e., the physical port with the physical port number 12 next to the physical port number 11 of the last frame-sending port used to send the Health check frame last time (time t2, FIG. 15), via the physical line LNA4.

The following describes sending a Health check frame HCB3 with the Ring ID 10 from a Primary port of the switch #2 to the switch #1 at the time t4 shown in FIG. 17.

The transmission of the Health check frame HCB3 from a Primary port of the switch #2 cannot follow the procedure at the time t2 described above (FIG. 15). This is because the physical port with the physical port number equal to the (port number of the sending flag "on" port+1), i.e., the physical port with the physical port number 11p next to the physical port number 10p of the last frame-sending port used to send the Health check frame last time (time t2, FIG. 15) is in the incommunicable state.

In the Health check frame sending process (FIG. 12), the Health check transmission controller 430p goes through the processing flow of steps S302 to S306, S322 and S326 and selects the physical port with the physical port number equal to the (port number of the sending flag "on" port+1), i.e., the physical port with the physical port number 11p (step S326). The Health check transmission controller 430p subsequently detects the physical port status of the selected physical port number 11p (step S314). The physical port status of the physical port number 11p is "Down" in the entry E23 of the Health check sending/receiving management table 420p of the switch #2 (step S314: Down). The Health check transmission controller 430p then reselects the physical port with the physical port number equal to the (currently selected port number+1), i.e., the physical port with the physical port number 12p next to the currently selected physical port number 11p (step S316). The Health check transmission controller 430p subsequently goes through the processing flow of steps S314, S318 and S320. The Health check frame HCB3 is accordingly sent from the physical port with the physical port number 12p reselected at step S316, via the physical line LNA4.

As described above, after the occurrence of a failure in the network 1000, the same physical line among the physical lines constituting the virtual line may be used to send the Health check frame HCB3 from the Primary port and to send the Health check frame HCF3 from the Secondary port. In other words, the frame-receiving port of one switch used to receive the Health check frame may be identical with the frame-sending port of the same switch used to send the Health check frame.

The following describes series of processing performed by the switch #1 or the switch #2 after reception of the Health check frame.

In the switch #1, the physical line controller 500 receives the Health check frame HCB3 sent from the switch #2. The physical line controller 500 forwards the received Health check frame HCB3 to the frame identification module 320. When receiving the Health check frame HCB3, the frame identification module 320 performs the frame receiving process (FIG. 10). Since the received frame is identified as a Health check frame at the frame type identification in the frame receiving process (step S102: Health check frame, FIG. 10), the frame identification module 320 forwards the received frame to the Health check receiving controller 410 (step S104).

When receiving the Health check frame HCB3, the Health check receiving controller 410 performs the Health check frame receiving process (FIG. 11). More specifically, the Health check receiving controller 410 refers to the header information of the received frame to identify the frame-receiving port of the Health check frame HCB3 (i.e., physical port number 12) (step S202). The Health check receiving controller 410 then detects the sending flag of the identified frame-receiving port (step S204). The setting of the sending flag is "on" in the entry E14 of the frame-receiving port with the physical port number 12 in the Health check sending/receiving management table 420 of the switch #1 at the time t4. The Health check receiving controller 410 then updates the setting of the receiving flag from "off" to "on" in the entry E14 (step S206) and forwards the received frame to the frame relay module 300 (step S208).

When receiving the Health check frame HCF3 from the switch #1, the switch #2 similarly performs the frame receiving process (FIG. 10) and the Health check frame receiving process (FIG. 11) in the same manner as that performed by the switch #1.

As the result, the setting of "on" is stored in the receiving flag field of the frame-receiving port used to receive a Health check frame from another switch 10, in the Health check sending/receiving management table 420 of each switch 10.

(B-6-5) Time t5 (State 2 after Occurrence of Failure)

Figure 18:
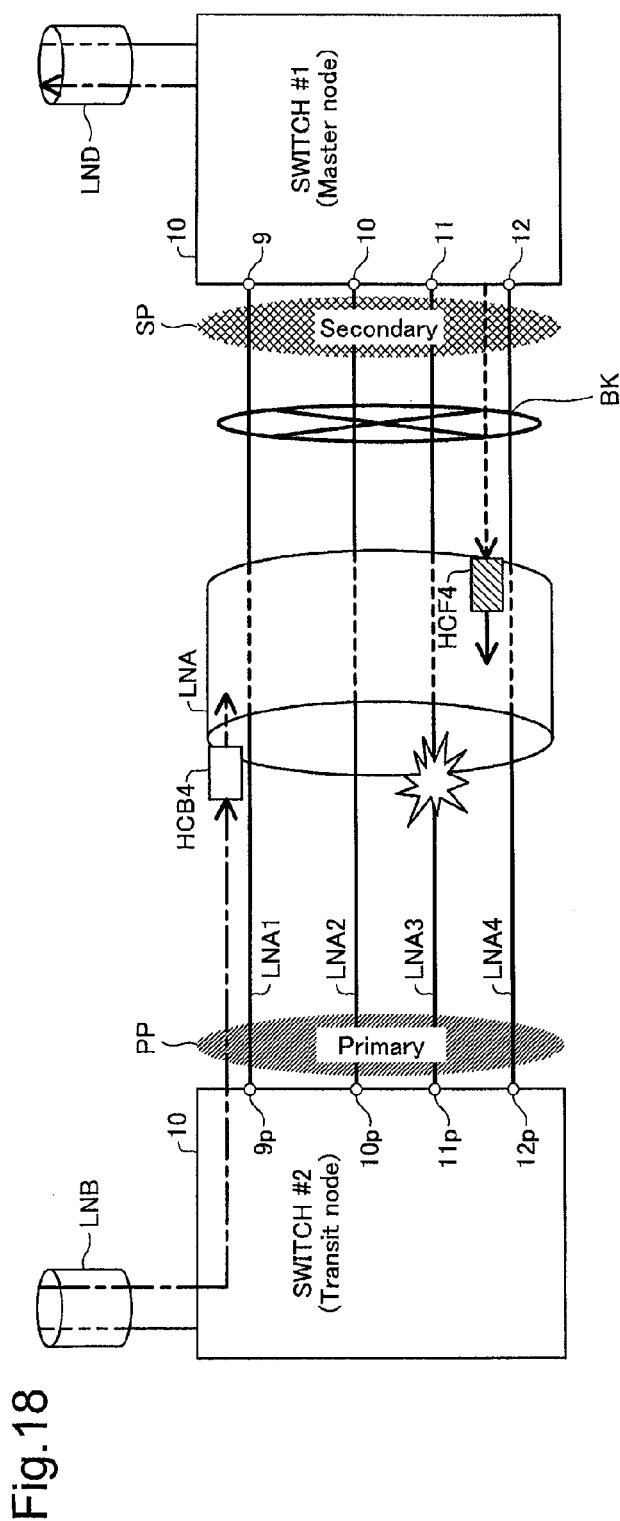
FIG. 18 is a diagram illustrating the state to avoid using the same port as both the frame-sending port to send a Health check frame and the frame-receiving port to receive a Health check frame, after the occurrence of a failure in the network.

FIG. 18 is a diagram illustrating the state to avoid using the same port as both the frame-sending port to send a Health check frame and the frame-receiving port to receive a Health check frame, after the occurrence of a failure in the network 1000.

The following describes sending a Health check frame HCF4 with the Ring ID 10 from a Secondary port of the switch #1 to the switch #2 at a time t5 shown in FIG. 18.

The transmission of the Health check frame HCF4 from a Secondary port of the switch #1 follows a different procedure from the procedure at the time t2 described above (FIG. 15), in order to avoid using the same port as both the frame-sending port to send a Health check frame and the frame-receiving port to receive a Health check frame, which arises at the time t4. More specifically, in the Health check frame sending process (FIG. 12), the Health check transmission controller 430 goes through the processing flow of steps S302 to S306 and S322 and detects the receiving flag (step S324). Since the sending flag "on" entry E14 has the setting of "on" in the receiving flag field among the entries E11 to E14 in the Health check sending/receiving management table 420 of the switch #1 at the time t5 (step S324: "on"), the Health check transmission controller 430 selects the sending flag "on" physical port, i.e., the physical port number 12 (step S328).

The Health check transmission controller 430 subsequently goes through the processing flow of steps S314, S318 and S320. As the result, the Health check frame HCF4 is sent from the physical port with the physical port number 12 selected at step S328, via the physical line LNA4.

The following describes sending a Health check frame HCB4 with the Ring ID 10 from a Primary port of the switch #2 to the switch #1 at the time t5 shown in FIG. 18.

The transmission of the Health check frame HCB4 from a Primary port of the switch #2 may follow the procedure at the time t2 described above (FIG. 15). More specifically, the Health check frame HCB4 is sent from the physical port with the physical port number equal to the (port number of the sending flag "on" port+1), i.e., the physical port with the physical port number next to the physical port number 12p of the last frame-sending port used to send the Health check frame last time (time t4, FIG. 17). The physical port number 12p is the largest number among the entries E21 to E24 in the Health check sending/receiving management table 420p. The Health check frame is accordingly sent from the physical port with the smallest physical port number 9p.

As described above, in the Health check frame sending process (FIG. 12), when a Health check frame is to be sent from a Primary port, i.e., a port connected in the first direction (step S322: Primary), the Health check transmission controller 430 of the switch 10 selects the physical port with the physical port number equal to the (port number of the sending flag "on" port+1), i.e., a port different from the last frame-sending port used to send a Health check frame last time, and sends the Health check frame from the selected physical port, irrespective of whether the same port is currently set for both sending and receiving Health check frames. In the first embodiment, this is referred to as "first rule". In the Health check frame sending process (FIG. 12), when a Health check frame is to be sent from a Secondary port, i.e., a port connected in the second direction (step S322: Secondary) and the same port is currently set for both sending and receiving Health check frames (step S324: "on"), the Health check transmission controller 430 of the switch 10 selects the physical port with the physical port number of the sending flag "on" port, i.e., the same port as the last frame-sending port used to send a Health check frame last time and sends the Health check frame from the selected physical port. In the first embodiment, this is referred to as "second rule".

In the configuration of the first embodiment described above, the Health check transmission controller 430 of the Health check frame controller 400 (status check frame controller) changes the frame-sending port to be used to send a next Health check frame, in order to avoid continuously using the same port as both the frame-sending port to send a Health check frame (status check frame) for use in checking the status of the network, which the switch 10 (network relay device) is connected with via the physical line, and the frame-receiving port to receive a Health check frame from another switch 10. More specifically, the Health check transmission controller 430 of the Health check frame controller 400 selects a port different from the last frame-sending port used to send a Health check frame last time, among the Primary ports (i.e., ports connected in the first direction), and sends a next Health check frame from the selected port. The Health check transmission controller 430 of the Health check frame controller 400 also selects the same port as the last frame-sending port used to send a Health check frame last time, among the Secondary ports (i.e., ports connected in the second direction), and sends a next Health check frame from the selected port. In this manner, the frame-sending port to be used to send a next Health check frame is changed, in order to avoid continuously using the same port as both the frame-sending port to send a Health check frame and the frame-receiving port to receive a Health check frame.

The configuration of the first embodiment effectively prevents the Health check frames from being undesirably discarded on the occurrence of a failure in a physical line connected with the frame-sending, frame-receiving port, in the state where the same port is continuously used as both the frame-sending port and the frame-receiving port of the Health check frames. As a result, this configuration prevents or at least reduces false detection of a failure in the virtual line by the network relay device (switch 10) configured to use the virtual line for making physical lines redundant and to exchange control frames (Health check frames) for use in checking the status of the network with another network relay device (switch 10).

Additionally, in the first embodiment described above, the Health check transmission controller 430 of the Health check frame controller 400 (status check frame controller) may refer to the last settings of the frame-sending port and the frame-receiving port, i.e., the last settings of the sending flag and the receiving flag, stored in the Health check sending/receiving management table 420 (port record storage), when selecting a port according to the rule 1 or selecting a port according to the rule 2.

C. Second Embodiment

Another configuration that employs different rules (first rule and second rule) to avoid using the same port as both the frame-sending port to send a Health check frame and the frame-receiving port to receive a Health check frame is described below as a second embodiment according to the invention. In the description and the illustrations of the second embodiment, the like constituents to those of the first embodiment are expressed by the like numerals to those of the first embodiment and are not specifically explained here.

(C-1) System Configuration

Figure 19:
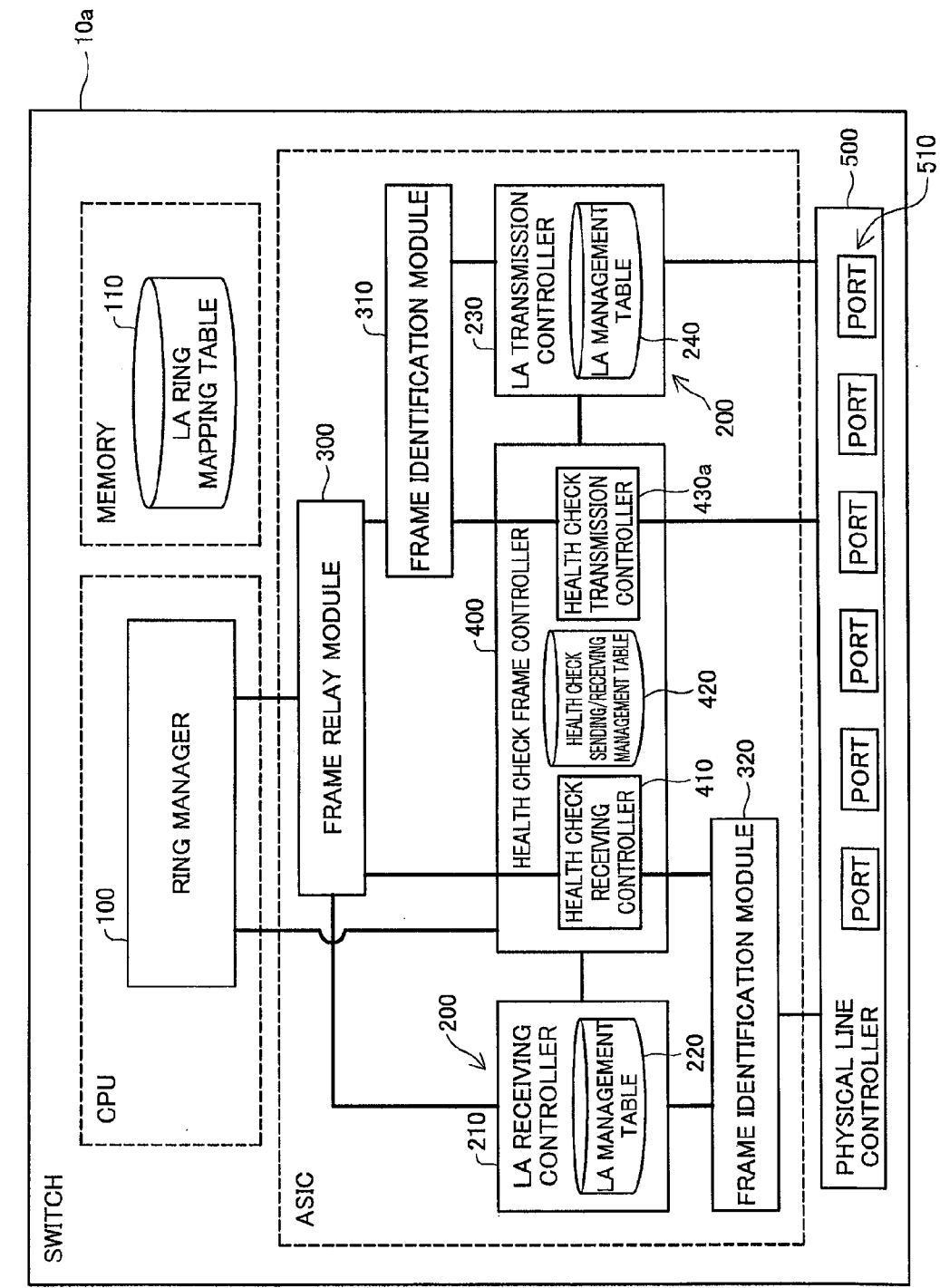
FIG. 19 is a diagram illustrating the general configuration of a switch according to the second embodiment.

FIG. 19 is a diagram illustrating the general configuration of a switch 10a according to the second embodiment. The difference from the first embodiment shown in FIG. 6 is only a Health check transmission controller 430a used in place of the Health check transmission controller 430. Otherwise the configuration and operations of the second embodiment are similar to those of the first embodiment. When receiving a frame, the Health check transmission controller 430a performs a different flow of Health check frame sending process from the flow of the first embodiment shown in FIG. 12.

(C-2) Frame Receiving Process

The procedure of frame receiving process according to the second embodiment is identical with the procedure of the first embodiment shown in FIG. 10.

(C-3) Health Check Frame Receiving Process

The procedure of Health check frame receiving process according to the second embodiment is identical with the procedure of the first embodiment shown in FIG. 11.

(C-4) Health Check Frame Sending Process

Figure 20:
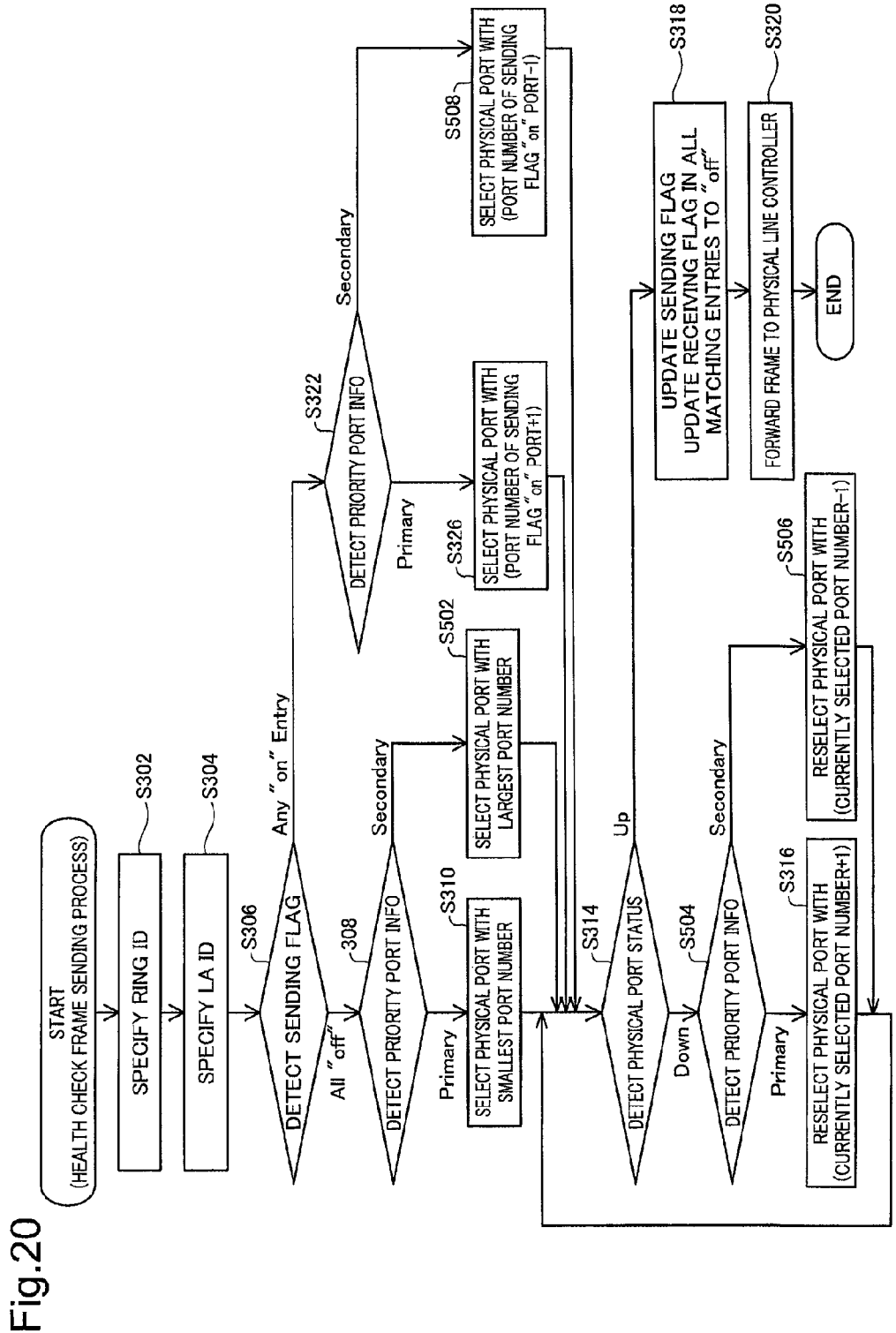
FIG. 20 is a flowchart showing a procedure of Health check frame sending process according to the second embodiment.

FIG. 20 is a flowchart showing a procedure of Health check frame sending process according to the second embodiment. The differences from the first embodiment shown in FIG. 12 include replacement of step S312 with step S502, addition of steps S504 and S506 between steps S314 and S316, and replacement of steps S324 and S328 with step S508. Otherwise the processing flow of the second embodiment is similar to that of the first embodiment.

When the detected priority port information is "Secondary" (step S308: Secondary), the Health check transmission controller 430a selects the physical port with the largest physical port number (i.e., largest number when the physical port numbers are sorted in the ascending order) among the matching entries identified by the LA ID (as the search result of step S306) (step S502) and goes to step S314.

When the detected physical port status is "Down" that indicates the incommunicable state (step S314: Down), the Health check transmission controller 430a detects the priority port information of the selected physical port (step S504). More specifically, the Health check transmission controller 430a searches the Health check sending/receiving management table 420 with the selected physical port number as a key and detects the priority port information set in the matching entry. When the detected priority port information is "Primary" (step S504: Primary), the Health check transmission controller 430a goes to step S316 to reselect the physical port with the physical port number equal to the (currently selected port number+1). The details of this reselection are described previously with reference to FIG. 12. When the detected priority port information is "Secondary" (step S504: Secondary), on the other hand, the Health check transmission controller 430a reselects the physical port with the physical port number equal to the (currently selected port number−1) (step S506). More specifically, the Health check transmission controller 430a sorts the matching entries identified by the LA ID (as the search result of step S306) in the ascending order of the physical port numbers and reselects the physical port with the next smaller physical port number just before the currently selected physical port number. After the reselection at step S506, the Health check transmission controller 430a goes back to step S314.

When the detected priority port information is "Secondary" (step S322: Secondary), the Health check transmission controller 430a selects the physical port with the physical port number equal to the (port number of the sending flag "on" port−1) (step S508). More specifically, the Health check transmission controller 430a sorts the matching entries identified by the LA ID (as the search result of step S306) in the ascending order of the physical port numbers and selects the physical port with the next smaller physical port number just before the physical port number of the sending flag "on" entry. The Health check transmission controller 430a then goes to step S314, in order to send a frame from the selected physical port.

(C-5) Physical Port Status Change Process

The procedure of physical port status change process according to the second embodiment is identical with the procedure of the first embodiment shown in FIG. 13.

(C-6) Operations

The following describes sending and receiving Health check frames in a network including the switches 10a according to the second embodiment. The configuration of the drawings used for the explanation according to the second embodiment is similar, in principle, to that used for the explanation of the first embodiment. The following mainly describes the differences from the first embodiment.

(C-6-1) Time t1: (State 1 Before Occurrence of Failure)

Figure 21:
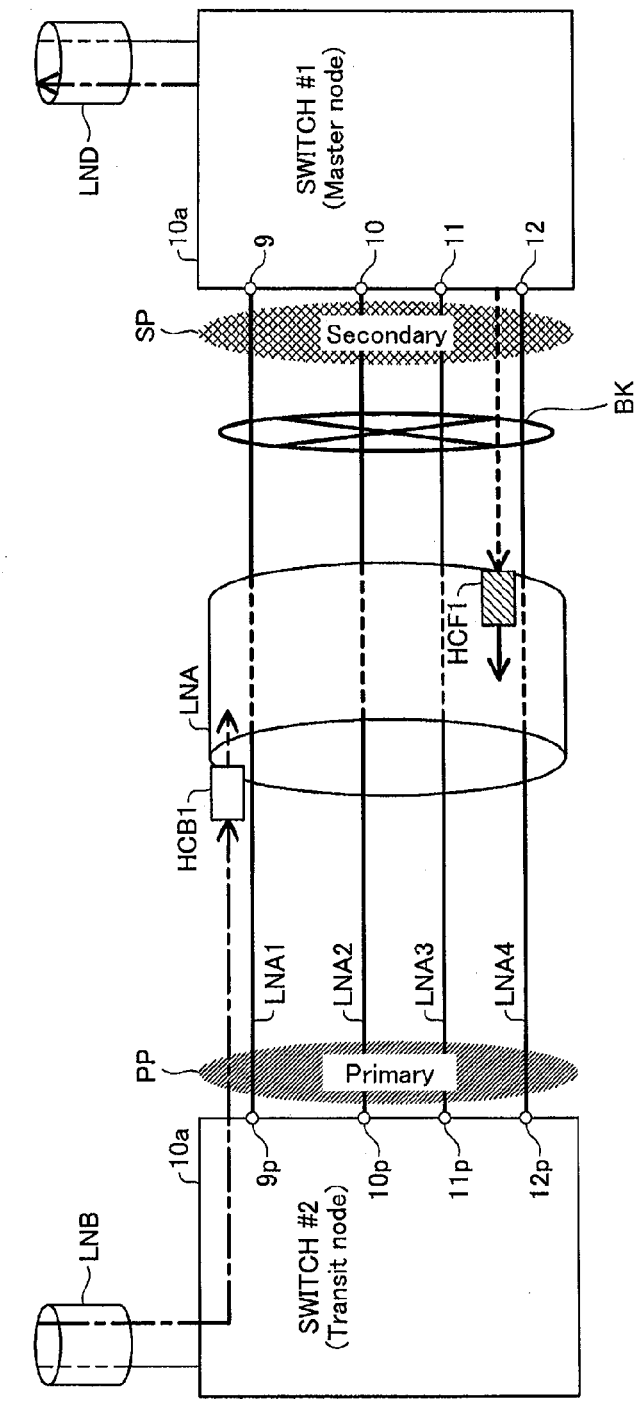
FIG. 21 is a diagram illustrating the state where transmission and reception of Health check frames starts in the network according to the second embodiment.

FIG. 21 is a diagram illustrating the state where transmission and reception of Health check frames starts in the network according to the second embodiment.

The following describes sending a Health check frame HCF1 with the Ring ID 10 from a Secondary port of the switch #1 to the switch #2 at a time t1 shown in FIG. 21.

When receiving a Health check frame HCF1 generated by the Ring manager 100 of the switch #1, the Health check transmission controller 430a performs the Health check frame sending process (FIG. 20). In the Health check frame sending process, the Health check transmission controller 430a goes through the processing flow of steps S302 to S306 and detects the priority port information (step S308). The priority port information set in the matching entries identified by the combination of the Ring ID 10 and the LA ID 1 is "Secondary" in the Health check sending/receiving management table 420 (step S308: Secondary), so that the Health check transmission controller 430a selects the physical port with the largest physical port number, i.e., the physical port number 12 (step S502). The physical port status of the selected physical port number 12 is "Up" in the entry E14 of the Health check sending/receiving management table 420 of the switch #1 (step S314: Up). The Health check transmission controller 430a then goes through the processing flow of steps S318 and S320. The Health check frame HCF1 is accordingly sent from the selected physical port with the physical port number 12 via the physical line LNA4 to the switch #2.

The transmission of a Health check frame HCB1 with the Ring ID 10 from a Primary port of the switch #2 to the switch #1 at the time t1 shown in FIG. 21 follows the procedure of the first embodiment at the time t1 described above (FIG. 14). The Health check frame HCB1 is accordingly sent from the selected physical port with the physical port number 9p via the physical line LNA1 to the switch #1.

(C-6-2) Time t2: (State 2 Before Occurrence of Failure)

Figure 22:
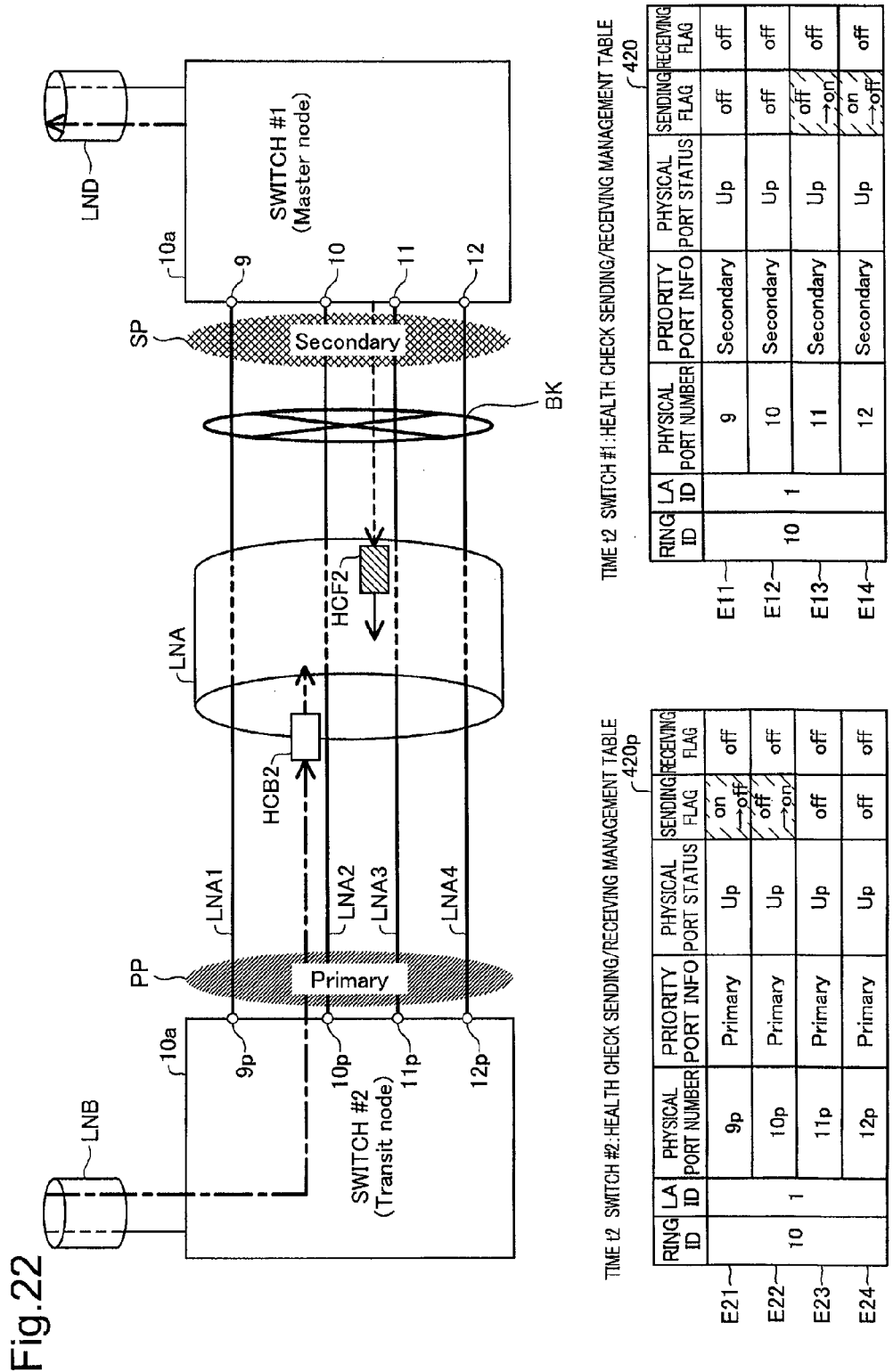
FIG. 22 is a diagram illustrating the state where transmission and reception of Health check frames is performed for the second time in the network according to the second embodiment.

FIG. 22 is a diagram illustrating the state where transmission and reception of Health check frames is performed for the second time in the network according to the second embodiment.

The following describes sending a Health check frame HCF2 with the Ring ID 10 from a Secondary port of the switch #1 to the switch #2 at a time t2 shown in FIG. 22.

When receiving a Health check frame HCF2 generated by the Ring manager 100 of the switch #1, the Health check transmission controller 430a performs the Health check frame sending process (FIG. 20). In the Health check frame sending process, the Health check transmission controller 430a goes through the processing flow of steps S302 to S306 and detects the priority port information (step S322). The priority port information set in the matching entries identified by the combination of the Ring ID 10 and the LA ID 1 is "Secondary" in the Health check sending/receiving management table 420 (step S322: Secondary), so that the Health check transmission controller 430a selects the physical port with the physical port number equal to the (port number of the sending flag "on" port−1), i.e., the physical port number 11 (step S508). The physical port status of the selected physical port number 11 is "Up" in the entry E13 of the Health check sending/receiving management table 420 (step S314: Up). The Health check transmission controller 430a then goes through the processing flow of steps S318 and S320. The Health check frame HCF2 is accordingly sent from the selected physical port with the physical port number 11 via the physical line LNA3 to the switch #2.

The transmission of a Health check frame HCB2 with the Ring ID 10 from a Primary port of the switch #2 to the switch #1 at the time t2 shown in FIG. 22 follows the procedure of the first embodiment at the time t2 described above (FIG. 15). The Health check frame HCB2 is accordingly sent from the selected physical port with the physical port number 10p via the physical line LNA2 to the switch #1.

(C-6-3) Time t3: (State 3 Before Occurrence of Failure)

Figure 23:
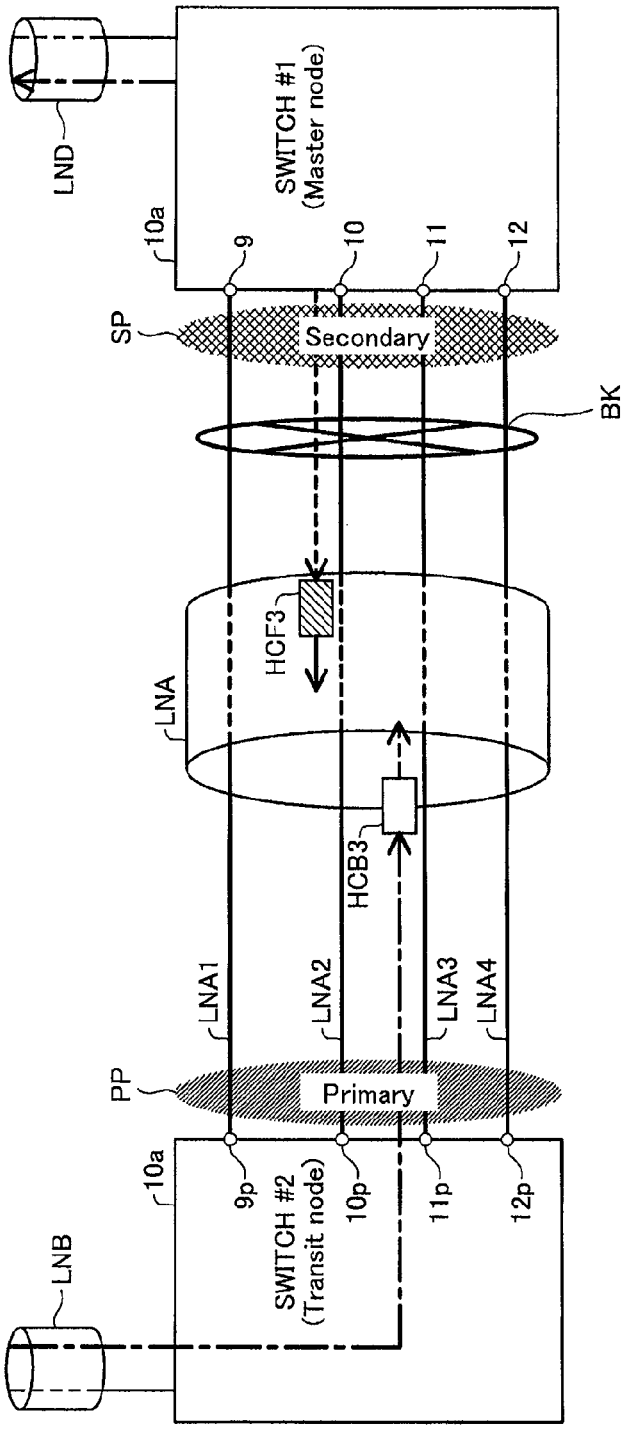
FIG. 23 is a diagram illustrating the state where transmission and reception of Health check frames is performed for the third time in the network according to the second embodiment.

FIG. 23 is a diagram illustrating the state where transmission and reception of Health check frames is performed for the third time in the network according to the second embodiment.

The transmission of a Health check frame HCF3 with the Ring ID 10 from a Secondary port of the switch #1 to the switch #2 at a time t3 shown in FIG. 23 follows the procedure of the second embodiment at the time t2 described above (FIG. 22). The Health check frame HCF3 is accordingly sent from the selected physical port with the physical port number 10 via the physical line LNA2 to the switch #2.

The transmission of a Health check frame HCB3 with the Ring ID 10 from a Primary port of the switch #2 to the switch #1 at the time t3 shown in FIG. 23 follows the procedure of the second embodiment at the time t2 described above (FIG. 22).

The Health check frame HCB3 is accordingly sent from the selected physical port with the physical port number 11p via the physical line LNA3 to the switch #1.

(C-6-4) Time t4 (on Occurrence of Failure)

Figure 24:
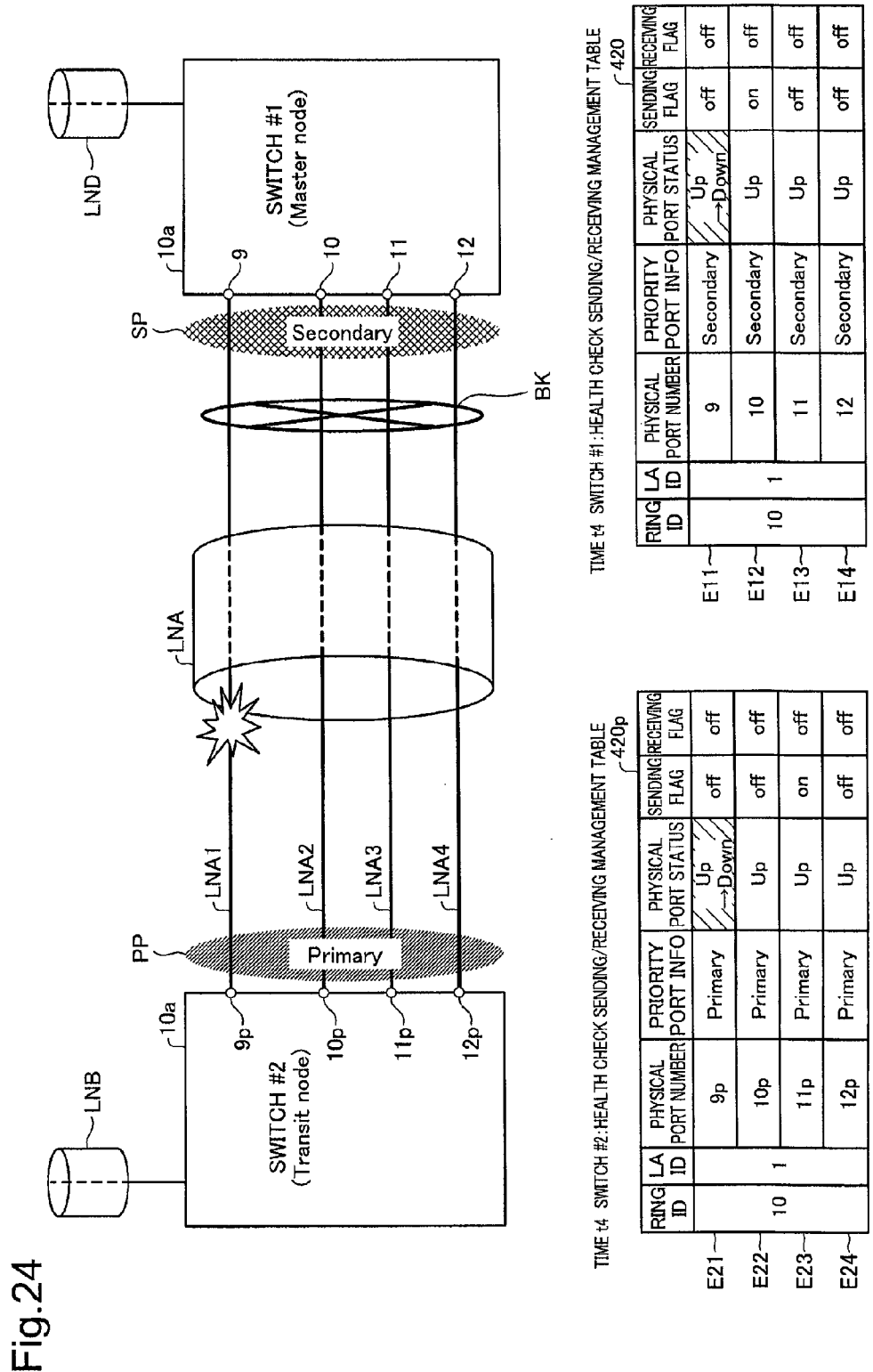
FIG. 24 is a diagram illustrating the occurrence of a failure in the network according to the second embodiment.

FIG. 24 is a diagram illustrating the occurrence of a failure in the network according to the second embodiment. The series of processing when a failure occurs in one part of the physical lines constituting the virtual line LNA (in the illustrated example of FIG. 24, physical line LNA1) at a time t4 as shown in FIG. 24 follows the procedure of the first embodiment at the time t3 described above (FIG. 16). The setting of the physical port status is updated from "Up" to "Down" in the entry E11, corresponding to the failed physical port, in the Health check sending/receiving management table 420 of the switch #1 (step S408, FIG. 13). Similarly, the setting of the physical port status is updated from "Up" to "Down" in the entry E21, corresponding to the failed physical port, in the Health check sending/receiving management table 420p of the switch #2 (step S408, FIG. 13).

(C-6-5) Time t5 (State 1 after Occurrence of Failure)

Figure 25:
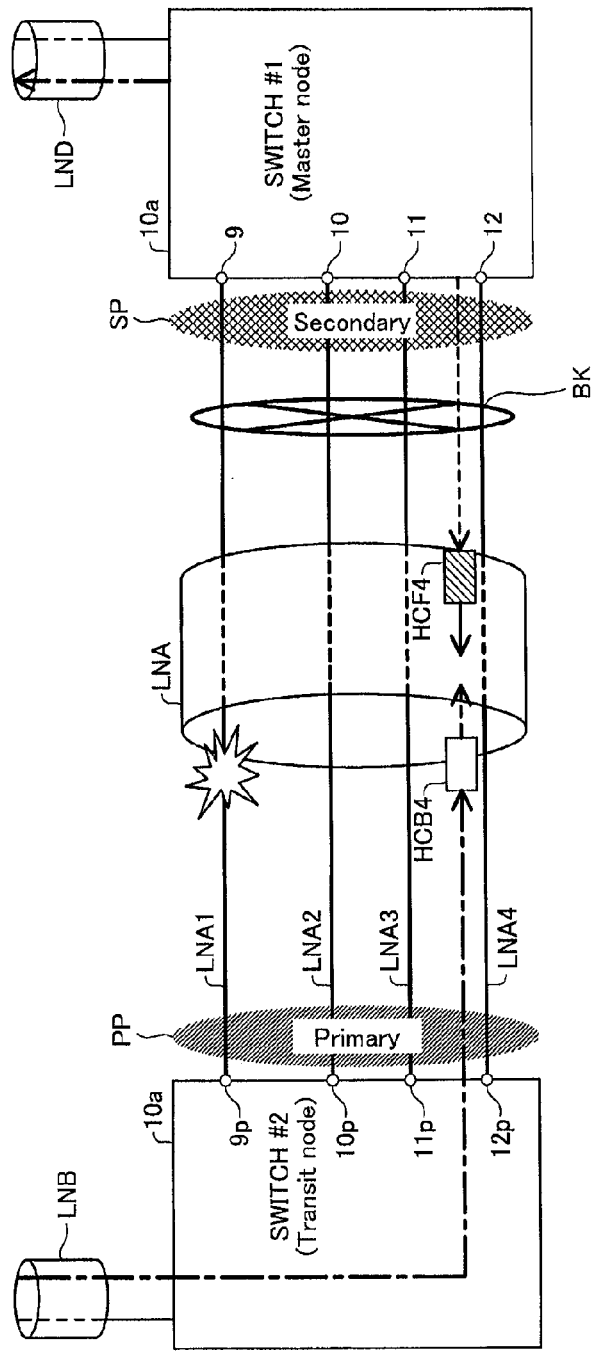
FIG. 25 is a diagram illustrating the state where one identical port is used for both sending and receiving Health check frames after the occurrence of a failure in the network according to the second embodiment.

FIG. 25 is a diagram illustrating the state where one identical port is used for both sending and receiving Health check frames after the occurrence of a failure in the network according to the second embodiment.

The following describes sending a Health check frame HCF4 with the Ring ID 10 from a Secondary port of the switch #1 to the switch #2 at a time t5 shown in FIG. 25.

The transmission of the Health check frame HCF4 from a Secondary port of the switch #1 cannot follow the procedure of the second embodiment at the time t2 described above (FIG. 22). This is because the physical port with the physical port number equal to the (port number of the sending flag "on" port−1), i.e., the physical port with the physical port number 9 just before the physical port number 10 of the last frame-sending port used to send the Health check frame last time (time t3, FIG. 23) is in the incommunicable state.

In the Health check frame sending process (FIG. 20), the Health check transmission controller 430a goes through the processing flow of steps S302 to S306, S322 and S508 and selects the physical port with the physical port number equal to the (port number of the sending flag "on" port−1), i.e., the physical port with the physical port number 9 (step S508). The Health check transmission controller 430a subsequently detects the physical port status of the selected physical port number 9 (step S314). The physical port status of the physical port number 9 is "Down" in the entry E11 of the Health check sending/receiving management table 420 of the switch #1 (step S314: Down).

The Health check transmission controller 430a then detects the priority port information of the selected physical port number 9 (step S504). The priority port information of the physical port number 9 is "Secondary" in the entry E11 of the Health check sending/receiving management table 420 of the switch #1 (step S504: Secondary). The Health check transmission controller 430a then reselects the physical port with the physical port number equal to the (currently selected port number−1), i.e., the physical port with the physical port number 12 just before the currently selected physical port number 9 (step S506). The Health check transmission controller 430a subsequently goes through the processing flow of steps S314, S318 and S320. The Health check frame HCF4 is accordingly sent from the physical port with the physical port number 12 reselected at step S506 via the physical line LNA4.

The transmission of a Health check frame HCB4 with the Ring ID 10 from a Primary port of the switch #2 to the switch #1 at the time t5 shown in FIG. 25 follows the procedure of the second embodiment at the time t2 described above (FIG. 22).

The Health check frame HCB4 is accordingly sent from the selected physical port with the physical port number 12p via the physical line LNA4 to the switch #1.

As described above, after the occurrence of a failure in the network according to the second embodiment, the same physical line among the physical lines constituting the virtual line may be used to send the Health check frame HCB4 from the Primary port and to send the Health check frame HCF4 from the Secondary port. In other words, the frame-receiving port of one switch used to receive the Health check frame may be identical with the frame-sending port of the same switch used to send the Health check frame.

The series of processing performed by the switch #1 or the switch #2 after reception of the Health check frame is identical with the procedure of the first embodiment at the time t4 (FIG. 17). The setting of "on" is accordingly stored in the receiving flag field of the frame-receiving port used to receive a Health check frame from another switch 10, in the Health check sending/receiving management table 420 of each switch 10.

(C-6-6) Time t6 (State 2 after Occurrence of Failure)

Figure 26:
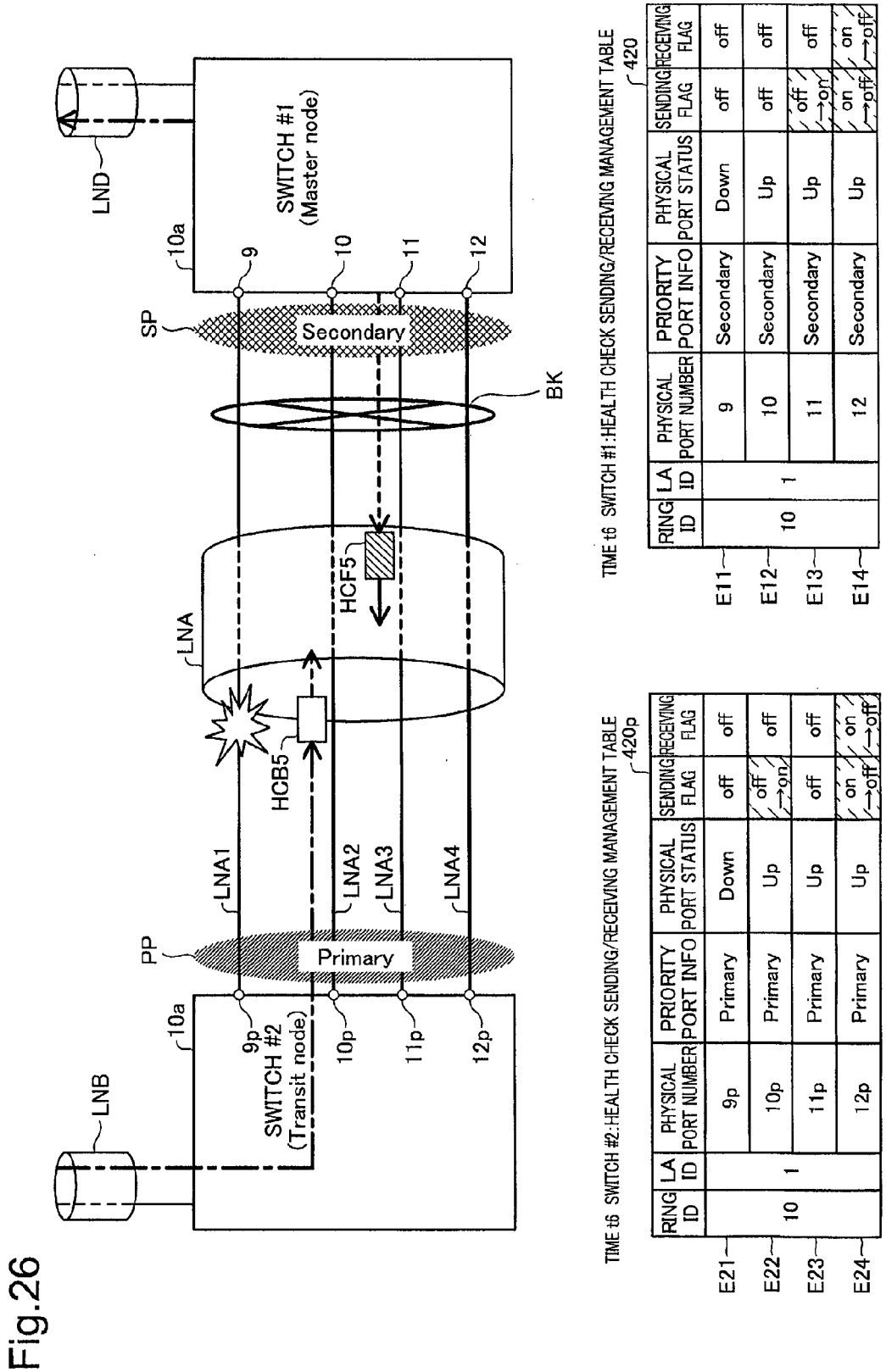
FIG. 26 is a diagram illustrating the state to avoid using the same port as both the frame-sending port to send a Health check frame and the frame-receiving port to receive a Health check frame, after the occurrence of a failure in the network according to the second embodiment.

FIG. 26 is a diagram illustrating the state to avoid using the same port as both the frame-sending port to send a Health check frame and the frame-receiving port to receive a Health check frame, after the occurrence of a failure in the network according to the second embodiment.

The transmission of a Health check frame HCF5 with the Ring ID 10 from a Secondary port of the switch #1 to the switch #2 at a time t6 shown in FIG. 26 follows the procedure of the second embodiment at the time t2 described above (FIG. 22). The Health check frame HCF5 is accordingly sent from the selected physical port with the physical port number 11 via the physical line LNA3 to the switch #2.

The following describes sending a Health check frame HCB5 with the Ring ID 10 from a Primary port of the switch #2 to the switch #1 at the time t6 shown in FIG. 26.

The transmission of the Health check frame HCB5 from a Primary port of the switch #2 cannot follow the procedure of the second embodiment at the time t2 described above (FIG. 22). This is because the physical port with the physical port number equal to the (port number of the sending flag "on" port+1), i.e., the physical port with the physical port number 9p next to the physical port number 12p of the last frame-sending port used to send the Health check frame last time (time t5, FIG. 25) is in the incommunicable state.

In the Health check frame sending process (FIG. 20), the Health check transmission controller 430ap goes through the processing flow of steps S302 to S306, S322 and S326 and selects the physical port with the physical port number equal to the (port number of the sending flag "on" port+1), i.e., the physical port with the physical port number 9p (step S326). The Health check transmission controller 430ap subsequently detects the physical port status of the selected physical port number 9p (step S314). The physical port status of the physical port number 9p is "Down" in the entry E21 of the Health check sending/receiving management table 420p of the switch #2 (step S314: Down).

The Health check transmission controller 430ap then detects the priority port information (step S504: Primary) and reselects the physical port with the physical port number equal to the (currently selected port number+1), i.e., the physical port with the physical port number 10p next to the currently selected physical port number 9p (step S316). The Health check transmission controller 430ap subsequently goes through the processing flow of steps S314, S318 and S320. The Health check frame HCB5 is accordingly sent from the physical port with the physical port number 10p reselected at step S316 via the physical line LNA2.

As described above, in the Health check frame sending process (FIG. 20), when a Health check frame is to be sent from a Primary port, i.e., a port connected in the first direction (step S322: Primary), the Health check transmission controller 430a of the switch 10a selects the physical port with the physical port number equal to the (port number of the sending flag "on" port+1), i.e., the physical port with the next greater physical port number next to the last frame-sending port used to send a Health check frame last time, and sends the Health check frame from the selected physical port, irrespective of whether the same port is currently set for both sending and receiving Health check frames. When the physical port status of the selected physical port is "Down" that indicates the incommunicable state (step S314: Down), the Health check transmission controller 430a reselects the physical port with the physical port number equal to the (currently selected port number+1), i.e., the physical port with the next greater physical port number next to the currently selected physical port. In the second embodiment, this is referred to as "first rule". In the Health check frame sending process (FIG. 20), when a Health check frame is to be sent from a Secondary port, i.e., a port connected in the second direction (step S322: Secondary), on the other hand, the Health check frame controller 430a of the switch 10a selects the physical port with the physical port number equal to the (port number of the sending flag "on" port−1), i.e., the physical port with the next smaller physical port number next to the last frame-sending port used to send a Health check frame last time, and sends the Health check frame from the selected physical port, irrespective of whether the same port is currently set for both sending and receiving Health check frames. When the physical port status of the selected physical port is "Down" that indicates the incommunicable state (step S314: Down), the Health check transmission controller 430a reselects the physical port with the physical port number equal to the (currently selected port number−1), i.e., the physical port with the next smaller physical port number next to the currently selected physical port. In the second embodiment, this is referred to as "second rule".

In the configuration of the second embodiment described above, the Health check transmission controller 430a of the Health check frame controller 400 (status check frame controller) selects the physical port with the next greater physical port number next to the last frame-sending port used to send a Health check frame (status check frame) last time, among the Primary ports (i.e., ports connected in the first direction), and sends a next Health check frame from the selected port. The Health check transmission controller 430a selects the physical port with the next smaller physical port number next to the last frame-sending port used to send a Health check frame last time, among the Secondary ports (i.e., ports connected in the second direction), and sends a next Health check frame from the selected port. In this manner, the frame-sending port to be used to send a next Health check frame is changed, in order to avoid continuously using the same port as both the frame-sending port to send a Health check frame and the frame-receiving port to receive a Health check frame.

Like the first embodiment, the configuration of the second embodiment prevents or at least reduces false detection of a failure in the virtual line by the network relay device (switch 10a) configured to use the virtual line for making physical lines redundant and to exchange control frames (Health check frames) for use in checking the status of the network with another network relay device (switch 10a).

D. Third Embodiment

Another configuration that, in principle, prevents the state where the same port is used as both the frame-sending port to send a Health check frame and the frame-receiving port to receive a Health check frame, is described below as a third embodiment according to the invention. In the description and the illustrations of the third embodiment, the like constituents to those of the first embodiment are expressed by the like numerals to those of the first embodiment and are not specifically explained here.

(D-1) System Configuration

Figure 27:
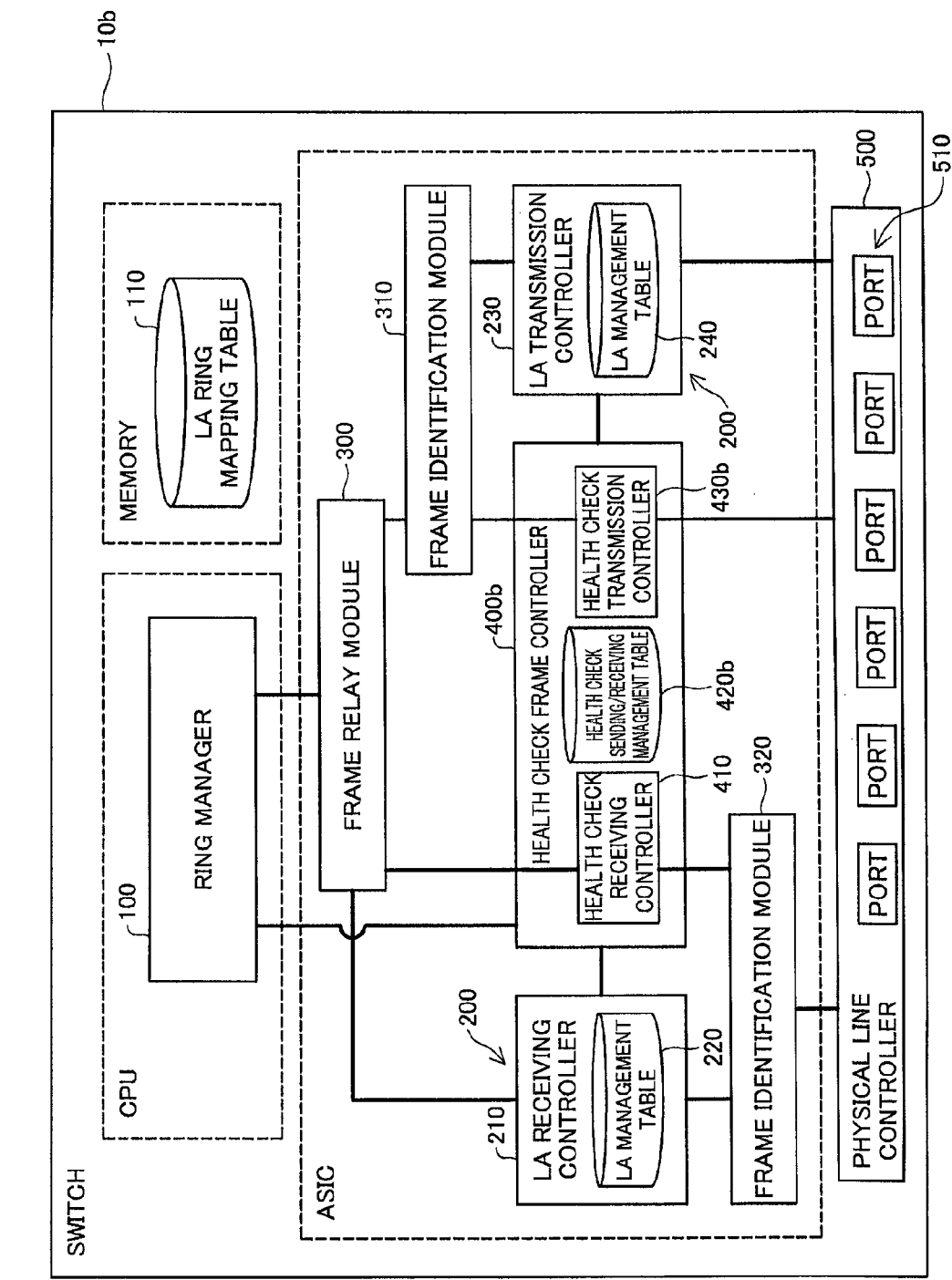
FIG. 27 is a diagram illustrating the general configuration of a switch according to the third embodiment.

FIG. 27 is a diagram illustrating the general configuration of a switch 10b according to the third embodiment. The difference from the first embodiment shown in FIG. 6 is only a Health check frame controller 400b used in place of the Health check frame controller 400. Otherwise the configuration and operations of the third embodiment are similar to those of the first embodiment.

The Health check frame controller 400b includes a Health check sending/receiving management table 420b and a Health check transmission controller 430b, in place of the Health check sending/receiving management table 420 and the Health check transmission controller 430. The Health check frame controller 400b performs a different processing flow of the physical port status change process from the processing flow of the first embodiment shown in FIG. 13. The Health check sending/receiving management table 420b has different entries from those of the first embodiment shown in FIG. 9. When receiving a frame, the Health check transmission controller 430b performs a different processing flow of the Health check frame sending process from the processing flow of the first embodiment shown in FIG. 12.

FIG. 28 is a diagram illustrating one example of the Health check sending/receiving management table 420b according to the second embodiment. The difference from the table 420 of the first embodiment shown in FIG. 9 is only the registry in the priority port information field. Otherwise, the table configuration and registries are similar to those of the first embodiment. In the Health check sending/receiving management table 420b, the priority port information field stores the setting of "Primary" when the virtual line identified by the LA ID is used as the Primary port, the setting of "Secondary" when the virtual line is used as the Secondary port, and the setting of "NOT" when the virtual line is not used as the sending port of a Health check frame.

More specifically, in the illustrated example of FIG. 28, with respect to the virtual line used as the Primary port, the setting of "Primary" is registered for the odd-numbered ports among the ports with the physical ports status "Up", i.e., the ports connecting with the communicable physical lines, whilst the setting of "NOT" is registered for the even-numbered ports. On the contrary, with respect to the virtual line used as the Secondary port, the setting of "Secondary" is registered for the even-numbered ports among the ports with the physical ports status "Up", i.e., the ports connecting with the communicable physical lines, whilst the setting of "NOT" is registered for the odd-numbered ports.

(D-2) Frame Receiving Process

The procedure of frame receiving process according to the third embodiment is identical with the procedure of the first embodiment shown in FIG. 10.

(D-3) Health Check Frame Receiving Process

The procedure of Health check frame receiving process according to the third embodiment is identical with the procedure of the first embodiment shown in FIG. 11.

(D-4) Health Check Frame Sending Process

Figure 29:
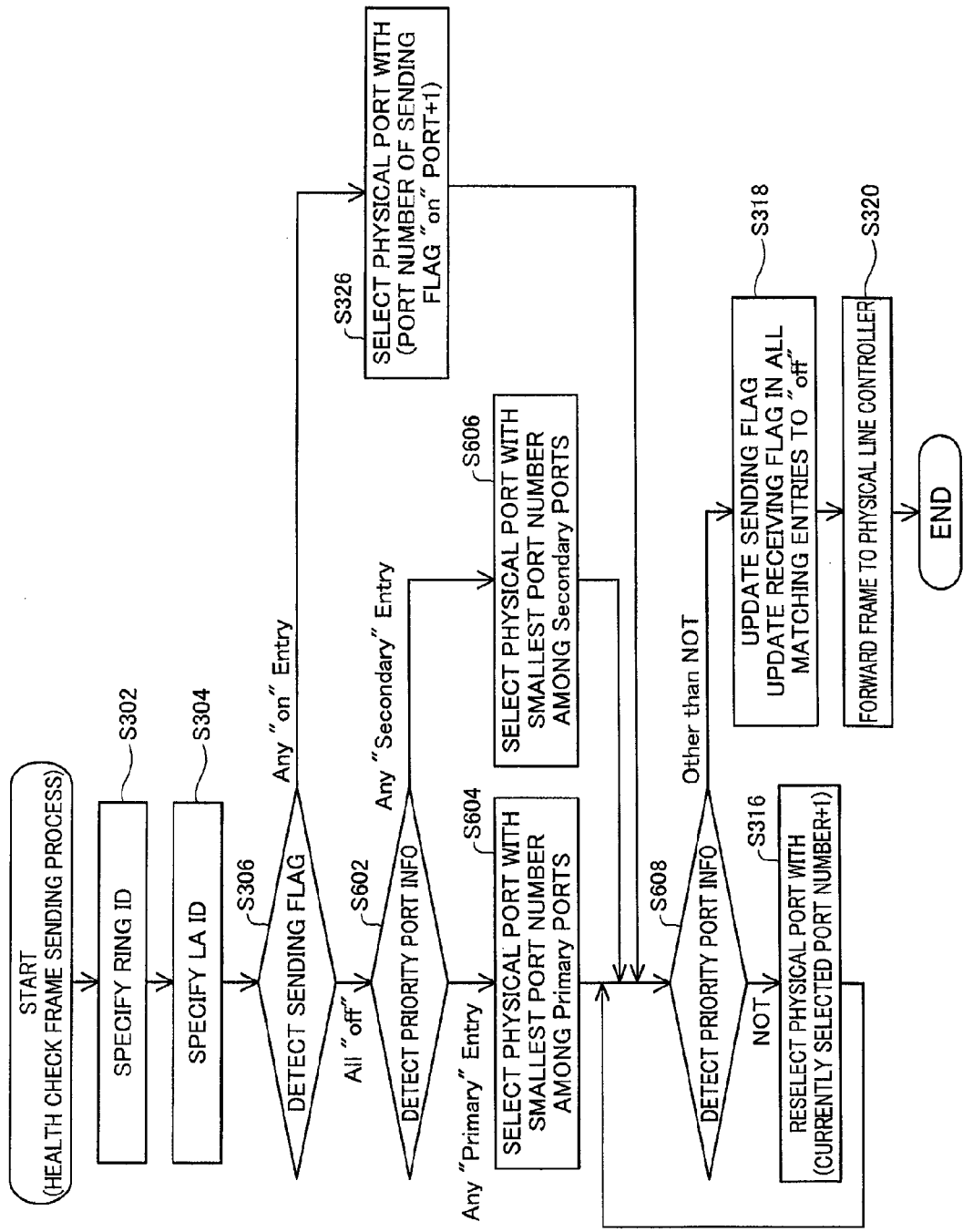
FIG. 29 is a flowchart showing a procedure of Health check frame sending process according to the third embodiment.

FIG. 29 is a flowchart showing a procedure of Health check frame sending process according to the third embodiment. The differences from the first embodiment shown in FIG. 12 include omission of steps S322, S324 and S328, replacement of steps S308, S310 and S312 with steps S602, S604 and S606, and replacement of step S314 with step S608. Otherwise the processing flow of the third embodiment is similar to that of the first embodiment.

When the result of the sending flag detection shows that there is no entry having the setting of "on" in the sending flag field among the matching entries identified by the combination of the Ring ID and the LA ID (step S306: All "off"), the Health check transmission controller 430b detects the priority port information (step S602). More specifically, the Health check transmission controller 430b reads out the priority port information set in the matching entries identified by the LA ID (as the search result of step S306).

When there is any entry having the priority port information "Primary" (step S602: Any "Primary" Entry) among the matching entries, the Health check transmission controller 430b selects the physical port with the smallest number (i.e., the smallest physical port number when the physical port numbers are sorted in the ascending order) out of the matching entries identified by the LA ID (as the search result of step S306) and having the priority port information "Primary" (step S604) and goes to step S608. When there is any entry having the priority port information "Secondary" (step S602: Any "Secondary" Entry) among the matching entries, on the other hand, the Health check transmission controller 430b selects the physical port with the smallest number (i.e., the smallest physical port number when the physical port numbers are sorted in the ascending order) out of the matching entries identified by the LA ID (as the search result of step S306) and having the priority port information "Secondary" (step S606) and goes to step S608.

The Health check transmission controller 430b detects the priority port information of the selected physical port (step S608). More specifically, the Health check transmission controller 430b searches the Health check sending/receiving management table 420b with the selected physical port number as a key and detects the priority port information set in the matching entry. When the detected priority port information is "NOT" that indicates no use as the sending port of a Health check frame (Step S608: NOT), the Health check transmission controller 430b goes to step S316 to reselect the physical port with the physical port number equal to the (currently selected port number+1). The details of this reselection are described previously with reference to FIG. 12. When the detected priority port information is other than "NOT" (step S608: Other than "NOT"), on the other hand, the Health check transmission controller 430b goes to step S318 to update the settings of the sending flag and receiving flag.

(D-5) Physical Port Status Change Process

Figure 30:
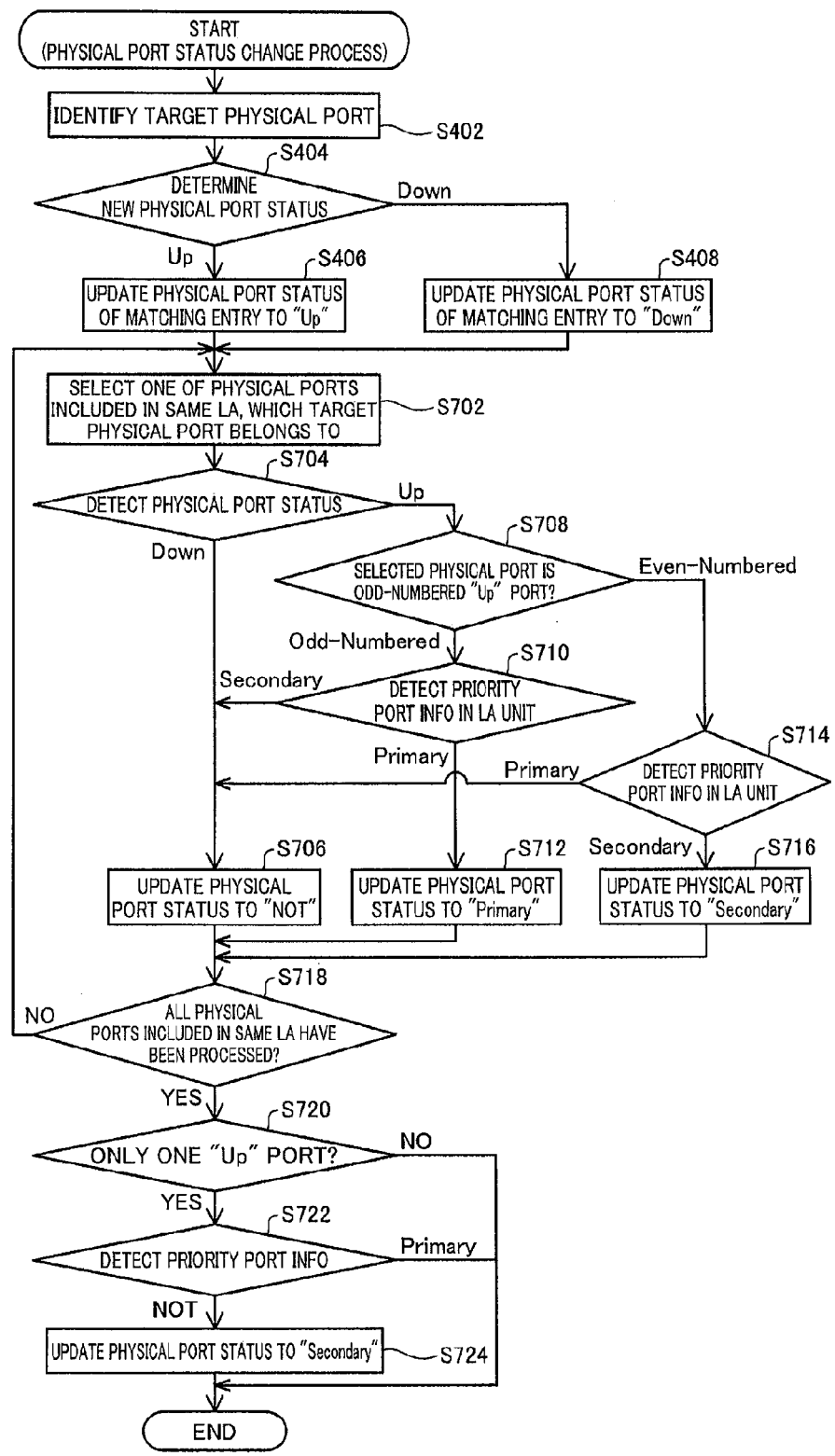
FIG. 30 is a flowchart showing a procedure of physical port status change process according to the third embodiment.

FIG. 30 is a flowchart showing a procedure of physical port status change process according to the third embodiment. The difference from the first embodiment shown in FIG. 13 is only addition of steps S702 to S724 after step S408. Otherwise the processing flow of the third embodiment is similar to that of the first embodiment.

At step S702, the Health check frame controller 400b selects one of the physical ports included in the same LA, which the identified target physical port belongs to. The physical port may be selected in the ascending order among the matching physical ports. More specifically, the Health check frame controller 400b specifies the LA ID, which the target physical port identified at step S402 belongs to, and selects one of the matching physical ports having the same LA ID. The Health check frame controller 400b subsequently detects the physical port status of the selected physical port (step S704). More specifically, the Health check frame controller 400b searches the Health check sending/receiving management table 420b with the selected physical port number as a key and detects the physical port status set in the matching entry. When the physical port status is "Down" that indicates the incommunicable state (step S704: Down), the Health check frame controller 400b updates the setting of the priority port information in the matching entry of the selected physical port to "NOT" (step S706) and goes to step S718.

When the physical port status is "Up" that indicates the communicable state (step S704: Up), on the other hand, the Health check frame controller 400b subsequently determines whether the selected physical port is an odd-numbered "Up" port (step S708). More specifically, the Health check frame controller 400b determines whether the physical port selected at step S702 is an odd-numbered port among the physical ports having the same LA ID and the physical port status "Up" (i.e., connecting with the communicable physical line).

When the selected physical port is an odd-numbered "Up" port (step S708: Odd-Numbered), the Health check frame controller 400b detects the priority port information in the LA unit (step S710). More specifically, the Health check frame controller 400b determines whether the priority port information correlated to the LA ID, which the selected physical port belongs to, is "Primary" or "Secondary". When the priority port information is "Primary" (step S710: Primary), the Health check frame controller 400b updates the setting of the priority port information in the matching entry of the selected physical port to "Primary" (step S712) and goes to step S718.

When the priority port information is "Secondary" (step S710: Secondary), on the other hand, the Health check frame controller 400b goes to step S706 to update the setting of the priority port information in the matching entry of the selected physical port to "NOT".

When the selected physical port is an even-numbered "Up" port (step S708: Even-Numbered), the Health check frame controller 400b detects the priority port information in the LA unit (step S714). The details of the detection in the LA unit are identical with those of step S710 described above. When the priority port information is "Primary" (step S714: Primary), the Health check frame controller 400b goes to step S706 to update the setting of the priority port information in the matching entry of the selected physical port to "NOT". When the priority port information is "Secondary" (step S714: Secondary), on the other hand, the Health check frame controller 400b updates the setting of the priority port information in the matching entry of the selected physical port to "Secondary" (step S716) and goes to step S718.

At step S718, the Health check frame controller 400b determines whether all the physical ports having the same LA ID, which the target physical port identified at step S402 belongs to, have been subjected to the processing of steps S702 to S716. When there is any physical port that has not yet been processed (step S718: NO), the Health check frame controller 400b returns the processing flow to step S702.

When all the physical ports have already been processed (step S718: YES), the Health check frame controller 400b subsequently determines whether there is only one "Up" port (step S720). More specifically, the Health check frame controller 400b determines whether there is only one port having the physical port status "Up" (i.e., connecting with the communicable physical line) among the physical ports having the same LA ID, which the target physical port identified at step S402 belongs to. When there are multiple "Up" ports (step S720: NO), the Health check frame controller 400b terminates the physical port status change process.

When there is only one "Up" port (step S720: YES), the Health check frame controller 400b detects the priority port information of the "Up" port (step S722). More specifically, the Health check frame controller 400*b* reads out the priority port information set in the matching entry of the "Up" port. When the priority port information is "Primary" (step S722: Primary), the Health check frame controller 400*b* terminates the physical port status change process. When the priority port information is "NOT" (step S722: NOT), on the other hand, the Health check frame controller 400*b* updates the setting of the priority port information in the matching entry of the "Up" port to "Secondary" (step S724) and then terminates the physical port status change process.

(D-6) Operations

The following describes sending and receiving Health check frames in a network including the switches 10*b* according to the third embodiment. The configuration of the drawings used for the explanation according to the third embodiment is similar, in principle, to that used for the explanation of the first embodiment. The following mainly describes the differences from the first embodiment.

(D-6-1) Time t1: (State 1 Before Occurrence of Failure)

Figure 31:
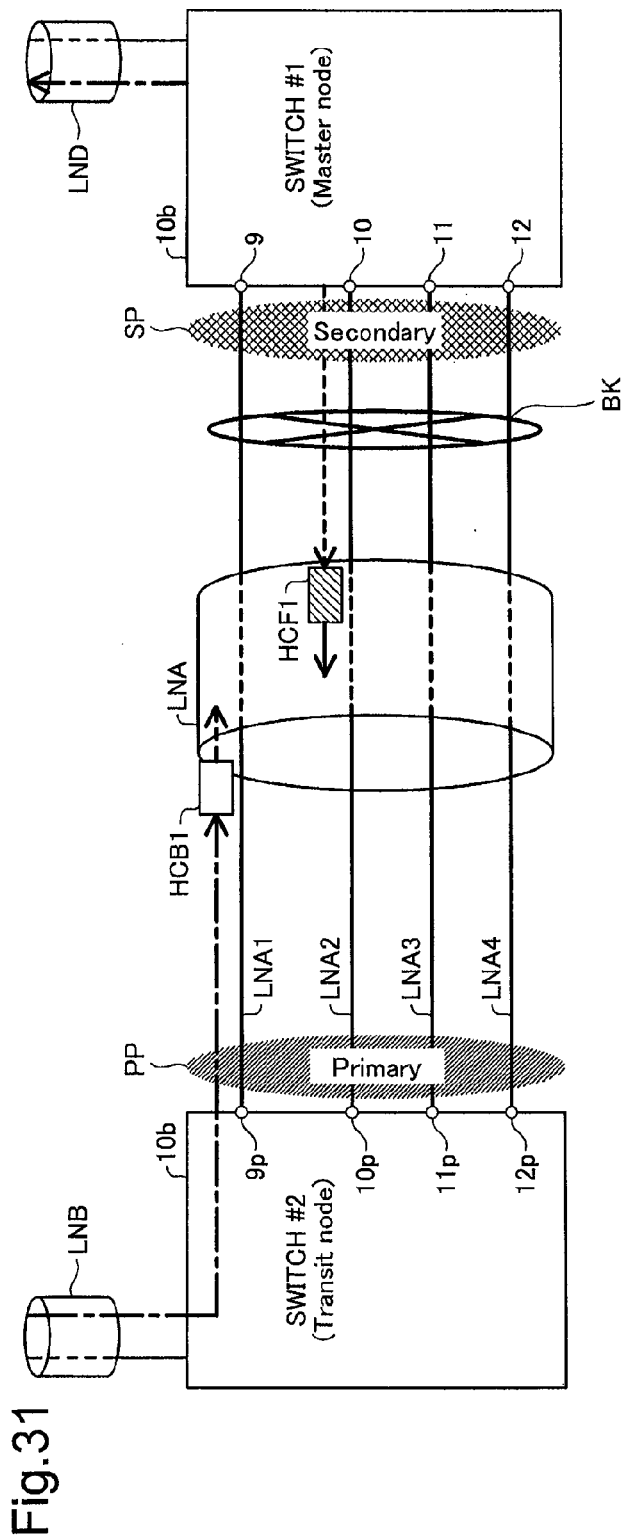
FIG. 31 is a diagram illustrating the state where transmission and reception of Health check frames starts in the network according to the third embodiment.

FIG. 31 is a diagram illustrating the state where transmission and reception of Health check frames starts in the network according to the third embodiment.

The following describes sending a Health check frame HCF1 with the Ring ID 10 from a Secondary port of the switch #1 to the switch #2 at a time t1 shown in FIG. 31.

When receiving a Health check frame HCF1 generated by the Ring manager 100 of the switch #1, the Health check transmission controller 430*b* performs the Health check frame sending process (FIG. 29). In the Health check frame sending process, the Health check transmission controller 430*b* goes through the processing flow of steps S302 to S306 and detects the priority port information (step S602). There is any entry having the priority port information "Secondary" among the matching entries identified by the combination of the Ring ID 10 and the LA ID 1 in the Health check sending/receiving management table 420*b* (step S602: Any "Secondary" Entry), so that the Health check transmission controller 430*b* selects the physical port with the smallest physical port number among the "Secondary" ports (ports with the priority port information "Secondary"), i.e., the physical port with the physical port number 10 (step S606). The Health check transmission controller 430*b* then detects the priority port information of the selected physical port (step S608). Since the priority port information of the selected physical port number 10 is other than "NOT" in the entry E12 of the Health check sending/receiving management table 420*b* (step S608: Other than "NOT"), the Health check transmission controller 430*b* goes through the processing flow of steps S318 and S320. The Health check frame HCF1 is accordingly sent from the selected physical port with the physical port number 10 via the physical line LNA2 to the switch #2.

The following describes sending a Health check frame HCB1 with the Ring ID 10 from a Primary port of the switch #2 to the switch #1 at the time t1 shown in FIG. 31.

When receiving a Health check frame HCB1 sent from another Transit node and received by the switch #2, the Health check transmission controller 430*bp* performs the Health check frame sending process (FIG. 29). In the Health check frame sending process, the Health check transmission controller 430*bp* goes through the processing flow of steps S302 to S306 and detects the priority port information (step S602). There is any entry having the priority port information "Primary" among the matching entries identified by the combination of the Ring ID 10 and the LA ID 1 in the Health check sending/receiving management table 420*bp* (step S602: Any "Primary" Entry), so that the Health check transmission controller 430*bp* selects the physical port with the smallest physical port number among the "Primary" ports (ports with the priority port information "Primary"), i.e., the physical port with the physical port number 9p (step S604). The Health check transmission controller 430*bp* then detects the priority port information of the selected physical port (step S608). Since the priority port information of the selected physical port number 9p is other than "NOT" in the entry E21 of the Health check sending/receiving management table 420*bp* (step S608: Other than "NOT"), the Health check transmission controller 430*bp* goes through the processing flow of steps S318 and S320. The Health check frame HCB1 is accordingly sent from the selected physical port with the physical port number 9p via the physical line LNA1 to the switch #1.

(D-6-2) Time t2: (State 2 Before Occurrence of Failure)

Figure 32:
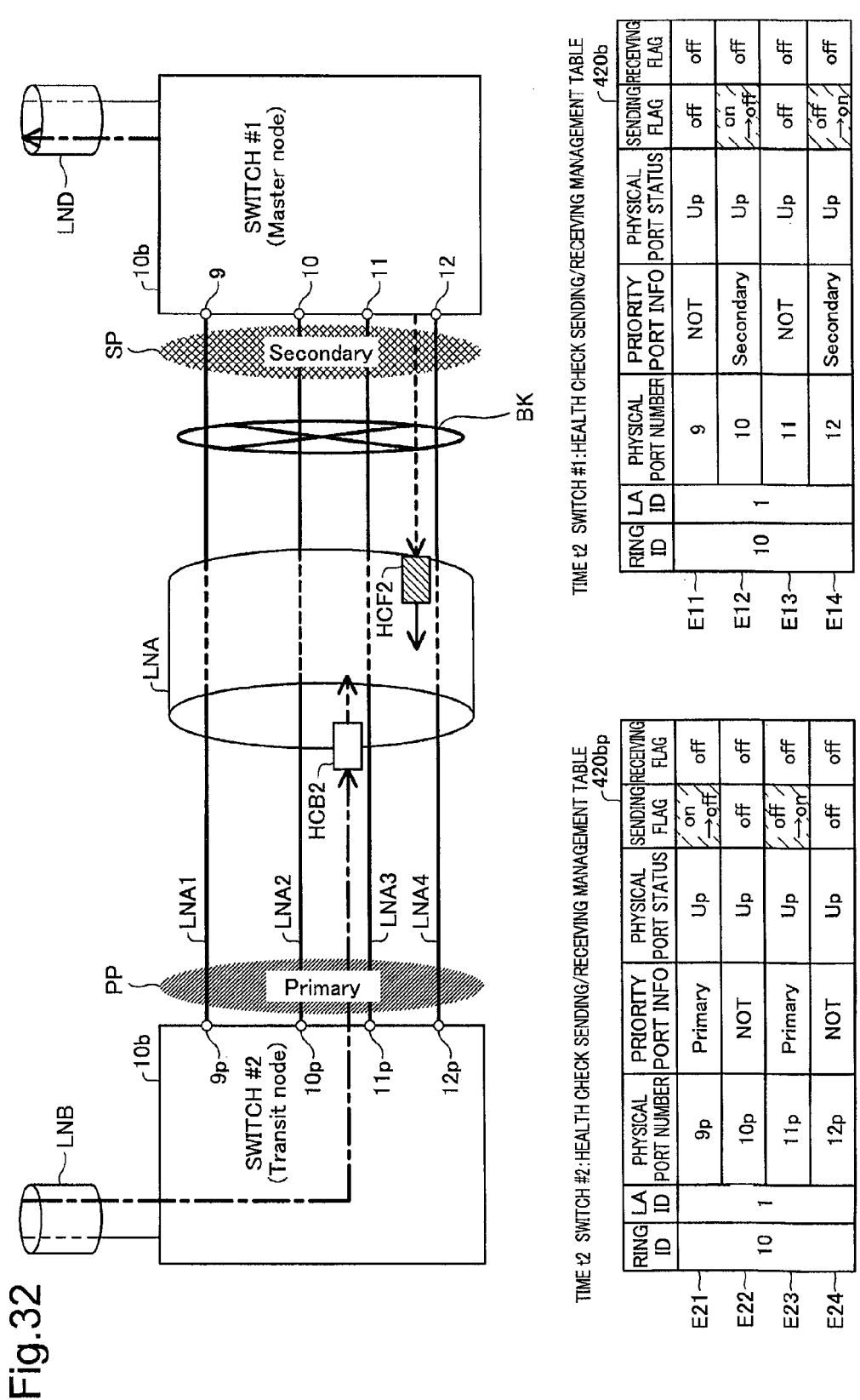
FIG. 32 is a diagram illustrating the state where transmission and reception of Health check frames is performed for the second time in the network according to the third embodiment.

FIG. 32 is a diagram illustrating the state where transmission and reception of Health check frames is performed for the second time in the network according to the third embodiment.

The transmission of a Health check frame HCF2 with the Ring ID 10 from a Secondary port of the switch #1 to the switch #2 at a time t2 shown in FIG. 32 follows the procedure of the third embodiment at the time t1 described above (FIG. 31). The Health check frame HCF2 is accordingly sent from the "Secondary" port having the priority port information other than "NOT", i.e., the selected physical port with the physical port number 12, via the physical line LNA4 to the switch #2.

The transmission of a Health check frame HCB2 with the Ring ID 10 from a Primary port of the switch #2 to the switch #1 at the time t2 shown in FIG. 32 follows the procedure of the third embodiment at the time t1 described above (FIG. 31). The Health check frame HCB2 is accordingly sent from the "Primary" port having the priority port information other than "NOT", i.e., the selected physical port with the physical port number 11p, via the physical line LNA3 to the switch #1.

(D-6-3) Time t3 (on Occurrence of Failure)

Figure 33:
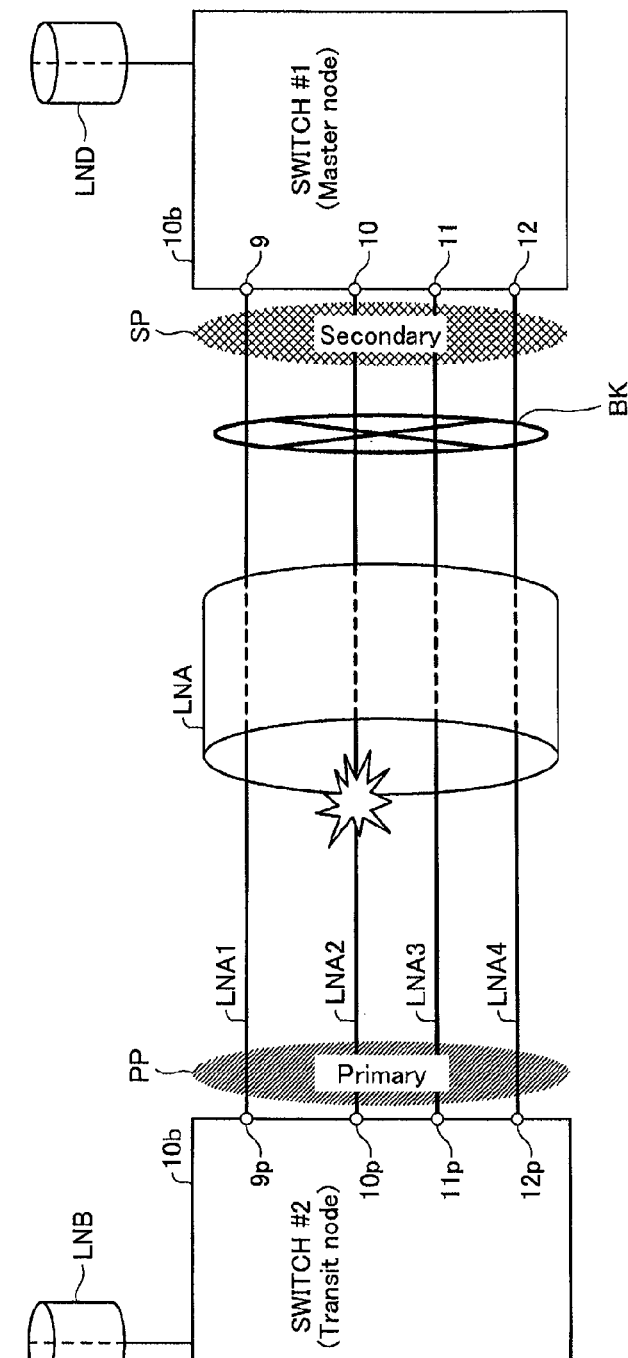
FIG. 33 is a diagram illustrating the occurrence of a failure in the network according to the third embodiment.

FIG. 33 is a diagram illustrating the occurrence of a failure in the network according to the third embodiment. The following describes series of processing when a failure occurs in one part of the physical lines constituting the virtual line LNA (in the illustrated example of FIG. 33, physical line LNA2) at a time t3 as shown in FIG. 33.

The Health check frame controller 400*b* of the switch #1 identifies the target physical port 10 connecting with the physical line LNA2, on which the occurrence of a failure is detected, and determines the new setting of the physical port status, based on a notification from the physical line controller 500 (steps S402 and S404, FIG. 30). Since the setting of "Down" is determined as the new setting of the physical port status based on the notification of the occurrence of a failure on the physical line LNA2 (step S404: Down), the Health check frame controller 400*b* updates the setting of the physical port status from "Up" to "Down" in the entry E12 of the Health check sending/receiving management table 420*b* (step S408).

The Health check frame controller 400*b* selects the physical port with the physical port number 9 as one of the physical ports included in the same LA (LA ID 1), which the identified target physical port 10 belongs to, and detects the physical port status of the selected physical port (steps S702 and S704). The physical port status of the selected physical port number 9 is "Up" in the entry E11 of the Health check sending/receiving management table 420*b* of the switch #1 at the time t3 (step S704: Up). The Health check frame controller 400*b* then determines whether the selected physical port is an odd-numbered "Up" port (port connecting with the communicable physical line) (step S708). The physical port with the physical port number 9 is the first "Up" port, i.e., the odd-numbered "Up" port (step S708: Odd-Numbered). The Health check frame controller 400b subsequently determines whether the priority port information correlated to the LA ID, which the selected physical port with the physical port number 9 belongs to, is "Primary" or "Secondary" (step S710). The priority port information correlated to the LA ID 1, which the physical port with the physical port number 9 belongs to, is "Secondary" (step S710: Secondary), so that the Health check frame controller 400b updates the setting of the priority port information from "NOT" to "NOT" in the entry E11 of the physical port number 9 (step S706). Since the processing has not yet been completed for all the physical ports belonging to the same LA ID 1 (step S718: NO), the Health check frame controller 400b returns the processing flow to step S702.

The Health check frame controller 400b subsequently selects the physical port with the physical port number 10 as another one of the physical ports included in the same LA (LA ID 1), which the identified target physical port 10 belongs to, and detects the physical port status of the selected physical port (steps S702 and S704). The physical port status of the selected physical port number 10 is "Down" in the entry E12 of the Health check sending/receiving management table 420b (step S704: Down). The Health check frame controller 400b then updates the setting of the priority port information from "Secondary" to "NOT" in the entry E12 of the physical port number 10 (step S706). Since the processing has not yet been completed for all the physical ports belonging to the same LA ID 1 (step S718: NO), the Health check frame controller 400b returns the processing flow to step S702.

The Health check frame controller 400b subsequently selects the physical port with the physical port number 11 as another one of the physical ports included in the same LA (LA ID 1), which the identified target physical port 10 belongs to, and detects the physical port status of the selected physical port (steps S702 and S704). The physical port status of the selected physical port number 11 is "Up" in the entry E13 of the Health check sending/receiving management table 420b (step S704: Up). The Health check frame controller 400b then determines whether the selected physical port is an odd-numbered "Up" port (step S708). The physical port with the physical port number 11 is the second "Up" port, i.e., the even-numbered "Up" port (step S708: Even-Numbered). The Health check frame controller 400b subsequently determines whether the priority port information correlated to the LA ID, which the selected physical port with the physical port number 11 belongs to, is "Primary" or "Secondary" (step S714). The priority port information correlated to the LA ID 1, which the physical port with the physical port number 11 belongs to, is "Secondary" (step S714: Secondary), so that the Health check frame controller 400b updates the setting of the priority port information from "NOT" to "Secondary" in the entry E13 of the physical port number 11 (step S716). Since the processing has not yet been completed for all the physical ports belonging to the same LA ID 1 (step S718: NO), the Health check frame controller 400b returns the processing flow to step S702.

The Health check frame controller 400b subsequently selects the physical port with the physical port number 12 as another one of the physical ports included in the same LA (LA ID 1), which the identified target physical port 10 belongs to, and detects the physical port status of the selected physical port (steps S702 and S704). The physical port status of the selected physical port number 12 is "Up" in the entry E14 of the Health check sending/receiving management table 420b (step S704: Up). The Health check frame controller 400b then determines whether the selected physical port is an odd-numbered "Up" port (port connecting with the communicable physical line) (step S708). The physical port with the physical port number 12 is the third "Up" port, i.e., the odd-numbered "Up" port (step S708: Odd-Numbered). The Health check frame controller 400b subsequently determines whether the priority port information correlated to the LA ID, which the selected physical port with the physical port number 12 belongs to, is "Primary" or "Secondary" (step S710). The priority port information correlated to the LA ID 1, which the physical port with the physical port number 12 belongs to, is "Secondary" (step S710: Secondary), so that the Health check frame controller 400b updates the setting of the priority port information from "Secondary" to "NOT" in the entry E14 of the physical port number 12 (step S706).

Since all the physical ports belonging to the same LA ID 1 have been processed (step S718: YES), the Health check frame controller 400b subsequently determines whether there is only one "Up" port among the physical ports belonging to the same LA ID 1 (step S720). There are three "Up" ports with the physical port numbers 9, 11 and 12 among the physical ports belonging to the same LA ID 1 (step S720: NO). The Health check frame controller 400b then terminates the physical port status change process.

The Health check frame controller 400bp of the switch #2 performs the same series of processing with respect to the physical port 10p connecting with the physical line LNA2, on which the occurrence of a failure is detected, based on a notification from the physical line controller 500p.

On the occurrence of a failure in a physical line, the Health check frame controller 400b updates the settings of the priority port information in the Health check sending/receiving management table 420b, with respect to all the physical lines having the same LA ID, which the failed physical line belongs to. More specifically, on the occurrence of a failure in a physical line, the priority port information is updated to "NOT" for the physical port connecting with the failed physical line in the Health check sending/receiving management table 420b of the switch 10b. The failed physical line is thus not used for subsequent transmission of a Health check frame.

(D-6-4) Time t4 (State 1 after Occurrence of Failure)

Figure 34:
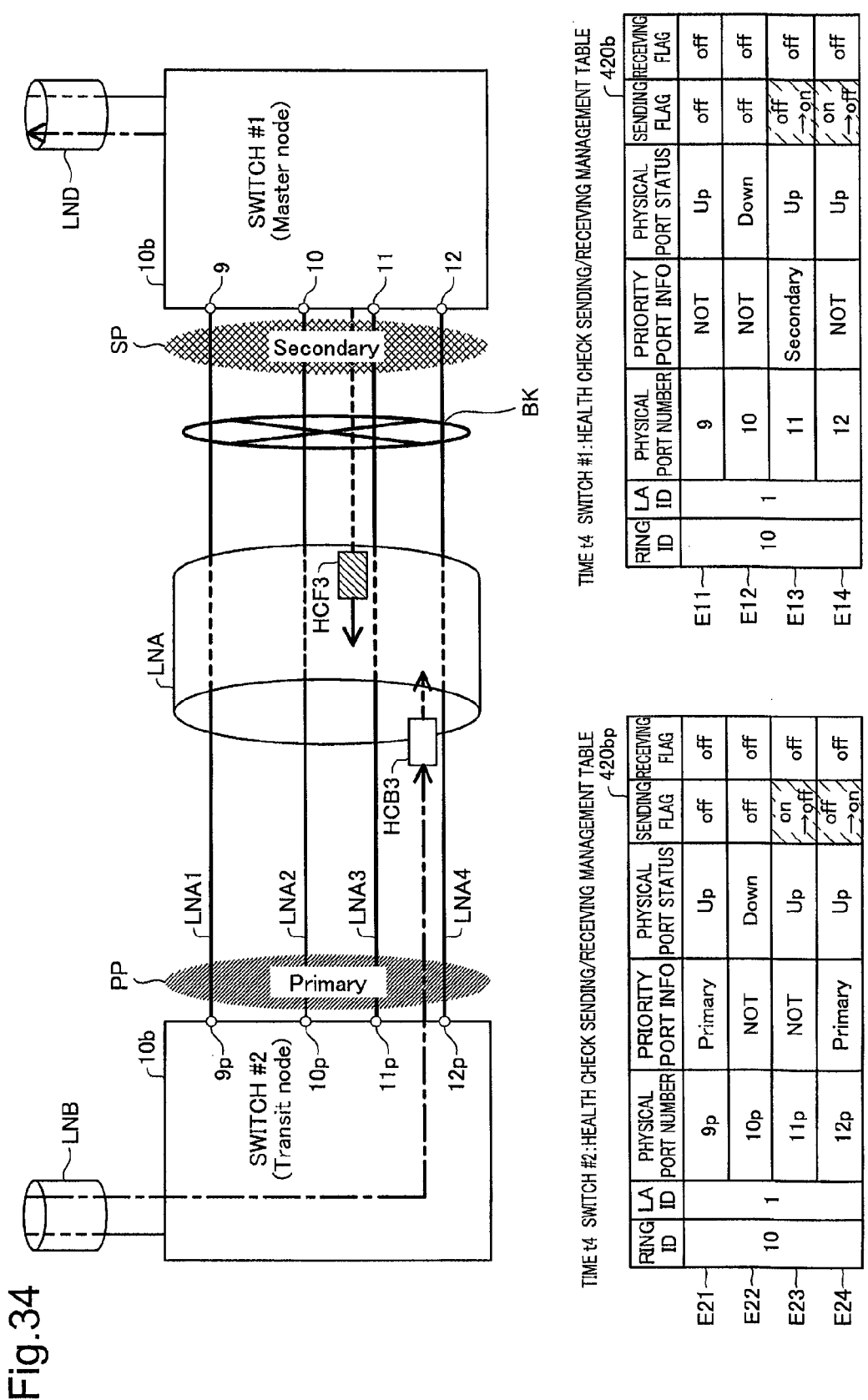
FIG. 34 is a diagram illustrating the state where transmission and reception of Health check frames restarts after the occurrence of a failure in the network according to the third embodiment.

FIG. 34 is a diagram illustrating the state where transmission and reception of Health check frames restarts after the occurrence of a failure in the network according to the third embodiment.

The following describes sending a Health check frame HCF3 with the Ring ID 10 from a Secondary port of the switch #1 to the switch #2 at a time t4 shown in FIG. 34.

When receiving a Health check frame HCF3 generated by the Ring manager 100 of the switch #1, the Health check transmission controller 430b performs the Health check frame sending process (FIG. 29). In the Health check frame sending process, the Health check transmission controller 430b goes through the processing flow of steps S302 and S304 and detects the sending flag (step S306). Since there is the entry E14 having the "on" setting of the sending flag among the entries E11 to E14 having the Ring ID 10 and the LA ID 1 in the Health check sending/receiving management table 420b of the switch #1 at the time t4 (step S306: Any "on" Entry), the Health check transmission controller 430b selects the physical port with the physical port number equal to the (port number of the sending flag "on" port+1), i.e., the physical port number 9 (step S326). The Health check transmission controller 430b subsequently detects the priority port information of the selected physical port number 9 (step S608). Since the priority port information of the selected physical port number 9 is "NOT" in the entry E11 of the Health check sending/receiving management table 420*b* (step S608: "NOT"), the Health check transmission controller 430*b* reselects the physical port with the physical port number equal to the (currently selected port number+1), i.e., the physical port number 10 (step S316).

The Health check transmission controller 430*b* then detects the priority port information of the reselected physical port number 10 (step S608). Since the priority port information of the selected physical port number 10 is "NOT" in the entry E12 of the Health check sending/receiving management table 420*b* (step S608: "NOT"), the Health check transmission controller 430*b* reselects the physical port with the physical port number equal to the (currently selected port number+ 1), i.e., the physical port number 11 (step S316). The Health check transmission controller 430*b* then detects the priority port information of the reselected physical port number 11 (step S608). Since the priority port information of the selected physical port number 11 is "Secondary" in the entry E13 of the Health check sending/receiving management table 420*b* (step S608: Other than "NOT"), the Health check transmission controller 430*b* goes through the processing flow of steps S318 and S320. The Health check frame HCF3 is accordingly sent from the physical port with the physical port number 11 reselected at step S316 via the physical line LNA3 to the switch #2.

The following describes sending a Health check frame HCB3 with the Ring ID 10 from a Primary port of the switch #2 to the switch #1 at the time t4 shown in FIG. 34.

When receiving a Health check frame HCB3 sent from another Transit node and received by the switch #2, the Health check transmission controller 430*bp* performs the Health check frame sending process (FIG. 29). In the Health check frame sending process, the Health check transmission controller 430*bp* goes through the processing flow of steps S302 and S304 and detects the sending flag (step S306). Since there is the entry E23 having the "on" setting of the sending flag among the entries E21 to E24 having the Ring ID 10 and the LA ID 1 in the Health check sending/receiving management table 420*bp* of the switch #2 at the time t4 (step S306: Any "on" Entry), the Health check transmission controller 430*bp* selects the physical port with the physical port number equal to the (port number of the sending flag "on" port+1), i.e., the physical port number 12p (step S326). The Health check transmission controller 430*bp* then detects the priority port information of the selected physical port 12*p* (step S608). Since the priority port information of the selected physical port number 12p is "Primary" in the entry E24 of the Health check sending/receiving management table 420*bp* (step S608: Other than "NOT"), the Health check transmission controller 430*bp* goes through the processing flow of steps S318 and S320. The Health check frame HCB3 is accordingly sent from the physical port with the physical port number 12p selected at step S326 via the physical line LNA4 to the switch #1.

(D-6-5) Time t5 (State 2 after Occurrence of Failure)

Figure 35:
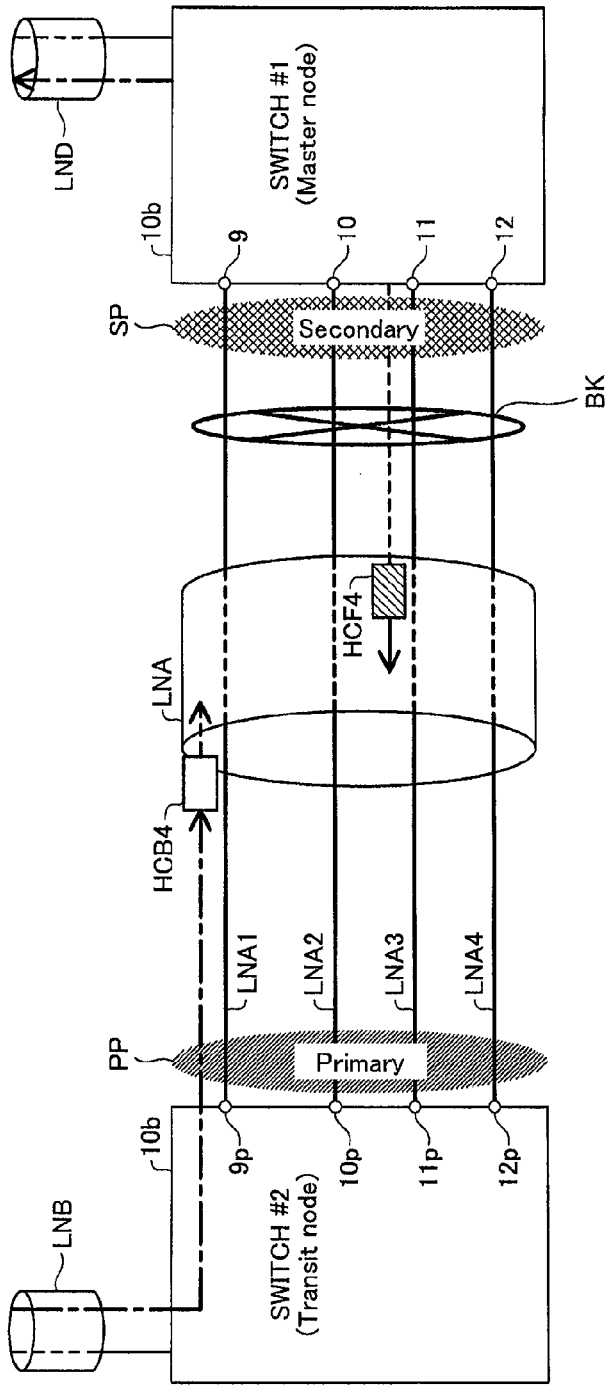
FIG. 35 is a diagram illustrating the state where transmission and reception of Health check frames continues after the occurrence of a failure in the network according to the third embodiment.

FIG. 35 is a diagram illustrating the state where transmission and reception of Health check frames continues after the occurrence of a failure in the network according to the third embodiment.

The transmission of a Health check frame HCF4 with the Ring ID 10 from a Secondary port of the switch #1 to the switch #2 at a time t5 shown in FIG. 35 follows the procedure of the third embodiment at the time t4 described above (FIG. 34). The Health check frame HCF4 is accordingly sent from the "Secondary" port having the priority port information other than "NOT", i.e., the selected physical port with the physical port number 11, via the physical line LNA3 to the switch #2.

The transmission of a Health check frame HCB4 with the Ring ID 10 from a Primary port of the switch #2 to the switch #1 at the time t5 shown in FIG. 35 follows the procedure of the third embodiment at the time t4 described above (FIG. 34). The Health check frame HCB4 is accordingly sent from the "Primary" port having the priority port information other than "NOT", i.e., the selected physical port with the physical port number 9p, via the physical line LNA1 to the switch #1.

As described above, in the Health check sending/receiving management table 420*b* of the third embodiment, the priority port information with respect to the virtual line used as Primary ports has the setting of "Primary" registered in advance in the entries of the odd-numbered ports among the physical ports connecting with the communicable physical lines and the setting of "NOT" registered in advance in the entries of the even-numbered ports. On the contrary, the priority port information with respect to the virtual line used as Secondary ports has the setting of "Secondary" registered in advance in the entries of the even-numbered ports among the physical ports connecting with the communicable physical lines and the setting of "NOT" registered in advance in the entries of the odd-numbered ports. After the occurrence of a failure in a physical line, the Health check frame controller 400*b* performs the physical port status change process (FIG. 30) to update the contents of the Health check sending/receiving management table 420*b*, or more specifically the registry of the priority port information, according to the above rules.

Regardless of before or after the occurrence of a failure, the odd-numbered lines among the communicable physical lines are used for transmission of Health check frames from Primary ports, whilst the even-numbered lines are used for transmission of Health check frames from Secondary ports. In other words, the configuration of the third embodiment uses the ports connecting with part of the physical lines constituting the virtual line to send Health check frames from Primary ports, while using the ports connecting with another part of the physical lines constituting the virtual line to send Health check frames from Secondary ports.

In the configuration of the third embodiment described above, the Health check transmission controller 430*b* of the Health check frame controller 400*b* (status check frame controller) enables transmission of Health check frames in such a manner as to avoid using the same port as both the frame-sending port to send a Health check frame (status check frame) to a Primary port (port in the first direction) and the frame-receiving port to receive from another switch a Health check frame sent to a Secondary port (port in the second direction) and circulated in the Ring network.

Like the first embodiment, the configuration of the third embodiment prevents or at least reduces false detection of a failure in the virtual line by the network relay device (switch 10*b*) configured to use the virtual line for making physical lines redundant and to exchange control frames (Health check frames) for use in checking the status of the network with another network relay device (switch 10*b*).

In the configuration of the third embodiment, on the occurrence of a failure in one of the physical lines constituting the virtual line, the Health check frame controller 400*b* (status check frame controller) reselects the physical line used for transmission of a Health check frame from a Primary port (one part of physical lines) and the physical line used for transmission of a Health check frame from a Secondary port (another part of physical lines). This effectively reduces false detection of a failure on the virtual line, even after the occurrence of a failure.

E. Fourth Embodiment

Another configuration that employs different rules (first rule and second rule) to avoid using the same port as both the frame-sending port to send a Health check frame and the frame-receiving port to receive a Health check frame is described below as a fourth embodiment according to the invention. In the description and the illustrations of the fourth embodiment, the like constituents to those of the first embodiment are expressed by the like numerals to those of the first embodiment and are not specifically explained here.

(E-1) System Configuration

Figure 36:
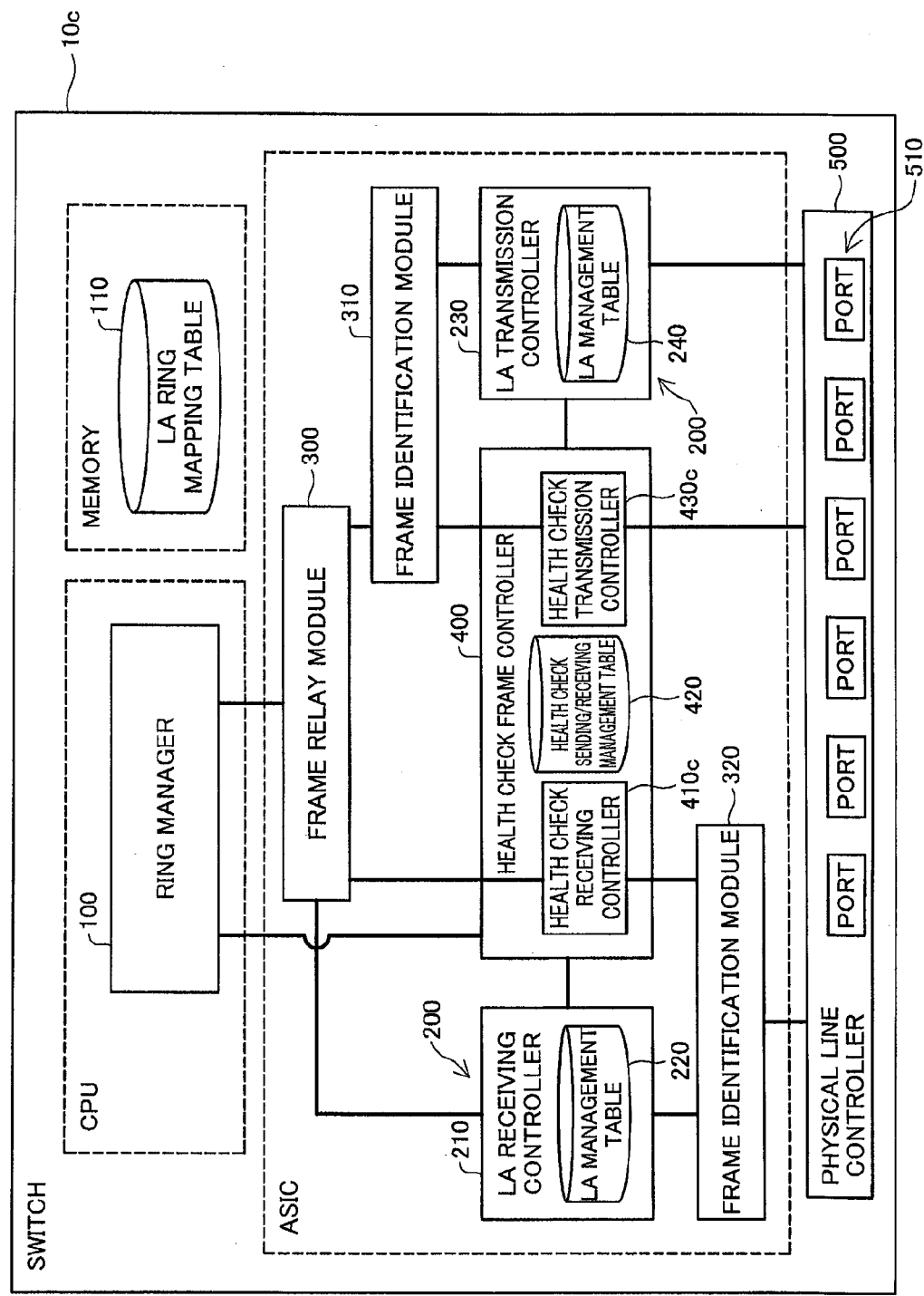
FIG. 36 is a diagram illustrating the general configuration of a switch according to the fourth embodiment.

FIG. 36 is a diagram illustrating the general configuration of a switch 10c according to the fourth embodiment. The difference from the first embodiment shown in FIG. 6 is only a Health check receiving controller 410c and a Health check transmission controller 430c used in place of the Health check receiving controller 410c and the Health check transmission controller 430. Otherwise the configuration and operations of the fourth embodiment are similar to those of the first embodiment.

When receiving a frame, the Health check receiving controller 410c performs a different flow of Health check frame receiving process from the flow of the first embodiment shown in FIG. 11. When receiving a frame, the Health check transmission controller 430c performs a different flow of Health check frame sending process from the flow of the first embodiment shown in FIG. 12.

(E-2) Frame Receiving Process

The procedure of frame receiving process according to the fourth embodiment is identical with the procedure of the first embodiment shown in FIG. 10.

(E-3) Health Check Frame Receiving Process

Figure 37:
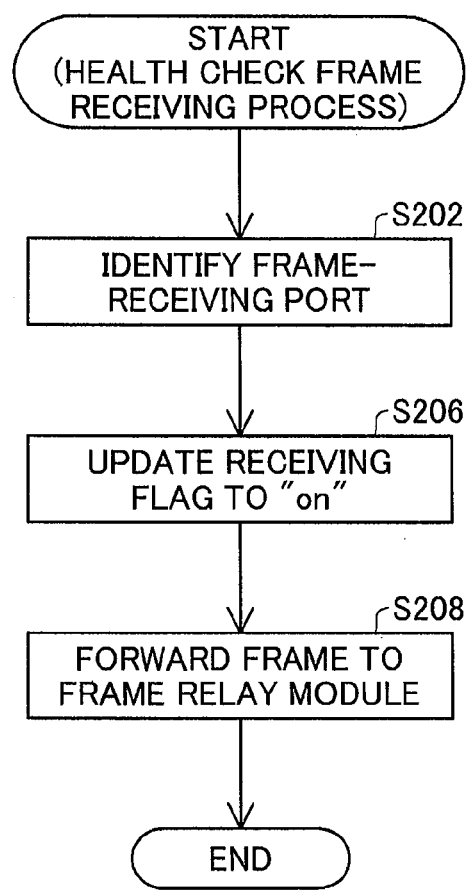
FIG. 37 is a flowchart showing a procedure of Health check frame receiving process according to the fourth embodiment.

FIG. 37 is a flowchart showing a procedure of Health check frame receiving process according to the fourth embodiment. The difference from the first embodiment shown in FIG. 11 is only omission of step S204. Otherwise the processing flow of the fourth embodiment is similar to that of the first embodiment. Unlike the Health check frame receiving process of the first embodiment performed by the Health check receiving controller 410, the Health check receiving controller 410c of the fourth embodiment updates the setting of the receiving flag to "on" for the frame-receiving port used to receive the Health check frame, irrespective of the setting of the sending flag (irrespective of whether the port is the frame-sending port used to send the Health check frame).

(E-4) Health Check Frame Sending Process

Figure 38:
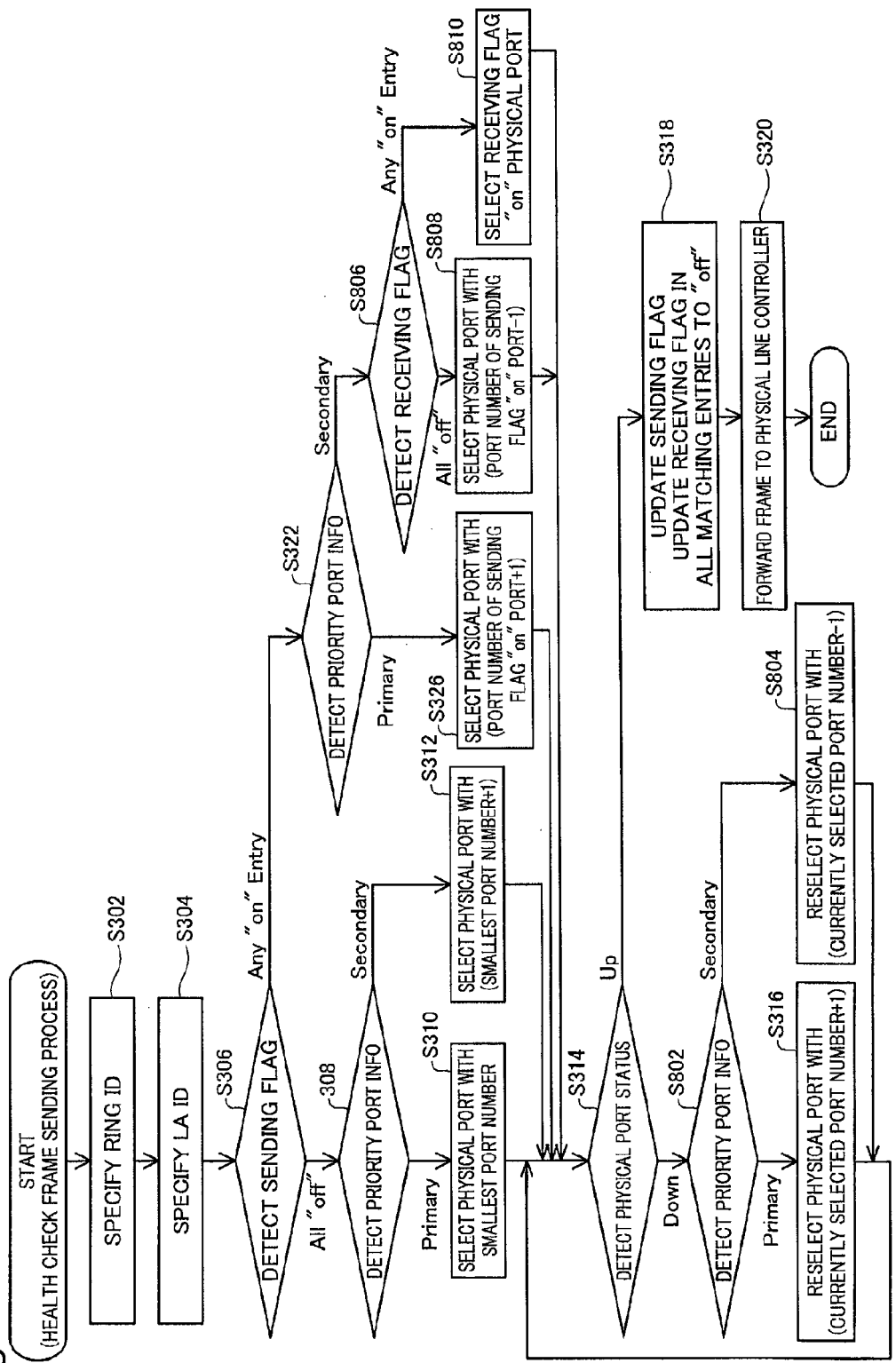
FIG. 38 is a flowchart showing a procedure of Health check frame sending process according to the fourth embodiment.

FIG. 38 is a flowchart showing a procedure of Health check frame sending process according to the fourth embodiment. The differences from the first embodiment shown in FIG. 12 include addition of steps S802 and S804 after step S314 and replacement of steps S324 and S328 with steps S806 to S810. Otherwise the processing flow of the fourth embodiment is similar to that of the first embodiment.

When the detected physical port status is "Down" that indicates the incommunicable state (step S314: Down), the Health check transmission controller 430c detects the priority port information of the selected physical port (step S802). More specifically, the Health check transmission controller 430c searches the Health check sending/receiving management table 420 with the selected physical port number as a key and detects the priority port information set in the matching entry. When the detected priority port information is "Primary" (step S802: Primary), the Health check transmission controller 430c goes to step S316 to reselect the physical port with the physical port number equal to the (currently selected port number+1). The details of this reselection are described previously with reference to FIG. 12. When the detected priority port information is "Secondary" (step S802: Secondary), on the other hand, the Health check transmission controller 430c reselects the physical port with the physical port number equal to the (currently selected port number−1) (step S804). More specifically, the Health check transmission controller 430c sorts the matching entries identified by the LA ID (as the search result of step S306) in the ascending order of the physical port numbers and reselects the physical port with the next smaller physical port number just before the currently selected physical port number. After the reselection at step S804, the Health check transmission controller 430c goes back to step S314.

When the detected priority port information is "Secondary" (step S322: Secondary), the Health check transmission controller 430c detects the receiving flag (step S806). More specifically, the Health check transmission controller 430c determines whether there is any receiving flag "on" entry among the matching entries identified by the LA ID (as the search result of step S306). When there is no receiving flag "on" entry (step S806: All "off"), the Health check transmission controller 430c selects the physical port with the physical port number equal to the (port number of the sending flag "on" port−1) (step S808). More specifically, the Health check transmission controller 430c sorts the matching entries identified by the LA ID (as the search result of step S306) in the ascending order of the physical port numbers and selects the physical port with the next smaller physical port number just before the physical port number of the sending flag "on" entry. When there is any receiving flag "on" entry (step S806: Any "on" Entry), on the other hand, the Health check transmission controller 430c selects the physical port having the "on" setting of the receiving flag (step S810). The Health check transmission controller 430c then goes to step S314, in order to send a frame from the selected physical port.

(E-5) Physical Port Status Change Process

The procedure of physical port status change process according to the fourth embodiment is identical with the procedure of the first embodiment shown in FIG. 13.

(E-6) Operations

The following describes sending and receiving Health check frames in a network including the switches 10c according to the fourth embodiment. The configuration of the drawings used for the explanation according to the second embodiment is similar, in principle, to that used for the explanation of the first embodiment. The following mainly describes the differences from the first embodiment.

(E-6-1) Time t1: (State 1 Before Occurrence of Failure)

Figure 39:
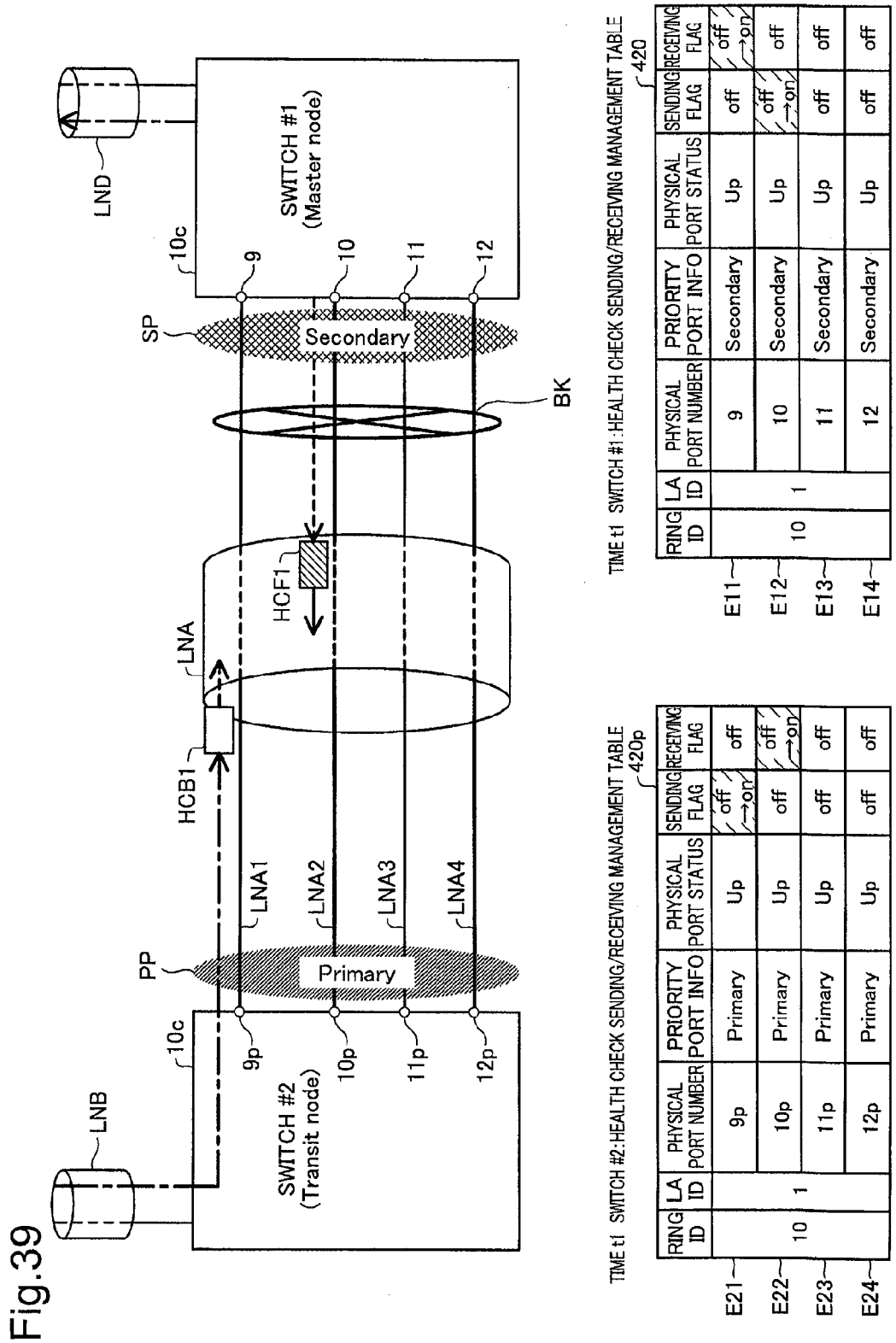
FIG. 39 is a diagram illustrating the state where transmission and reception of Health check frames starts in the network according to the fourth embodiment.

FIG. 39 is a diagram illustrating the state where transmission and reception of Health check frames starts in the network according to the fourth embodiment.

The transmission of a Health check frame HCF1 with the Ring ID 10 from a Secondary port of the switch #1 to the switch #2 at a time t1 shown in FIG. 39 follows the procedure of the first embodiment at the time t1 described above (FIG. 14). The Health check frame HCF1 is accordingly sent from the selected physical port with the physical port number 10 via the physical line LNA2 to the switch #2.

The transmission of a Health check frame HCB1 with the Ring ID 10 from a Primary port of the switch #2 to the switch #1 at the time t1 shown in FIG. 39 follows the procedure of the first embodiment at the time t1 described above (FIG. 14). The Health check frame HCB1 is accordingly sent from the selected physical port with the physical port number 9p via the physical line LNA1 to the switch #1.

The following describes series of processing performed by the switch #1 or the switch #2 after reception of the Health check frame.

In the switch #1, the physical line controller 500 receives the Health check frame HCB1 sent from the switch #2 at the time t1. The Health check frame HCB 1 is forwarded to the Health check receiving controller 410c through the physical line controller 500 and the frame identification module 320 (step S104, FIG. 10). When receiving the Health check frame HCB1, the Health check receiving controller 410c performs the Health check frame receiving process (FIG. 37). More specifically, the Health check receiving controller 410c refers to the header information of the received frame to identify the frame-receiving port of the Health check frame HCB1 (i.e., physical port number 9) (step S202). The Health check receiving controller 410c subsequently updates the setting of the receiving flag from "off" to "on" in the entry E11 of the frame-receiving port with the physical port number 9 in the Health check sending/receiving management table 420 (step S206) and forwards the received frame to the frame relay module 300 (step S208).

When receiving the Health check frame HCF1 from the switch #1, the switch #2 similarly performs the frame receiving process (FIG. 10) and the Health check frame receiving process (FIG. 37) in the same manner as that performed by the switch #1.

As the result, the setting of "on" is stored in the receiving flag field of the frame-receiving port used to receive a Health check frame from another switch 10c, in the Health check sending/receiving management table 420 of each switch 10c.

(E-6-2) Time t2: (State 2 Before Occurrence of Failure)

Figure 40:
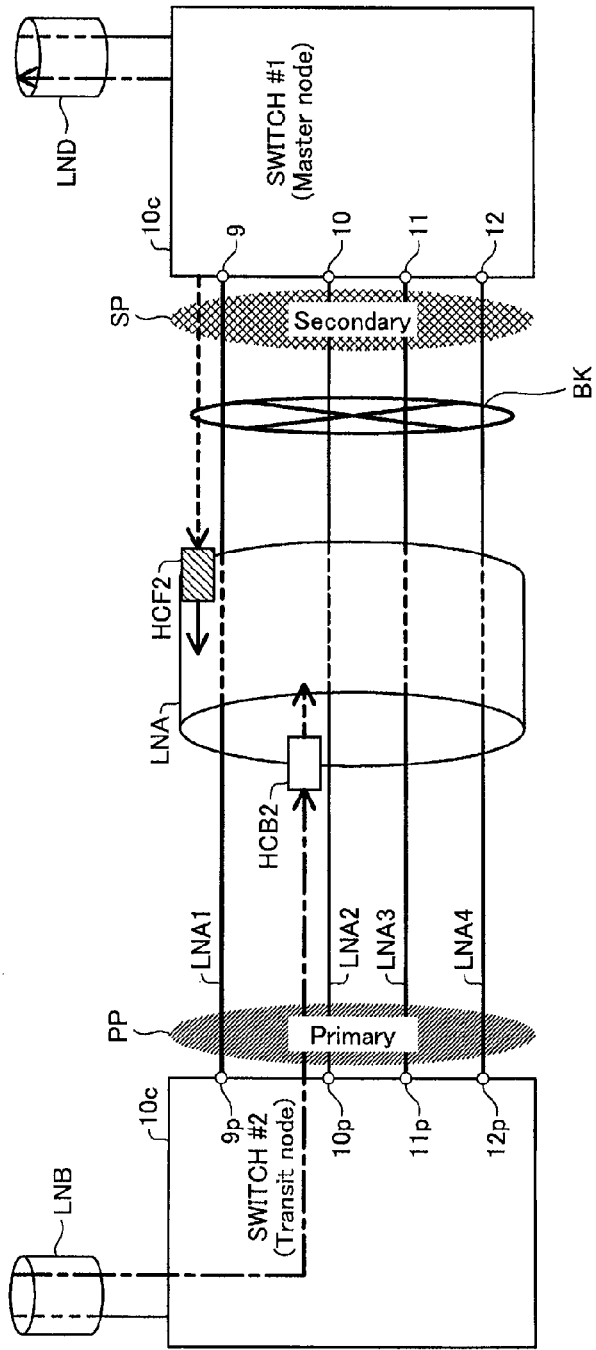
FIG. 40 is a diagram illustrating the state where transmission and reception of Health check frames is performed for the second time in the network according to the fourth embodiment.

FIG. 40 is a diagram illustrating the state where transmission and reception of Health check frames is performed for the second time in the network according to the fourth embodiment.

The following describes sending a Health check frame HCF2 with the Ring ID 10 from a Secondary port of the switch #1 to the switch #2 at a time t2 shown in FIG. 40.

When receiving a Health check frame HCF2 generated by the Ring manager 100 of the switch #1, the Health check transmission controller 430c performs the Health check frame sending process (FIG. 38). In the Health check frame sending process, the Health check transmission controller 430c goes through the processing flow of steps S302 to S322 and detects the receiving flag (step S806). Since there is the entry E11 having the "on" setting of the receiving flag among the entries E11 to E14 having the Ring ID 10 and the LA ID 1 in the Health check sending/receiving management table 420 of the switch #1 at the time t2 (step S806: Any "on" Entry), the Health check transmission controller 430c selects the receiving flag "on" physical port, i.e., the physical port number 9 (step S810). The physical port status of the selected physical port number 9 is "Up" in the entry E11 of the Health check sending/receiving management table 420 (step S314: Up). The Health check transmission controller 430c then goes through the processing flow of steps S318 and S320. The Health check frame HCF2 is accordingly sent from the selected physical port with the physical port number 9 via the physical line LNA1 to the switch #2.

The transmission of a Health check frame HCB2 with the Ring ID 10 from a Primary port of the switch #2 to the switch #1 at the time t2 shown in FIG. 40 follows the procedure of the first embodiment at the time t2 described above (FIG. 15). The Health check frame HCB2 is accordingly sent from the selected physical port with the physical port number 10p via the physical line LNA2 to the switch #1.

(E-6-3) Time t3 (on Occurrence of Failure)

Figure 41:
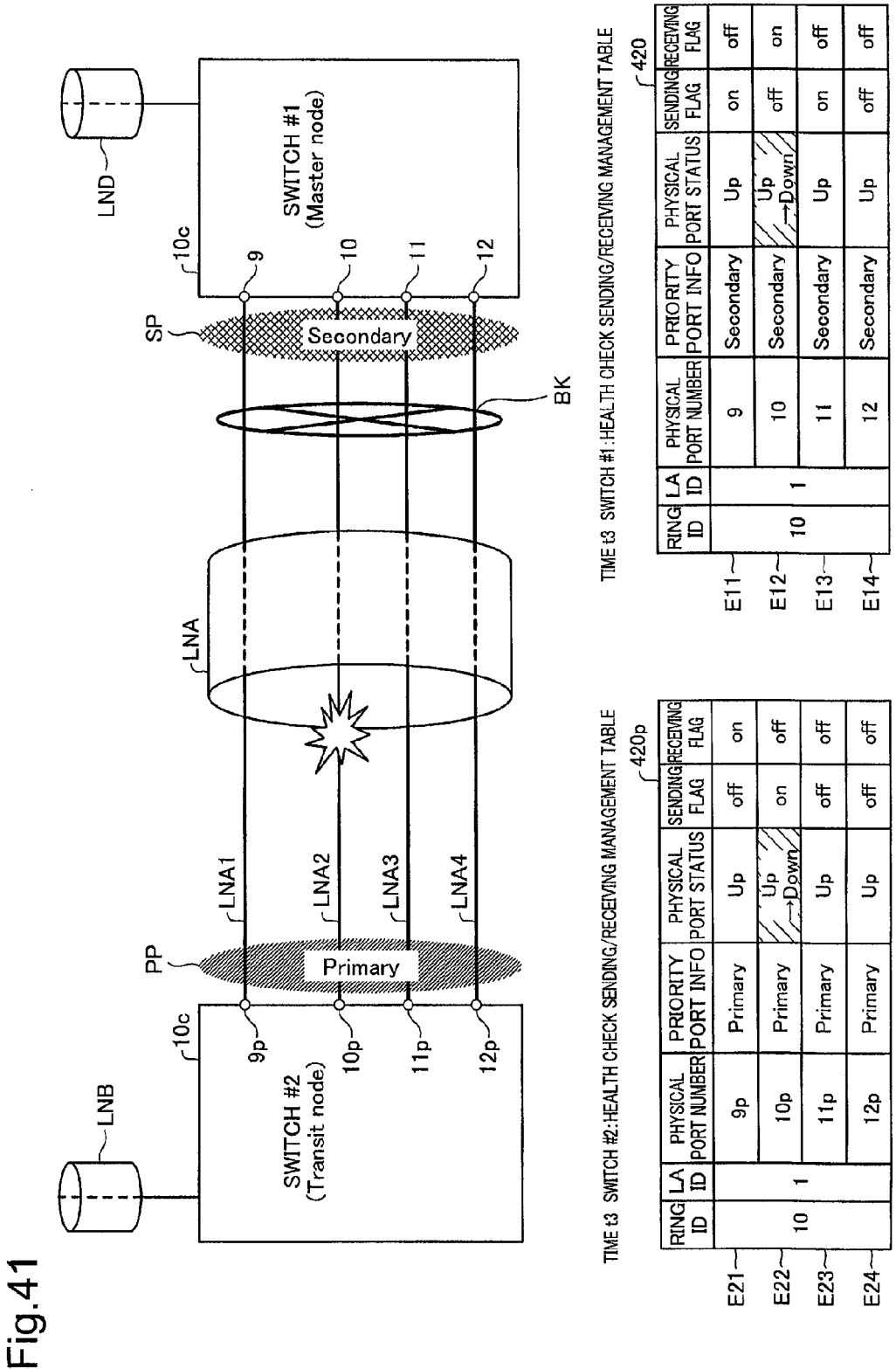
FIG. 41 is a diagram illustrating the occurrence of a failure in the network according to the fourth embodiment.

FIG. 41 is a diagram illustrating the occurrence of a failure in the network according to the fourth embodiment. The series of processing when a failure occurs in one part of the physical lines constituting the virtual line LNA (in the illustrated example of FIG. 41, physical line LNA2) at a time t3 as shown in FIG. 41 follows the procedure of the first embodiment at the time t3 described above (FIG. 16). The setting of the physical port status is updated from "Up" to "Down" in the entry E12, corresponding to the failed physical port, in the Health check sending/receiving management table 420 of the switch #1 (step S408, FIG. 13). Similarly, the setting of the physical port status is updated from "Up" to "Down" in the entry E22, corresponding to the failed physical port, in the Health check sending/receiving management table 420p of the switch #2 (step S408, FIG. 13).

(E-6-4) Time t4 (State 1 after Occurrence of Failure)

Figure 42:
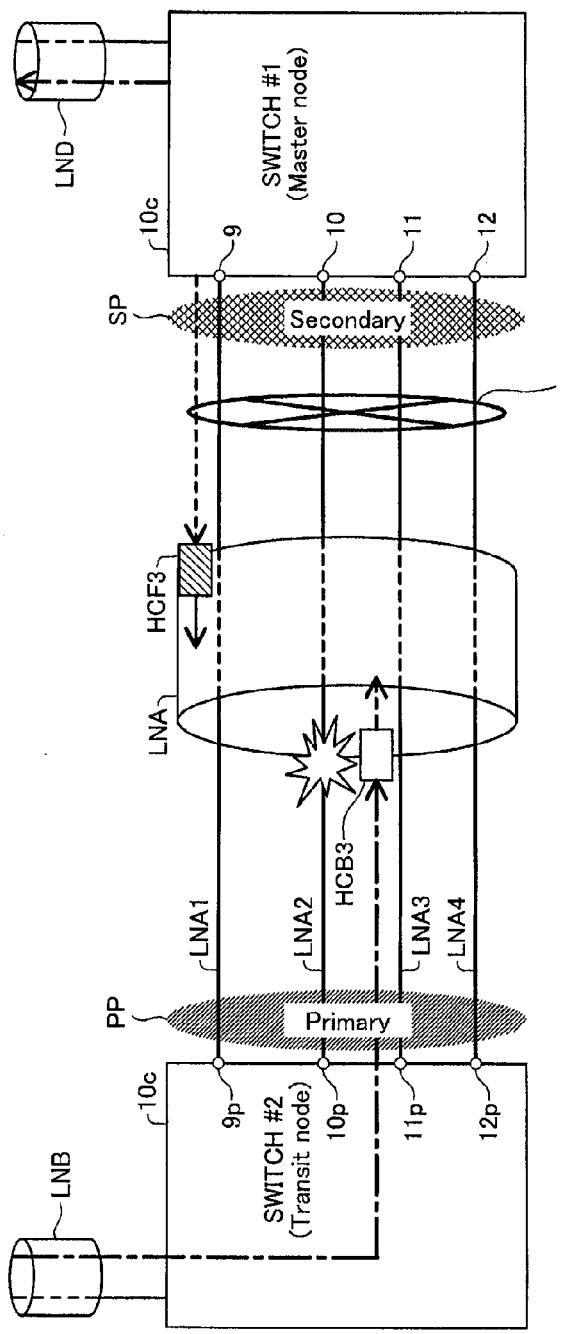
FIG. 42 is a diagram illustrating the state where transmission and reception of Health check frames restarts after the occurrence of a failure in the network according to the fourth embodiment.

FIG. 42 is a diagram illustrating the state where transmission and reception of Health check frames restarts after the occurrence of a failure in the network according to the fourth embodiment.

The following describes sending a Health check frame HCF3 with the Ring ID 10 from a Secondary port of the switch #1 to the switch #2 at a time t4 shown in FIG. 42.

When receiving a Health check frame HCF3 generated by the Ring manager 100 of the switch #1, the Health check transmission controller 430c performs the Health check frame sending process (FIG. 38). In the Health check frame sending process, the Health check transmission controller 430c goes through the processing flow of steps S302 to S322 and detects the receiving flag (step S806). Since there is the entry E12 having the "on" setting of the receiving flag among the entries E11 to E14 having the Ring ID 10 and the LA ID 1 in the Health check sending/receiving management table 420 of the switch #1 at the time t4 (step S806: Any "on" Entry), the Health check transmission controller 430c selects the receiving flag "on" physical port, i.e., the physical port number 10 (step S810). Since the physical port status of the selected physical port number 10 is "Down" in the entry E12 of the Health check sending/receiving management table 420 (step S314: Down), the Health check transmission controller 430c detects the priority port information (step S802). The priority port information of the selected physical port number 10 is "Secondary" in the entry E12 of the Health check sending/receiving management table 420 (step S802: Secondary). The Health check transmission controller 430c then reselects the physical port with the physical port number equal to the (currently selected port number−1), i.e., the physical port number 9 (step S804). The physical port status of the reselected physical port number 9 is "Up" in the entry E11 of the Health check sending/receiving management table 420 (step S314: Up). The Health check transmission controller 430c then goes through the processing flow of steps S318 and S320. The Health check frame HCF3 is accordingly sent from the reselected physical port with the physical port number 9 via the physical line LNA1 to the switch #2.

The transmission of a Health check frame HCB3 with the Ring ID 10 from a Primary port of the switch #2 to the switch #1 at the time t4 shown in FIG. 42 follows the procedure of the first embodiment at the time t2 described above (FIG. 15). The Health check frame HCB3 is accordingly sent from the selected physical port with the physical port number 11p via the physical line LNA3 to the switch #1.

(E-6-5) Time t5 (State 2 after Occurrence of Failure)

Figure 43:
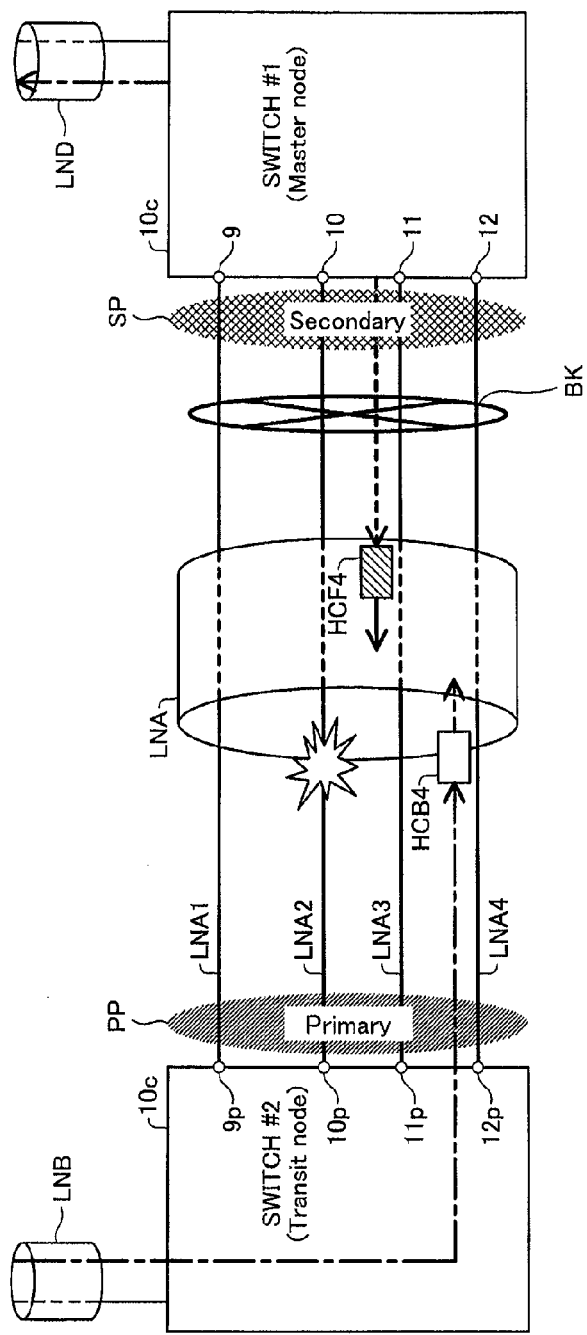
FIG. 43 is a diagram illustrating the state where transmission and reception of Health check frames continues after the occurrence of a failure in the network according to the fourth embodiment.

FIG. 43 is a diagram illustrating the state where transmission and reception of Health check frames continues after the occurrence of a failure in the network according to the fourth embodiment.

The transmission of a Health check frame HCF4 with the Ring ID 10 from a Secondary port of the switch #1 to the switch #2 at a time t5 shown in FIG. 43 follows the procedure of the fourth embodiment at the time t2 described above (FIG. 40). The Health check frame HCF4 is accordingly sent from the selected physical port with the physical port number 11 via the physical line LNA3 to the switch #2.

The transmission of a Health check frame HCB4 with the Ring ID 10 from a Primary port of the switch #2 to the switch #1 at the time t5 shown in FIG. 43 follows the procedure of the first embodiment at the time t2 described above (FIG. 15). The Health check frame HCB4 is accordingly sent from the selected physical port with the physical port number 12p via the physical line LNA4 to the switch #1.

As described above, in the Health check frame receiving process (FIG. 37) of the fourth embodiment, the Health check receiving controller 410c of the switch 10c updates the setting of the receiving flag to "on" for the frame-receiving port used to receive the Health check frame, irrespective of the setting of the sending flag. In the Health check frame sending process (FIG. 38), when a Health check frame is to be sent from a Primary port, i.e., a port connected in the first direction (step S322: Primary), the Health check transmission controller 430c of the switch 10c selects the physical port with the physical port number equal to the (port number of the sending flag "on" port+1), i.e., a port different from the last frame-sending port used to send a Health check frame last time, and sends the Health check frame from the selected physical port. In the fourth embodiment, this is referred to as "first rule". In the Health check frame sending process (FIG. 38), when a Health check frame is to be sent from a Secondary port, i.e., a port connected in the second direction (step S322: Secondary) and when a Health check frame is received from another switch (step S806: Any "on" Entry), the Health check transmission controller 430c of the switch 10c selects the receiving flag "on" physical port, i.e., the same port as the last frame-receiving port used to receive a Health check frame last time and sends the Health check frame from the selected physical port. In the fourth embodiment, this is referred to as "second rule".

In the configuration of the fourth embodiment described above, the Health check transmission controller 430c of the Health check frame controller 400 (status check frame controller) selects a port different from the last frame-sending port used to send a Health check frame (status check frame) last time, among the Primary ports (i.e., ports connected in the first direction), and sends a next Health check frame from the selected port. The Health check transmission controller 430c of the Health check frame controller 400 also selects the same port as the last frame-receiving port used to receive a Health check frame last time, among the Secondary ports (i.e., ports connected in the second direction), and sends a next Health check frame from the selected port. In this manner, the frame-sending port to be used to send a next Health check frame is changed, in order to avoid continuously using the same port as both the frame-sending port to send a Health check frame and the frame-receiving port to receive a Health check frame.

Like the first embodiment, the configuration of the fourth embodiment prevents or at least reduces false detection of a failure in the virtual line by the network relay device (switch 10c) configured to use the virtual line for making physical lines redundant and to exchange control frames (Health check frames) for use in checking the status of the network with another network relay device (switch 10c).

F. Modifications

The invention is not limited to the above embodiments or their applications, but a multiplicity of variations and modifications may be made to the embodiments without departing from the scope of the invention. Some examples of possible modification are described below.

F1. Modification 1

The above embodiment describes the exemplary configuration of the network including the network relay devices. The configuration of the network is, however, not limited to that described in the embodiment but may be determined arbitrarily within the scope of the invention. According to another embodiment, the network may be configured to include terminals, management devices, and different network relay devices other than those illustrated in FIG. 1 or may be configured with omitting part of the devices illustrated in FIG. 1.

The network relay device of the invention is not limited to the Ring network but may be applicable to various other networks, for example, networks employing such protocols as STP (Spanning Tree Protocol), MSTP (Multiple Spanning Tree Protocol), PVSTP (Per virtual LAN Spanning Tree Protocol) and GSRP (Gigabit Switch Redundancy Protocol).

Figure 44:
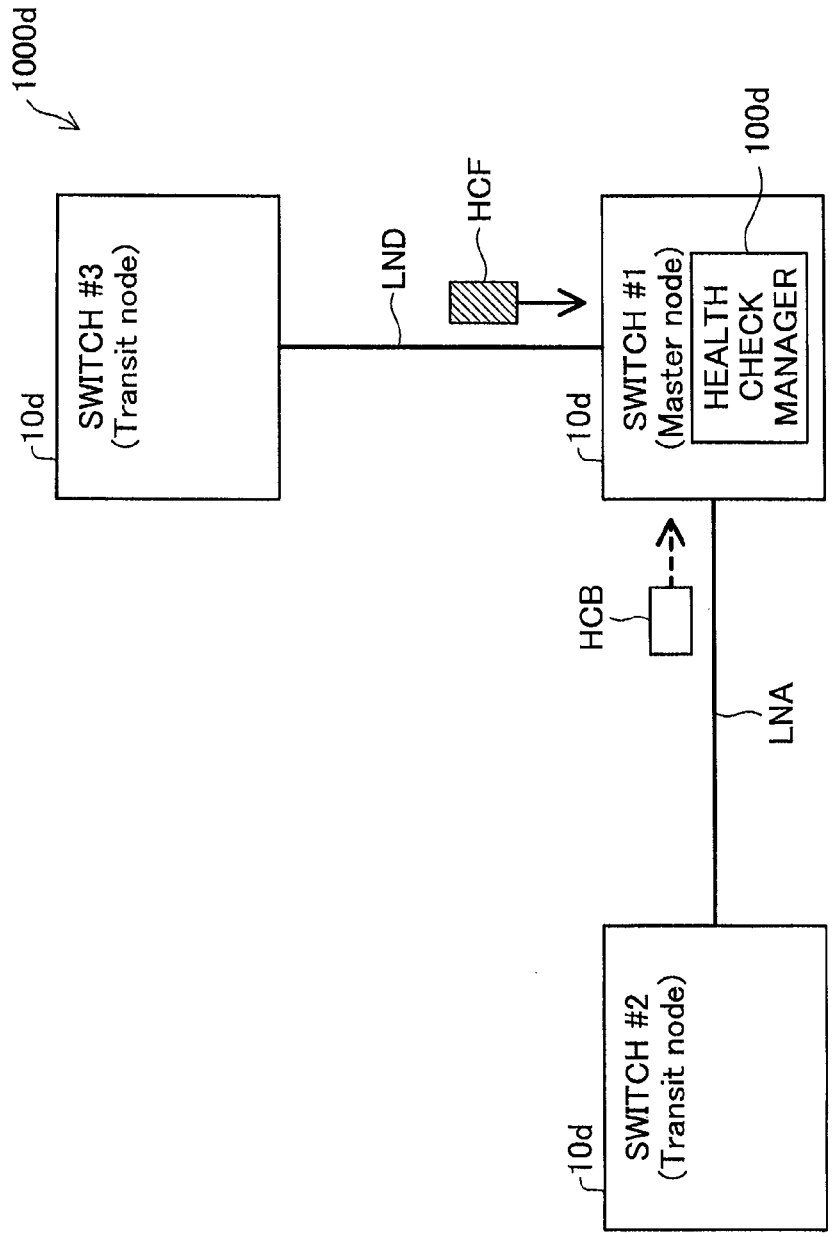
FIG. 44 is a diagram illustrating the general configuration of a network including network relay devices according to one modification.

FIG. 44 is a diagram illustrating the general configuration of a network 1000d including network relay devices according to one modification. The network relay device of the invention may be applicable to the network 1000d of FIG. 44, where a plurality of switches 10d are connected in series by virtual lines. In the illustrated example of FIG. 44, a switch #1 includes a Health check manager 100d and serves as the Master node.

According to another embodiment, the lines forming the Ring network including the network relay devices of the invention may not be necessarily all virtual lines, but part of the lines may be ordinary physical lines.

F2. Modification 2

The above embodiments describe the exemplary configurations of the network relay device. The configuration of the network relay device is, however, not limited to those described in the embodiments but may be determined arbitrarily within the scope of the invention. According to another embodiment, the network relay device may be configured to include processing modules other than those illustrated in FIG. 6 or may be configured with omitting part of the processing modules illustrated in FIG. 6.

In the above embodiments, the Ring manager and the LA Ring mapping table are implemented by the CPU and the memory. The LA controller, the frame relay module, the frame identification module and the Health check frame controller are implemented by the ASIC. This concrete hardware configuration of the respective processing modules is only illustrative and may be modified or altered in various ways. For example, the Ring manager and the LA Ring mapping table may also be implemented by the ASIC.

F3. Modification 3

The above embodiments describe the fields set in the LA Ring mapping table, the LA management table and the Health check sending/receiving management table. The fields set in these tables are, however, not limited to those described in the embodiments but may be determined arbitrarily within the scope of the invention. According to another embodiment, these tables may be configured to include different fields other than those described in the embodiments. These tables may be formed as direct maps.

F4. Modification 4

The above embodiments describe the exemplary procedures of Health check frame sending process. The Health check frame sending process is, however, not limited to the procedures described in the above embodiments but may be changed arbitrarily within the scope of the invention.

In the Health check frame sending process of the first embodiment (FIG. 12), the method of selecting the frame-sending port to be used for sending a first Health check frame at steps S310 and S312 is only illustrative and may be modified in various ways. The method of selecting the frame-sending Primary port to be used for sending a second or subsequent Health check frame at step S326 is only illustrative and may be modified in various ways, as long as the method selects a different port from the last frame-sending port used to send a Health check frame last time.

In the Health check frame sending process of the second embodiment (FIG. 20), the method of selecting the frame-sending port to be used for sending a first Health check frame at steps S310 and S502 is only illustrative and may be modified in various ways.

In the Health check frame sending process of the third embodiment (FIG. 29), the method of selecting the frame-sending port to be used for sending a first Health check frame at steps S604 and S606 is only illustrative and may be modified in various ways.

In the Health check frame sending process of the fourth embodiment (FIG. 38), the method of selecting the frame-sending port to be used for sending a first Health check frame at steps S310 and S312 is only illustrative and may be modified in various ways. The method of selecting the frame-sending Primary port to be used for sending a second or subsequent Health check frame at step S326 is only illustrative and may be modified in various ways, as long as the method selects a different port from the last frame-sending port used to send a Health check frame last time.

F5. Modification 5

In the third embodiment described above, the configuration of the Health check sending/receiving management table and the physical port status change process determine the add-numbered lines among the communicable physical lines to be used for transmission of Health check frames from Primary ports and the even-numbered lines to be used for transmission of Health check frames from Secondary ports. This is, however, only illustrative and may be modified in various ways.

According to another embodiment, the roles of the odd-numbered lines and the even-numbered lines may be reversed. The even-numbered lines may be used for transmission of Health check frames from Primary ports, while the odd-numbered lines may be used for transmission of Health check frames from Secondary ports.

According to yet another embodiment, the physical lines connecting with the ports having the greater numbers than a specific physical port number may be used for transmission of Health check frames from Primary ports, while the physical lines connecting with the ports having the smaller numbers than the specific physical port may be used for transmission of Health check frames from Secondary ports.

What is claimed is:

1. A network relay device, comprising:
a plurality of ports, each being configured to be connectable with one physical line;
a virtual line controller configured to treat a plurality of physical lines as a virtual line, the plurality of physical lines are respectively connected with the plurality of ports; and
a status check frame controller configured to send via the virtual line a status check frame for use in checking a status of a network, which the network relay device is connected with via the virtual line, wherein
the network relay device forms a Ring network,
the status check frame controller sends the status check frame from a port connected in a first direction of the Ring network and from a port connected in a second direction of the Ring network that is different from the first direction, and
the status check frame controller changes a frame-sending port to be used to send a next status check frame, in order to avoid continuously using an identical port as both a frame-sending port to send the status check frame and a frame-receiving port to receive the status check frame from another network relay device.

2. The network relay device according to claim 1, wherein the status check frame controller sends the next status check frame from a port selected according to a first rule among ports connected in the first direction and from a port selected according to a second rule among ports connected in the second direction, in order to avoid continuously using an identical port both as a frame-sending port to send the status check frame in the first direction and a frame-receiving port to receive from the another network relay device the status check frame, which is sent in the second direction and is circulated in the Ring network.

3. The network relay device according to claim 2, wherein the first rule is configured to select a different port from a last frame-sending port to send the status check frame last time, and
the second rule is configured to select an identical port with a last frame-sending port to send the status check frame last time.

4. The network relay device according to claim 2, wherein the first rule is configured to select a port having a next greater port number next to a port number of a last frame-sending port to send the status check frame last time, and
the second rule is configured to select a port having a next smaller port number just before a port number of a last frame-sending port to send the status check frame last time.

5. The network relay device according to claim 2, wherein the first rule is configured to select a different port from a last frame-sending port to send the status check frame last time, and
the second rule is configured to select a last frame-receiving port to receive the status check frame from the another network relay device last time.

6. The network relay device according to claim 3, further comprising:
a port record storage configured to store a record of the last frame-sending port to send the status check frame last time and a record of the last frame-receiving port to receive the status check frame from the another network relay device last time.

7. The network relay device according to claim 1, wherein the network relay device forms a Ring network, and
the status check frame controller sends the status check frame from the port connected in the first direction of the Ring network and connected with one part of the physical lines constituting the virtual line, and the status check frame controller sends the status check frame from the port connected in the second direction of the Ring network, which is different from the first direction, and connected with another part of the physical lines, which does not overlap with the one part of the physical lines.

8. The network relay device according to claim 7, wherein on occurrence of a failure in one of the physical lines constituting the virtual line, the status check frame controller reselects the one part of the physical lines and the another part of the physical lines and sends a next status check frame via the reselected one part of the physical lines and via the reselected another part of the physical lines.

9. The network relay device according to claim 1, further comprising:
a Ring manager configured to generate the status check frame and control the status check frame controller to send the generated status check frame, when the status check frame sent by the status check frame controller is not received from the another network relay device within a preset period of time, the Ring manager estimates occurrence of a failure in the network and performs a specified rerouting process.

10. A control method of a network relay device constituting a Ring network, comprising the steps of:
(a) treating a plurality of physical lines, which are respectively connected with a plurality of ports, to constitute a virtual line; and
(b) sending via the virtual line a status check frame for use in checking status of a network, which the network relay device is connected with via the virtual line, wherein
said (b) comprises sending the status check frame from a port connected in a first direction of the Ring network and from a port connected in a second direction of the Ring network that is different from the first direction, and
changing a frame-sending port to be used to send a next status check frame, in order to avoid continuously using an identical port as a frame-sending port to send the status check frame and a frame-receiving port to receive the status check frame from another network relay device.

* * * * *